(12) United States Patent
Ishizuka et al.

(10) Patent No.: US 9,588,016 B2
(45) Date of Patent: Mar. 7, 2017

(54) FUEL INJECTION DEVICE AND ADJUSTMENT METHOD THEREOF

(75) Inventors: Kouji Ishizuka, Chita-gun (JP); Kenichirou Nakata, Kariya (JP); Katsuhiko Takeuchi, Chiryu (JP)

(73) Assignee: DENSO CORPORATION, Kariya (JP)

(*) Notice: Subject to any disclaimer, the term of this patent is extended or adjusted under 35 U.S.C. 154(b) by 1006 days.

(21) Appl. No.: 11/930,668

(22) Filed: Oct. 31, 2007

(65) Prior Publication Data

US 2008/0228374 A1    Sep. 18, 2008

(30) Foreign Application Priority Data

Nov. 14, 2006  (JP) .................................. 2006-307399
Aug. 10, 2007  (JP) .................................. 2007-210259

(51) Int. Cl.
| | |
|---|---|
| *G06F 7/00* | (2006.01) |
| *G06F 17/00* | (2006.01) |
| *G01M 15/09* | (2006.01) |
| *F02D 41/38* | (2006.01) |
| *F02D 41/40* | (2006.01) |
| *F02M 47/02* | (2006.01) |
| *F02M 57/00* | (2006.01) |

(52) U.S. Cl.
CPC ......... *G01M 15/09* (2013.01); *F02D 41/3809* (2013.01); *F02D 41/3836* (2013.01); *F02D 41/402* (2013.01); *F02M 47/027* (2013.01); *F02M 57/005* (2013.01); *F02D 2200/0602* (2013.01); *F02D 2200/0616* (2013.01); *F02D 2250/04* (2013.01); *F02D 2250/14* (2013.01); *F02M 2200/24* (2013.01); *Y02T 10/44* (2013.01)

(58) Field of Classification Search
USPC .................................................. 123/456, 457
See application file for complete search history.

(56) References Cited

U.S. PATENT DOCUMENTS 2,220,558 A * 11/1940  Van Dijck et al. ........ 123/406.4
4,426,981 A    1/1984  Greiner et al.
(Continued)

FOREIGN PATENT DOCUMENTS

JP    2000-265892    9/2000
JP    2001-065397    3/2001
(Continued)

OTHER PUBLICATIONS

Extended Search Report dated Feb. 15, 2008 in EP Application No. 07120573.6.
(Continued)

*Primary Examiner* — Stephen K Cronin
*Assistant Examiner* — David Hamaoui
(74) *Attorney, Agent, or Firm* — Nixon & Vanderhye P.C.

(57) ABSTRACT

A fuel injection device (fuel supply system) of a common rail type fuel injection system for an engine includes a pressure sensor disposed in a fuel inlet of an injector for measuring a fuel pressure at a position where the sensor is disposed and an ECU for sensing various kinds of pressure fluctuations associated with the injection including a pressure leak due to an injection operation of the injector and waving characteristics due to actual injection thereof based on sensor outputs from the pressure sensor. The ECU serially obtains the sensor outputs from the pressure sensor at intervals of 20 μsec.

110 Claims, 22 Drawing Sheets

(56) References Cited

U.S. PATENT DOCUMENTS

| | | | | |
|---|---|---|---|---|
| 4,494,507 | A | * | 1/1985 | Yasuhara ............... 123/357 |
| 4,760,733 | A | * | 8/1988 | Tanaka ............... 73/35.04 |
| 4,986,117 | A | * | 1/1991 | Yoshizu et al. ............ 73/114.47 |
| 5,402,760 | A | * | 4/1995 | Takeuchi et al. ............ 123/300 |
| 6,092,737 | A | * | 7/2000 | Bosch et al. ............ 239/96 |
| 6,102,000 | A | * | 8/2000 | Shindoh et al. ............ 123/381 |
| 6,142,121 | A | * | 11/2000 | Nishimura et al. ........... 123/456 |
| 6,463,910 | B2 | * | 10/2002 | Nishiyama ............ 123/456 |
| 6,637,675 | B2 | * | 10/2003 | Carroll et al. ............ 239/533.4 |
| 6,729,297 | B2 | | 5/2004 | Futonagane et al. |
| 6,732,715 | B2 | * | 5/2004 | Fallahi et al. ............ 123/480 |
| 6,769,255 | B2 | * | 8/2004 | Nishiyama et al. ............ 60/602 |
| 7,168,325 | B2 | * | 1/2007 | Yoshino ............ 73/754 |
| 7,210,458 | B2 | * | 5/2007 | Walther et al. ............ 123/446 |
| 7,267,097 | B2 | * | 9/2007 | Tsutsui et al. ............ 123/299 |
| 2008/0281500 | A1 | * | 11/2008 | Nakata et al. ............ 701/103 |
| 2009/0055084 | A1 | * | 2/2009 | Ishizuka et al. ............ 701/105 |
| 2009/0056676 | A1 | * | 3/2009 | Nakata et al. ............ 123/478 |
| 2009/0056677 | A1 | * | 3/2009 | Nakata et al. ............ 123/480 |
| 2009/0056678 | A1 | * | 3/2009 | Nakata et al. ............ 123/480 |
| 2009/0063010 | A1 | * | 3/2009 | Nakata et al. ............ 701/103 |
| 2009/0063012 | A1 | * | 3/2009 | Nakata et al. ............ 701/103 |
| 2009/0063013 | A1 | * | 3/2009 | Nakata et al. ............ 701/103 |
| 2009/0063016 | A1 | * | 3/2009 | Nakata et al. ............ 701/103 |
| 2009/0082941 | A1 | * | 3/2009 | Nakata et al. ............ 701/103 |
| 2009/0084356 | A1 | * | 4/2009 | Nakata et al. ............ 123/447 |
| 2009/0084357 | A1 | * | 4/2009 | Nakata et al. ............ 123/458 |
| 2009/0088951 | A1 | * | 4/2009 | Ishizuka et al. ............ 701/103 |

FOREIGN PATENT DOCUMENTS

| | | |
|---|---|---|
| JP | 2005-076618 | 3/2005 |
| JP | 2005-163559 | 6/2005 |

OTHER PUBLICATIONS

U.S. Appl. No. 12/179,235, Koji Ishizuka et al., filed Jul. 24 2008.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.
U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/186,038, Kenichiro Nakata et al., filed Aug. 5, 2008.
U.S. Appl. No. 12/194,917, Kenichiro Nakata et al., filed Aug. 20, 2008.
U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.
Office Action dated Aug. 21, 2009 issued in corresponding Chinese Application No. 200710169865.0 with an at least partial English-language translation thereof.
Office Action (4 pgs.) dated Sep. 3, 2010 issued in corresponding Chinese Application No. 200710169865.0 with an at least partial English-language translation thereof (4 pgs.).
Office Action (3 pgs.) dated Apr. 5, 2011 issued in corresponding Japanese Application No. 2007-210259 with an at least partial English-language translation thereof (2 pgs.).
Extended European Search Report (5 pgs.) dated Sep. 15, 2011 issued in corresponding European Patent Application No. 11172994.3.

* cited by examiner

| ELAPSED TIME FROM INJECTION | 0 | 100 | 200 | 300 | ... | 1000 | 1100 | ... |
|---|---|---|---|---|---|---|---|---|
| PRESSURE VALUE | +10 | +20 | +10 | 0 | ... | −10 | 0 | ... |

FUEL INJECTION DEVICE AND ADJUSTMENT METHOD THEREOF

CROSS REFERENCE TO RELATED APPLICATION

This application is based on and incorporates herein by reference Japanese Patent Applications No. 2006-307399 filed on Nov. 14, 2006 and No. 2007-210259 filed on Aug. 10, 2007.

BACKGROUND OF THE INVENTION

1. Field of the Invention

The present invention relates to a fuel injection device constituting a common rail type fuel injection system of an engine and to an adjustment method thereof. More particularly the invention relates to a fuel injection device for detecting a fuel injection pressure in the system and to an adjustment method thereof.

2. Description of Related Art

Such a device has been known, for example, as described in Patent Document 1 (JP-A-H10-220272). In the common rail type fuel injection system having the fuel injection device, fuel pumped by a fuel pump is accumulated by a common rail in a high-pressure state. The accumulated high-pressure fuel is supplied to respective injectors of cylinders via pipes (high-pressure fuel passages) provided to the respective cylinders. The common rail is provided with a pressure sensor (rail pressure sensor). This system is configured to control driving of various components constituting a fuel supply system by use of the above-mentioned fuel injection device based on an output from the rail pressure sensor.

In recent years, a diesel engine or the like for a vehicle has employed the so-called multiple injection system that performs sub-injection to inject fuel of a smaller quantity than that of main injection before or after the main injection, which generates output torque, in one combustion cycle. For example, noise caused at the time of fuel combustion or an increase in quantity of NOx emission now becomes problematic. In order to improve the current situation, pre-injection or pilot injection is performed as a small quantity of injection before the main injection. In some cases, also after the main injection, after-injection (whose timing is close to that of the main injection) is performed for the purpose of activation of diffusion combustion or decreasing of the quantity of PM (particulate matter) emission. Alternatively, post-injection (whose timing is very late from that of the main injection) is performed for the purpose of raising of an exhaust temperature or activation of a catalyst by supply of a reducing component or the like. The recent engine control involves supplying fuel to the engine in an injection mode (in an injection pattern) that is more appropriate to each of various conditions using one or any combination of various kinds of injections as described above.

The inventors have confirmed that in this case, that is, in the above-mentioned multiple injection, these stages are performed continuously at short intervals, which may lead to a large control error with respect to a target engine operation state as compared to the case of single injection. Specifically, each of injection operations which are continuously performed (in particular sub-injection operations for injecting fuel of a small quantity, other than the main injection operation) is subject to various influences from other injection operations performed before or after the injection operation thereof.

However, the conventional device such as the device disclosed in the above Patent Document 1 has a difficulty in sensing injection characteristics associated with the multiple injection (a plurality of times of continuous injection operations in one combustion cycle) with high accuracy, and more specifically, a pressure fluctuation (waving characteristics) caused by predetermined injection of a multiple injection pattern.

SUMMARY OF THE INVENTION

It is an object of the present invention to provide a fuel injection device capable of sensing a pressure fluctuation (waving characteristics) caused by a certain injection with high accuracy, for example, in order to enable obtaining and correction of injection characteristics.

According to an aspect of the present invention, a fuel injection device of a common rail type fuel injection system for an engine has at least one fuel passage pressure sensor disposed in a fuel passage between a point of a pipe connected to a fuel discharge port of a common rail apart from the common rail by a certain distance and a fuel injection hole of an injector connected to the pipe. The sensor measures a fuel pressure at a position where the sensor is disposed. The fuel injection device has a pressure fluctuation sensing device for sensing a pressure fluctuation caused by at least one of an injection operation of the injector and actual injection actually performed through the injection operation based on a sensor output from the fuel passage pressure sensor.

Thus, the fuel passage pressure sensor is disposed to measure the pressure in the fuel passage from the pipe connected to the fuel discharge port of the common rail (except for a point near the common rail) to the fuel injection hole of the injector. This structure enables accurate sensing of the pressure fluctuation caused by at least one of the injection operation of the injector corresponding to predetermined injection and the actual injection (injection actually performed through the injection operation).

In the device described in the above Patent Document 1, the injection pressure of the injector is basically controlled only by a rail pressure sensor for measuring the pressure in the common rail (rail pressure). In this device, pressure fluctuation caused by the injection (including the injection operation) is attenuated until the pressure fluctuation reaches the common rail from a fuel injection hole of the injector. As a result, the pressure fluctuation does not appear as rail pressure fluctuation. Thus, this device has a difficulty in sensing the pressure fluctuation caused by the injection with high accuracy.

In contrast, the device according to the aspect of the invention includes the fuel passage pressure sensor for measuring the injection pressure in a position closer to the fuel injection hole than the rail pressure sensor (or a sensor disposed in the vicinity of the common rail). Thus, the pressure sensor can accurately sense the pressure fluctuation caused by the injection (including the injection operation) before the pressure fluctuation is attenuated. Accordingly, such a device can sense the pressure fluctuation (waving characteristics) caused by at least one of the injection operation of the injector corresponding to the predetermined injection and the actual injection with high accuracy. As a result, for example, appropriate obtainment and correction of the injection characteristics are enabled.

Although the pressure fluctuation caused by the injection operation and actual injection is significantly attenuated, the pressure fluctuation to a certain degree can be detected even with the pressure in the common rail (rail pressure). For example, by calculating an inclination of a pressure transition (time differential value of the pressure), an injection rate corresponding to the predetermined injection can be estimated based on the differential value. This structure, however, estimates a pressure value before the attenuation of the pressure fluctuation as a differential value. Accordingly, it is difficult to measure the transition of the injection rate and an injection quantity corresponding to an integration value of the injection rate with high accuracy.

In contrast, the device according to the invention can directly measure a pressure value before the attenuation by use of the above-mentioned fuel passage pressure sensor. Thus, the injection characteristics such as the transition of the injection rate and the injection quantity associated with the predetermined injection can be detected with higher accuracy by directly determining the transition of the injection rate and the injection quantity from the measured pressure value than the structure using the differential value.

According to another aspect of the present invention, a fuel injection device for detecting a fuel injection pressure in a common rail type fuel injection system of an engine has a fuel pressure serially obtaining device for serially obtaining fuel pressure signals of an injector connected to a common rail at intervals short enough to draw a track of a pressure transition waveform of the pressure. According to yet another aspect of the present invention, a fuel injection device for detecting a fuel injection pressure in a common rail type fuel injection system of an engine has a fuel pressure serially obtaining device for serially obtaining fuel pressure signals of an injector connected to a common rail at intervals shorter than 50 μsec. Each of these devices can be realized by using a microcomputer (for example, as an electronic control device). Thus, based on the sensor output of the fuel passage pressure sensor provided to the pipe on the common rail fuel discharge side or near or inside the injector, the mode of the pressure fluctuation which is caused at least by the injection operation of the injector and the actual injection actually performed through the injection operation, can be detected with high accuracy.

According to still another aspect of the present invention, an adjustment method of a fuel injection device of a common rail type fuel injection system for an engine having at least one fuel passage pressure sensor provided to a fuel passage from a pipe connected to a fuel discharge port of a common rail to a fuel injection hole of an injector connected to the pipe for measuring a fuel pressure, the fuel injection device being adapted to sense a pressure fluctuation caused by at least one of an injection operation of the injector and actual injection actually performed through the injection operation thereof based on a sensor output from the fuel passage pressure sensor has the steps of serially obtaining the sensor outputs from the fuel passage pressure sensor at different intervals to sense the pressure fluctuation with the fuel injection device and plotting the sensor outputs on a time axis to determine the interval for obtaining the sensor outputs to be short enough to draw a track of a pressure transition waveform using the sensor outputs. With the method, the suitable interval for obtaining the sensor output can be set to the device in accordance with the kind and the application of the device. With the device, the injection characteristics can be estimated with high accuracy.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Now, an embodiment embodying a fuel injection device and an adjustment method thereof according to the invention will be described with reference to the accompanying drawings. The device of this embodiment is mounted on a common rail type fuel injection system (high-pressure injection fuel supply system) which controls a reciprocating diesel engine serving as an engine for a vehicle, for example. That is, the device of this embodiment is also a fuel injection device for a diesel engine which is used in directly injecting and supplying the high-pressure fuel (for example, light oil at an injection pressure of about 1400 atmospheres) to a combustion chamber in an engine cylinder of the diesel engine (internal combustion engine), like the device as disclosed in the above-mentioned Patent Document 1.

Figure 1:
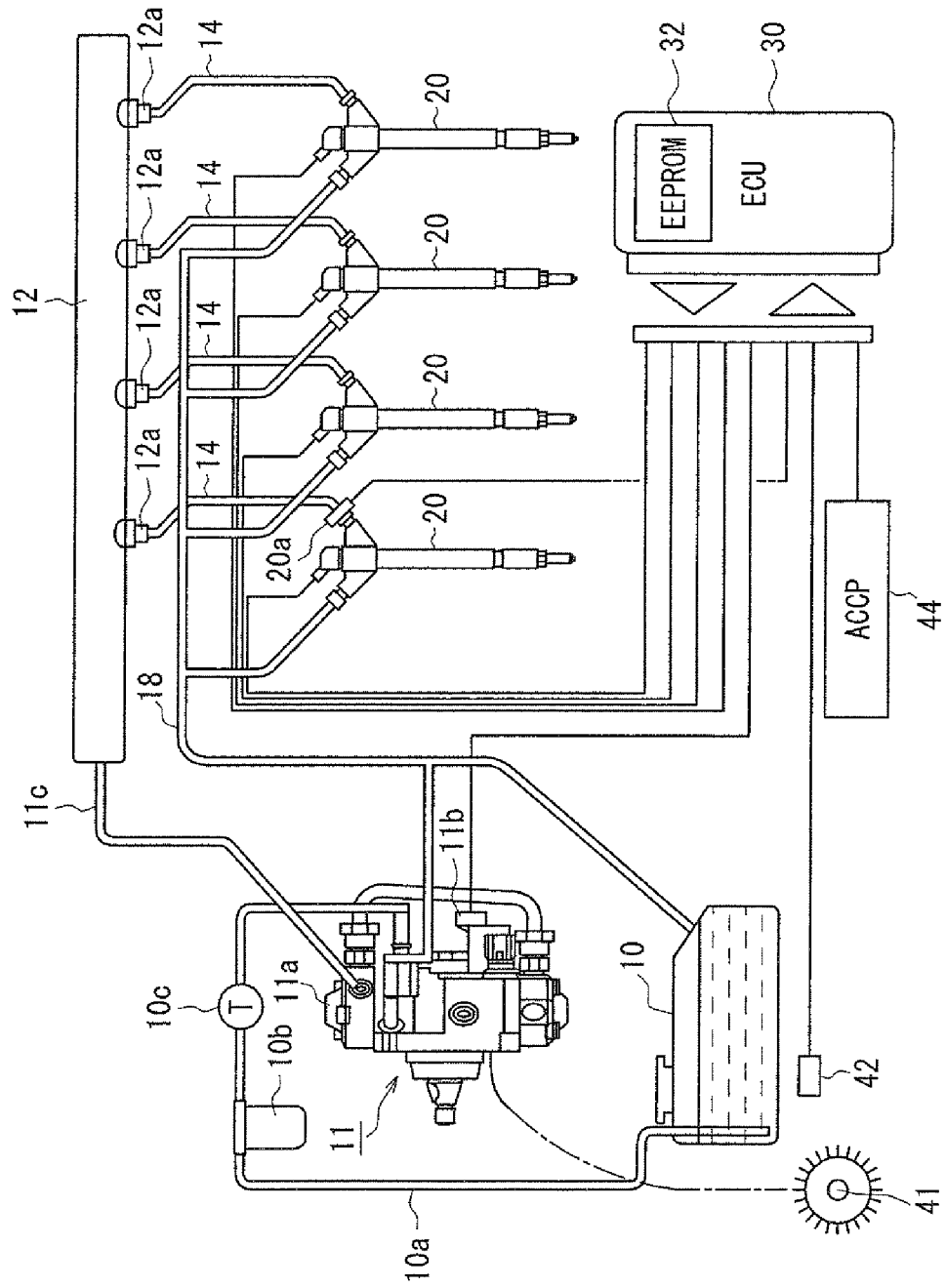
FIG. 1 is a schematic construction diagram showing an engine control system applied with a fuel injection device and an adjustment method according to an embodiment of the present invention.

Now, the outline of the common rail type fuel injection system according to this embodiment will be described with reference to FIG. 1. As the engine of this embodiment, a multi-cylinder (for example, four-cylinder) engine for a four-wheeled vehicle is assumed. In FIG. 1, injectors (fuel injection valves) 20 are used for respective cylinders #1, #2, #3, #4 from a fuel tank 10 side. As shown in FIG. 1, an ECU (electronic control unit) 30 in the system is mainly configured to capture sensor outputs (detection results) from various sensors and to control driving of a fuel supply device based on the outputs from the respective sensors. The ECU 30 controls the driving of various devices constituting the fuel supply system to perform feedback control such that a fuel injection pressure (fuel pressure measured in each time by a pressure sensor 20a in this embodiment) to the engine becomes a target value (target fuel pressure), for example, so as to control an output (engine speed or torque) of the diesel engine.

Various devices constituting the fuel supply system include the fuel tank 10, a fuel pump 11, and a common rail 12 disposed from the fuel upstream side in that order. The fuel tank 10 is connected to the fuel pump 11 via a fuel filter 10b by a pipe 10a. A fuel temperature sensor 10c serving as a sensor for detecting the temperature of fuel is disposed on the upstream side of the fuel pump 11 of the pipe 10a.

The fuel pump 11 basically includes a low-pressure pump 11a and a high-pressure pump 11b. The fuel pumped from the fuel tank 10 by the low-pressure pump 11a constructed of a trochoid-type feed pump is pressurized and discharged by the high-pressure pump 11b. The quantity of fuel pumped to the high-pressure pump 11b is adjusted by a suction control valve (SCV) (not shown) disposed on the fuel suction side of the fuel pump 11. The low-pressure pump 11a is driven by a driving shaft (not shown) moving in conjunction with a crankshaft 41. The driving shaft is rotatably driven together with rotation of the crankshaft 41 serving as an output shaft of the engine. For example, the driving shaft is rotated at a rate of 1/1 or 1/2 with respect to one rotation of the crankshaft 41. The high-pressure pump 11b is constructed of for example, a plunger pump. The high-pressure pump is configured to serially pump the fuel sent to a pressurization chamber at predetermined timing by causing a predetermined number of plungers (for example, three plungers) to respectively reciprocate in the axial direction with an eccentric cam (not shown).

That is, the fuel in the fuel tank 10 is pumped up by the fuel pump 11 via the fuel filter 10b, and pressurized and supplied (pumped) to the common rail 12 via the pipe (high-pressure fuel passage) 11c. The fuel pumped from the fuel pump 11 is accumulated in the high-pressure state in the common rail 12. The high-pressure fuel accumulated is supplied to the injectors 20 of the respective cylinders through common rail fuel discharge side pipes 14 (high-pressure fuel passages) provided to the respective cylinders. An orifice 12b (a restriction portion of the pipe 14 corresponding to a fuel pulsation reducing device) for reducing fuel pulsation transmitted to the common rail 12 via the pipe 14 (which is caused at a fuel injection hole of the injector 20 mainly at the time of injection) is provided in a connection portion 12a between the common rail 12 and the pipe 14. The orifice 12b is configured to be capable of feeding the fuel to each injector 20 at a stable pressure by reducing the pressure pulsation in the common rail 12.

In this system, the fuel pumped by driving of the fuel pump 11 is injected and supplied (directly supplied) directly into each cylinder of the engine by each injector 20. The engine is a four-stroke engine. That is, in the engine, one combustion cycle consisting of four steps consisting of suction, compression, combustion, and exhaust is performed in turn in a cycle of 720° CA.

As mentioned above, the fuel supply system according to this embodiment has a basic structure similar to the conventional system. However, in the fuel injection device of this embodiment, a pressure sensor 20a (fuel passage pressure sensor) is provided in the vicinity of the injector 20 corresponding to a predetermined cylinder (cylinder #1), in particular, at a fuel inlet. With this structure, a pressure fluctuation (waving characteristics) caused by an injection operation of the injector 20 corresponding to predetermined injection or by actual injection thereof can be sensed with high accuracy (as will be described in detail later).

Figure 2:
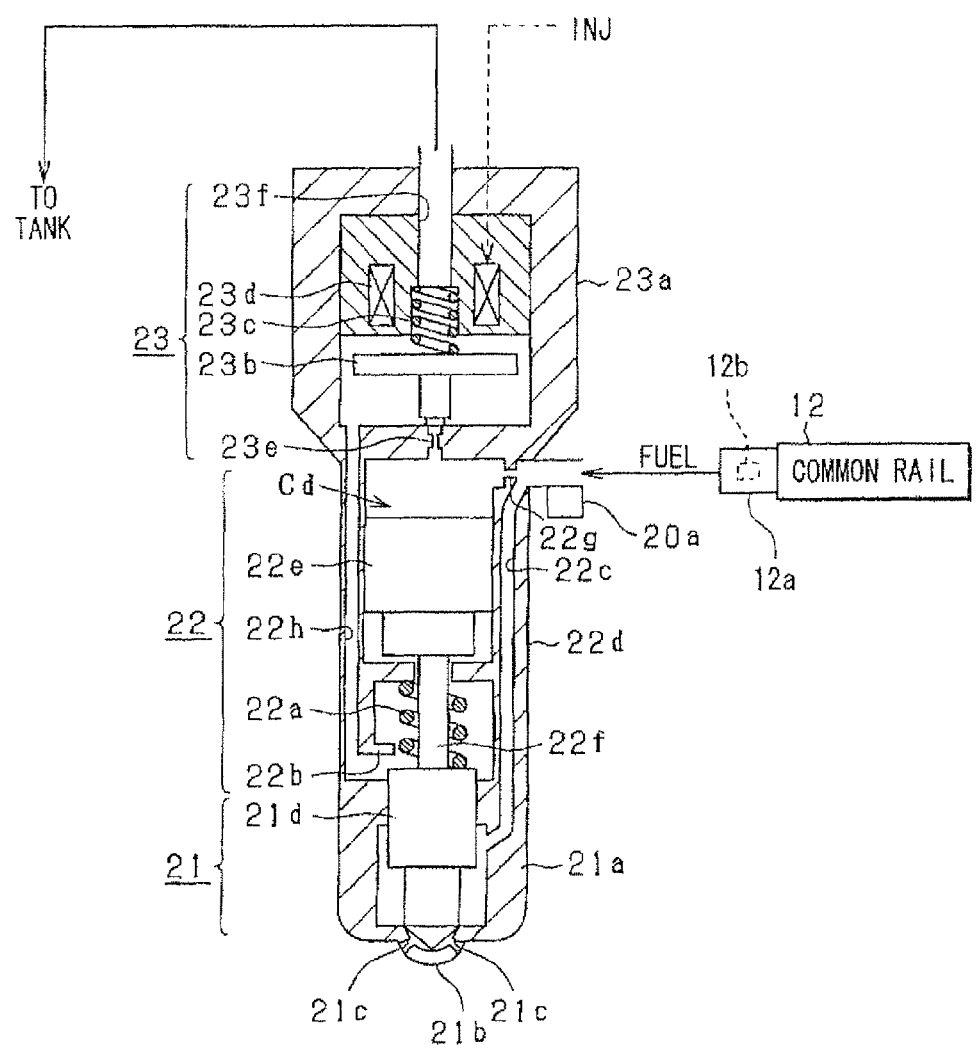
FIG. 2 is a schematic longitudinal cross-sectional view showing an internal structure of an injector used in the system according to the embodiment.

Referring to FIG. 2, the structure of the above-mentioned injector 20 will be described below in detail. FIG. 2 is an inner side view schematically showing an inside structure of the injector 20. As shown in FIG. 2, the injector 20 includes a nozzle portion (injection portion) 21 disposed on a tip end of a valve body 22 for injecting the fuel to the outside of the valve through a fuel injection hole, and a driving portion 23 provided on a rear end of the valve body 22 for driving the valve. The nozzle portion 21 is formed, for example, by mounting another nozzle body on the tip end of the valve body 22.

As shown in FIG. 2, the fuel injection hole (injection hole 21c) of the injector 20 is provided in the nozzle portion 21 on the tip end side of the valve. Specifically, the nozzle portion 21 mainly includes a nozzle body 21a having a cylindrical contour. The nozzle body 21a has a diameter decreased toward the tip end side to form a tip end portion 21b on the leading edge thereof. The tip end portion 21b is provided with the necessary number (for example, 6 to 8) of the injection holes 21c (fine holes) to serve as the fuel injection hole in communication with the inside and outside of the valve, each injection hole having a diameter of, for example, about 0.15 mm. The nozzle portion 21 accommodates therein a columnar nozzle needle 21d for opening and closing a fuel passage to the injection hole 21c. The nozzle needle 21d is urged toward the tip end of the valve by a spring 22a provided on the rear end side of the valve. The nozzle needle 21d slides in the axial direction inside the injector 20 according to or against the urging force. In order to prevent an abnormal operation or the like, a stopper 22b that prevents (restrains) displacement of the needle 21d toward the valve rear end at a predetermined position is disposed on the valve rear end (lift side) of the needle 21d.

The high pressure fuel is fed from the common rail (accumulator pipe) 12 to the tip end portion 21b of such a nozzle portion 21 through the pipe 14 (see FIG. 1) and the fuel passage 22c. The fuel is injected through the above-mentioned injection hole 21c. The fuel pressure of the high pressure fuel fed is measured at the fuel inlet of the injector 20. Specifically, the above-mentioned pressure sensor 20a (also see FIG. 1) disposed in the fuel inlet serially measures a pressure (inlet pressure) at each time, including a pressure fluctuation caused by the injection operation or the actual injection of the injector 20 (actual fuel injection). On the occasion of the fuel injection, a quantity of fuel supplied into the injection hole 21c and eventually a quantity of fuel (injection rate) injected from the injection hole 21c per unit time are varied according to the amount of upward displacement (lift amount) of the needle 21d in the axial direction. For example, when the needle 21d is seated (the lift amount=0), the fuel injection is stopped.

Now, the inside structure of the valve on the rear end side of the nozzle portion (injection portion) 21, that is, the inside structure of the valve body 22, will be described below. The valve body 22 includes a command piston 22e moving in conjunction with the nozzle needle 21d in the housing 22d forming the cylindrical contour of the valve body 22. The piston 22e is formed in a columnar shape having a larger diameter than that of the needle 21d and is linked with the needle 21d via a pressure pin 22f (connecting shaft). Like the needle 21d, the piston 22e slides inside the injector 20 in the axial direction. A space on the valve rear end side of the piston 22e is partitioned by a wall surface of the housing and a top surface of the piston 22e into a command chamber Cd. An inlet orifice 22g serving as a fuel inlet is provided to the command chamber Cd. That is, this allows the high pressure fuel from the common rail 12 to flow into the command chamber Cd through the inlet orifice 22g. In a space under the piston 22e, a leak passage 22h is provided to connect the space with a predetermined space of the driving portion 23 (specifically, a leak space connected with the fuel tank 10 by opening and closing an electromagnetic valve). The injector 20 is provided with such a leak passage 22h to return excessive fuel on the lower side of the piston 22e (for example, leak fuel or the like from the needle sliding portion) to the fuel tank 10.

The driving portion 23 is located on the further rear end side of the valve body 22. The driving portion 23 mainly includes a housing 23a forming a cylindrical contour. A two-way electromagnetic valve (TWV: Two Way Valve), which specifically includes an outer valve 23b, a spring 23c (coil spring), and a solenoid 23d, is disposed inside the housing 23a. The two-way electromagnetic valve is to open and close an outlet orifice 23e serving as a fuel outflow hole through an operation of the outer valve 23b. That is, when the solenoid 23d is not energized (in a de-energization state), an expansion force of the spring 23c (along the axial direction) urges the outer valve 23b so as to block the outlet orifice 23e. When the solenoid 23d is energized (the solenoid 23d becomes magnetized), the outer valve 23b is drawn against the expansion force of the spring 23c by a magnetic force to be displaced so as to open the outlet orifice 23e. A columnar return hole 23f (fuel return port) is provided on the rear end side of the driving portion 23 to return the fuel in the housing 23a to the tank. That is, in the injector 20, the return hole 23f is connected to the fuel tank 10 via a pipe 18 (see FIG. 1). A circuit for controlling energization of the driving portion 23 and a program or the like for performing injection control through the circuit are mounted on the ECU 30.

That is, the above ECU 30 controls energization/de-energization of the two-way electromagnetic valve mainly constituting the driving portion 23 in a binary fashion (through driving pulses), thereby rendering the lift amount of the nozzle needle 21d variable with the energization period. Thus, the high pressure fuel successively supplied from the common rail 12 to the tip end portion 21b through the fuel passage 22c is injected through the injection hole 21c.

Specifically, when the two-way electromagnetic valve (more specifically, the solenoid 23d) is in the de-energization (OFF) state, the outer valve 23b descends toward the valve tip end side to close the outlet orifice 23e. When in this state the high pressure fuel is supplied from the common rail 12 respectively to the tip end portion 21b and the command chamber Cd through the fuel passage 22c and the inlet orifice 22g, the command piston 22e having a larger diameter than that of the lower part of the needle 21d receives a force toward the valve tip end side according to a difference in area for receiving the pressure between the piston 22e and the needle 21d. This pushes down the piston 22e toward the valve tip end side, so the needle 21d urged toward the valve tip end side by the spring 22a blocks a fuel supply route (i.e., the needle is brought to a seated state). Thus, at the time of the de-energization, the fuel is not injected (normally closed). The excessive fuel under the piston 22e is returned to the fuel tank 10 through the leak passage 22h and the return hole 23f.

During the energization (ON), the outer valve 23b is attracted toward the valve rear end side by the magnetic force of the solenoid 23d to open the outlet orifice 23e. When the outlet orifice 23e is opened, the fuel in the command chamber Cd flows to the fuel tank 10 and the lower side of the piston 22e through the outlet orifice 23e, the return hole 23f, and the leak passage 22h. This outflow of the fuel decreases the pressure in the command chamber Cd and a force pushing down the piston 22e. Thus, the piston 22e is pushed up toward the valve rear end side together with the needle 21d integrated thereto. When the needle 21d is pushed up (lifted), the needle 21d separates from the seat to open the fuel supply route to the injection hole 21c. The high pressure fuel is supplied to the injection hole 21c, and then injected and supplied to a combustion chamber of the engine through the injection hole 21c.

The injector 20 has the area of a flow path of the fuel supply route to the injection hole 21c that is variable according to the lift amount of the needle 21d, so the injection rate is variable according to the flow path area. Parameters (energization period or fuel pressure) associated with the lift amount of the needle 21d are variably controlled to enable control of the injection rate and the injection quantity.

Various devices of the fuel supply system in the common rail type fuel injection system of this embodiment have been descried above. Turning again to FIG. 1, the description of the system construction will be continued below.

That is, in the system, various sensors for control of a vehicle are further provided in a vehicle not shown. For example, the crankshaft 41 serving as an output shaft of the engine is provided with a crank angle sensor 42 for detecting a rotation angle position, a rotational speed, or the like of the crankshaft 41 to output a crank angle signal at intervals of a predetermined crank angle (for example, in a cycle of 30° CA). An accelerator pedal not shown is provided with an accelerator sensor 44 for detecting an operation amount (ACCP) of the accelerator pedal by a driver (accelerator opening degree) to output an electric signal according to a state of the pedal (amount of displacement).

The part of the system for mainly performing engine control as an electronic control unit is the ECU 30. The ECU 30 includes a known microcomputer (not shown). The ECU 30 grasps an operation state of the engine and a request from the user based on detection signals from various sensors, and operates various actuators such as the injector 20 according to the engine operation state or the request grasped, thereby performing various types of control associated with the engine in the optimum manner according to each condition. The microcomputer mounted in the ECU 30 basically includes various computation devices, storage devices, and communication devices. For example, the microcomputer includes a CPU for performing various kinds of computation (basic processor), a RAM (Random Access Memory) serving as a main memory for temporarily storing therein data obtained during the computation, computation results, and the like, a ROM (Read Only Memory) serving as a program memory, and an EEPROM 32 (electrically rewritable non-volatile memory) serving as a data storage memory (backup memory). The microcomputer also includes a backup RAM (RAM energized by a backup power source, such as a vehicle-mounted battery), and an input-output port for inputting and outputting signals to and from an external section (including a section for serially capturing a sensor output or the like from the above pressure sensor 20a or the like). The ROM beforehand stores various kinds of programs and control maps associated with the engine control, including programs regarding learning of the fuel pressure. The memory for data storage (for example, EEPROM 32) stores various kinds of control data, including engine design data.

In the above-mentioned system associated with this embodiment, a correction coefficient according to each condition is serially learned (updated). This enables serial correction (feedback correction) of a control error caused by an individual difference between components (in particular, the injectors 20) used in the system, or an aging change in characteristics of the components.

Figure 3:
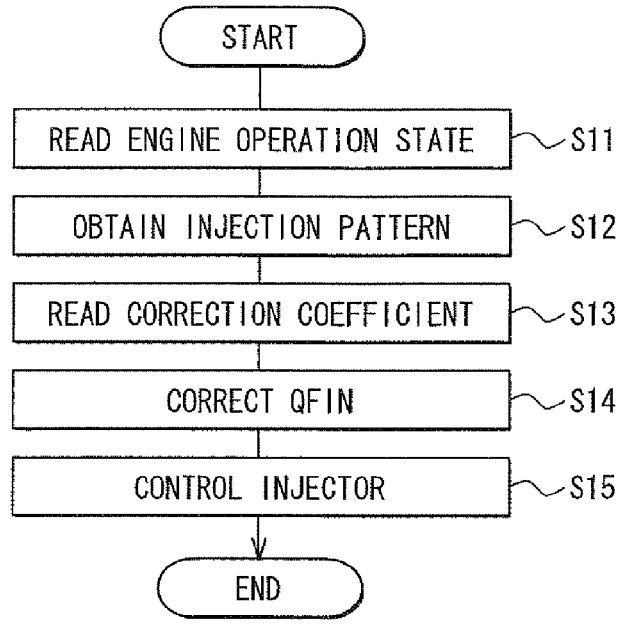
FIG. 3 is a flowchart showing a basic procedure of fuel injection control processing according to the embodiment.

Referring to FIG. 3, a basic procedure of fuel injection control according to this embodiment will be described below. Values of various parameters used in the processing as shown in FIG. 3 are stored in a storage device, such as the RAM, the EEPROM 32, or the backup RAM, which is mounted on the ECU 30 as needed. These values are then updated if necessary. A series of processing in each drawing is basically performed serially for each cylinder of the engine at every predetermined crank angle or in a cycle of a predetermined time by executing the program stored in the ROM by means of the ECU 30.

As shown in FIG. 39 in the series of processing, in step S11, first, various parameters indicative of an engine operation state, such as an engine speed (average rotational speed) or an engine load, are read in. In the following step S12, an injection pattern is set based on the engine operation state read in step S11 and an operation amount ACCP of the accelerator pedal by the driver (and if necessary, a required engine operation state is calculated independently). The injection pattern is obtained, for example, based on a predetermined map (which may be a mathematical formula) saved and stored in the above ROM. Specifically, for example, an optimal pattern (adapted value) regarding each engine operation state previously anticipated is determined by an experiment or the like, and then written in the map. Thus, the above-mentioned map represents a relationship between the engine operation state and the optimal pattern.

The injection pattern is defined by parameters, including, for example, the number of injection stages (the number of injection operations), injection timing, an injection period, an injection interval (an interval between the injection operations in the multiple injection) and the like. In the above step S12, the optimal pattern (adapted value) is set by the above-mentioned map so as to satisfy the required engine operation state according to the current engine operation state in each case (obtained in step S11). For example, the quantity of fuel injection (or the injection period) in the single-stage injection, or the total quantity of respective fuel injection operations in the multiple injection pattern is variable according to a required torque or the like. A command value QFIN (command signal INJ) with respect to the injector 20 is set based on the injection pattern. Thus, the above-mentioned pre-injection, pilot injection, after injection, post-injection, or the like is appropriately executed together with the main injection according to the condition of the vehicle.

In the following step S13, a correction coefficient separately updated in learning processing is read from the EEPROM 32, and then in step S14, a command value (command signal) corresponding to the injector 20 is corrected based on the read correction coefficient. In step S15, other command values regarding the number of injection stages, the injection timing, the injection period, and the injection interval are determined based on the corrected command value (command signal), and then driving of the injector 20 is controlled based on the respective determined command values.

Figure 4:
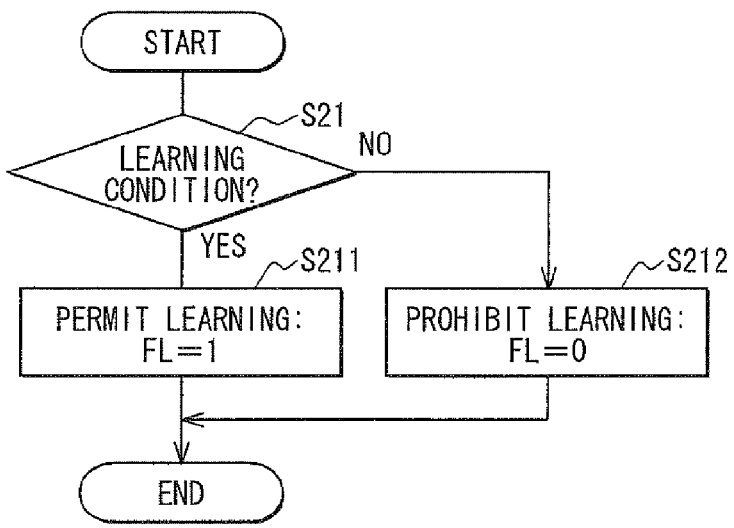
FIG. 4 is a flowchart showing a procedure of processing associated with an execution condition of learning processing according to the embodiment.
Figure 15:
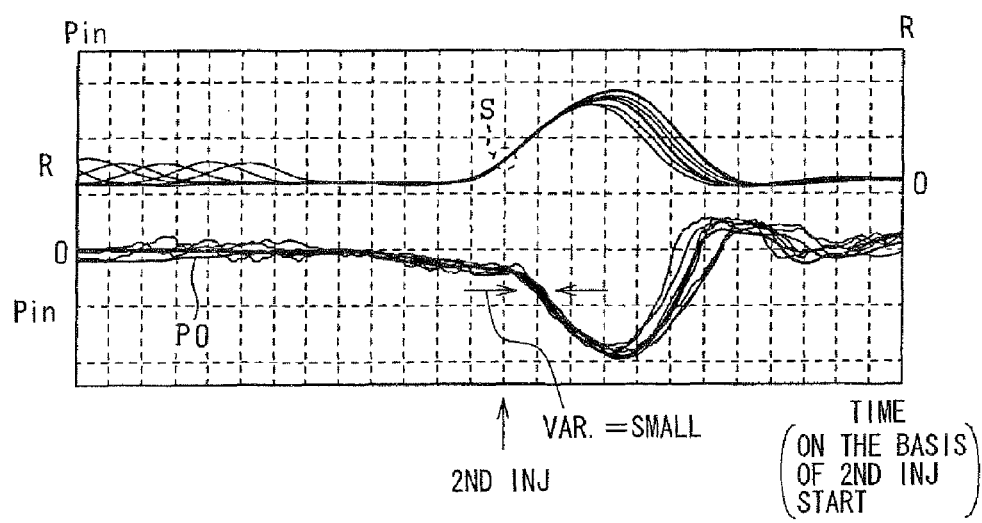
FIG. 15 is a time chart showing transitions of injection parameters concerning the device on the basis of injection start timing of a second stage injection according to the embodiment.
Figure 16:
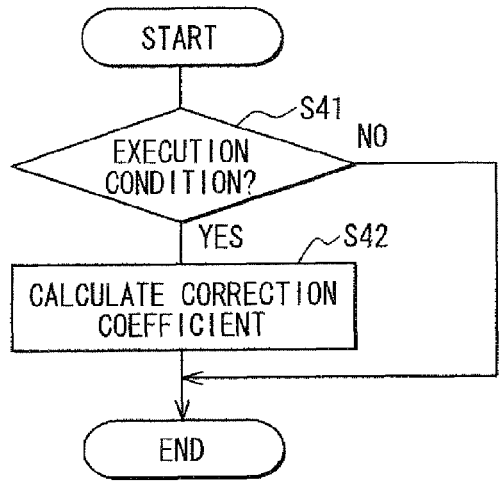
FIG. 16 is a flowchart showing contents of correction processing according to the embodiment.

Now, an embodiment of learning (updating) of the correction coefficient used in step S14 shown in FIG. 3 will be described in detail with reference to FIGS. 3 to 16. The values of various parameters used in a series of processing shown in FIGS. 4, 7, and 16 are also stored in the storage devices, including, for example, the RAM and EEPROM 32 mounted in the ECU 30, and the backup RAM, as needed. These values of the parameters are updated if necessary. The series of processing shown in each of these drawings is basically executed serially at a predetermined crank angle or in a cycle of a predetermined time (20 μsec in this embodiment) for the cylinder #1 provided with the pressure sensor 20a by executing the program stored in the ROM by means of the ECU 30.

The processing associated with learning (updating) of the correction coefficient performed by the fuel injection device (ECU 30) of this embodiment mainly includes the following learning processing and updating processing.

The learning processing involves obtaining serially sensor outputs from the pressure sensor 20a (see FIG. 1) at intervals of 20 μsec, thereby sensing and obtaining a pressure fluctuation (specifically, as a pressure transition waveform) regarding the pressure fluctuation caused by the injection operation and the actual injection (injection actually performed through the injection operation) of the injector 20 (in detail, see FIG. 2). The learning processing further involves storing the obtained pressure transition waveform in a predetermined storage device (the above-mentioned EEPROM 32) in relation to injection conditions including an injection pattern or the like in each time.

The correction processing involves updating the correction coefficient regarding the fuel supply (fuel injection), which is previously stored in a predetermined storage device (the above-mentioned EEPROM 32), based on the pressure transition waveform stored in the storage device in the above learning processing.

In this embodiment, adjustment of the fuel injection device (ECU 30) is performed in advance of the above learning processing. Specifically, the ECU 30 serially obtains a sensor output from the pressure sensor 20a to sense the pressure fluctuation caused by predetermined injection (executed in a plurality of types of injection patterns). The ECU 30 sequentially obtains the sensor outputs at different intervals and then plots these sensor outputs on a time axis thereby to obtain an interval for obtaining the sensor outputs, the interval being short enough to draw a track of a pressure transition waveform using the sensor outputs. And, the thus-obtained interval serves as the above-mentioned interval for obtaining the sensor outputs associated with the fuel injection device (ECU 30). The experiment by the inventors shows that the track of the pressure transition waveform can be grasped at intervals of about 50 μsec (and intervals shorter than this). In this embodiment, 20 μsec, which is more preferable in order to obtain precise data (data about the pressure fluctuation), is adopted as the interval for obtaining the sensor outputs (corresponding to an execution cycle of a series of processing as shown in FIG. 7). Basically, the shorter the interval for obtaining the sensor outputs, the more precise the data obtained.

Mainly referring to FIGS. 4 to 7, the above-mentioned learning processing will now be described in detail. FIGS. 4 and 7 are flowcharts showing procedures of the learning processing. Specifically, in the procedure shown in FIG. 4, it is determined whether an execution condition associated with the learning processing (learning execution condition) is satisfied or not. Only when the execution condition is satisfied, the learning processing which includes the series of processing shown in FIG. 7 is executed.

In the processing shown in FIG. 4, first, in step S21, it is determined whether each of the following conditions is satisfied or not.

One of the conditions is that a fuel pressure measured by the pressure sensor 20a (see FIG. 1) is in a predetermined range. The fuel pressure detected corresponds to a basic pressure value (base pressure value).

Another condition is that a fuel temperature is in a predetermined range. The fuel temperature is detected by the fuel temperature sensor 10c.

A further condition is that a command of fuel injection based on a predetermined injection pattern in the cylinder to be learned (cylinder #1) is outputted and the predetermined injection pattern is being executed, while an injection quantity (command value) is in a predetermined range (for example, equal to or less than a predetermined value).

A still further condition is that all sorts of sensors associated with the learning processing are normal.

It is determined whether the learning execution condition is satisfied or not based on results of determination in step S21. Specifically, in step S21, it is determined whether all conditions as described above are simultaneously satisfied or not. When all conditions are determined to be simultaneously satisfied in step S21, the execution condition is determined to be satisfied. In the following step S211, a learning permission flag FL is set to 1 (learning permission flag FL=1), which then terminates a series of processing shown in FIG. 4. On the other hand, when at least one of the above-mentioned conditions is determined not to be satisfied in step S21, the execution condition is determined not to be satisfied, and then the learning permission flag FL is set to 0 (learning permission flag FL=0) in step S212, which then terminates the series of processing shown in FIG. 4.

Figure 5:
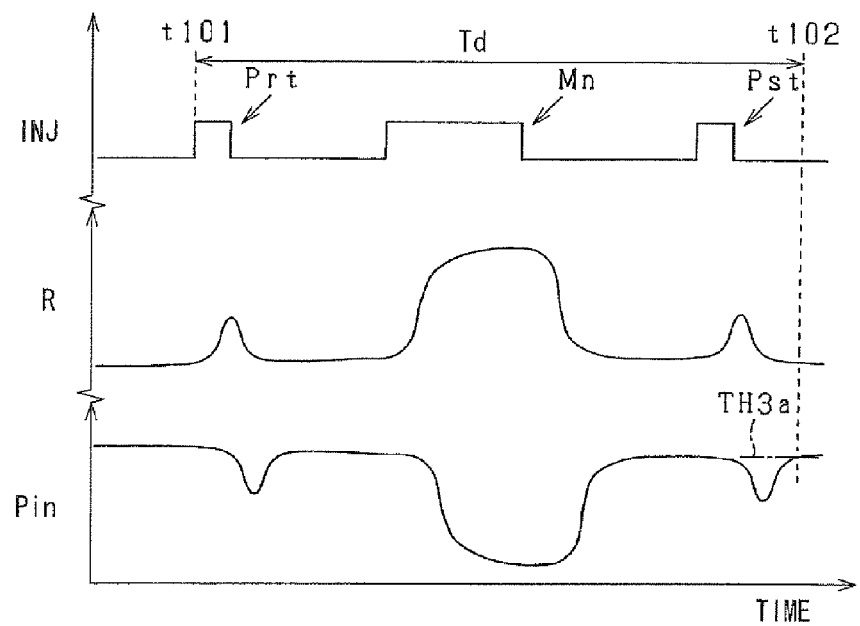
FIG. 5 is a time chart showing a setting mode of an execution period associated with the learning processing according to the embodiment.
Figure 6:
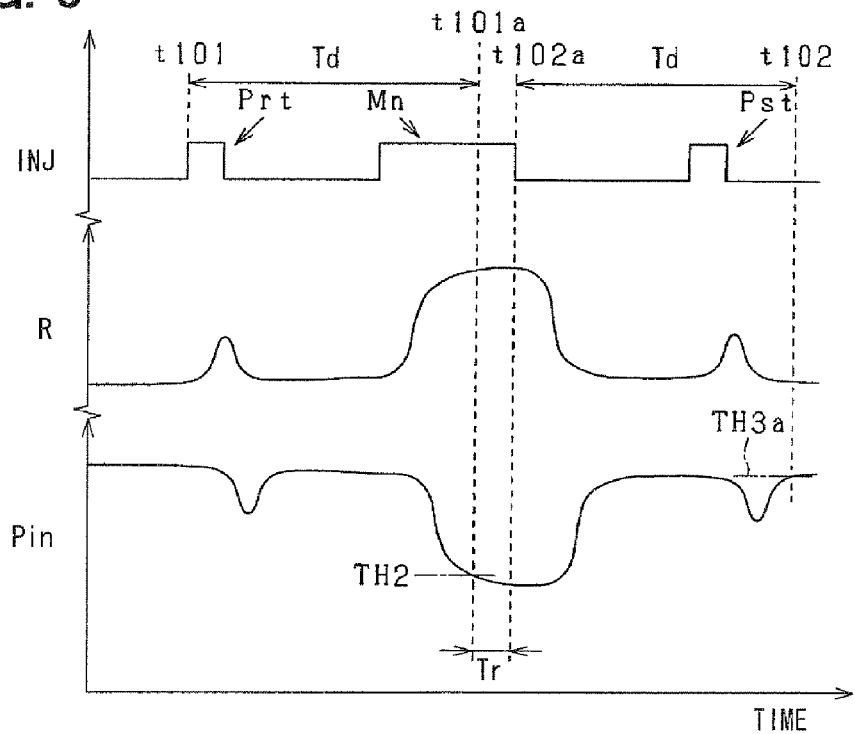
FIG. 6 is a time chart showing a setting mode of the execution period associated with the learning processing according to the embodiment.
Figure 7:
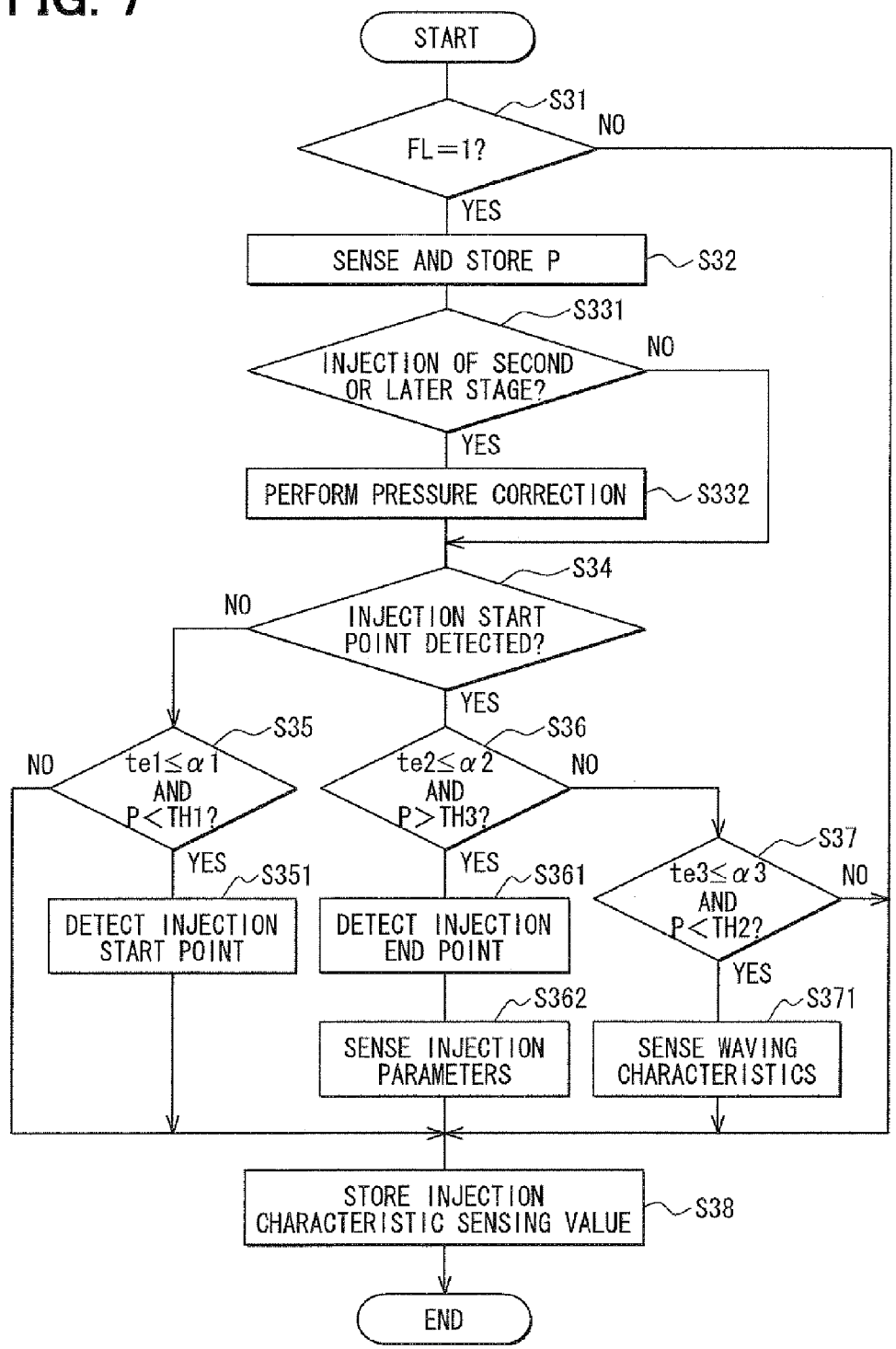
FIG. 7 is a flowchart showing contents of the learning processing according to the embodiment.

Referring now to FIGS. 5 and 6, an execution period and a setting mode associated with the processing shown in FIG. 7 set by the processing of FIG. 4 will be described. In FIGS. 5 and 6, "INJ" shows a time chart of the transition of an injection command signal (pulse signal) to the injector 20, "R" shows a time chart of a transition of an injection rate (a quantity of fuel injected per unit time), and "Pin" shows a time chart of the transition of the fuel pressure (inlet pressure) detected by the pressure sensor 20a (see FIG. 1).

As mentioned above, in this embodiment, the execution condition associated with the processing of FIG. 7 is that the injection pattern is being executed (step S21 in FIG. 4). That is, a period for serially obtaining the outputs from the pressure sensor 20a (sensor output obtaining period) through the processing shown in FIG. 7 is determined based on the determination of satisfaction of the execution condition. Specifically, as shown in FIG. 5, in this embodiment, a plurality of injections (for example, three-stage injection including the pilot injection Prt, the main injection Mn, the post-injection Pst as shown in FIG. 5) are performed by the injectors 20 in one combustion cycle of the engine. In setting a sensor output obtaining period (Td, in FIG. 5), start timing of the sensor output obtaining period Td (detection period) is set with respect to injection start command timing (timing t101) of the injector 20 (when the energization is started) instructed by an injection start command corresponding to the earliest injection (for example, the pilot injection Pd in FIG. 5) of the combustion cycle. Further, end timing (timing t102) of the detection period Td is set based on the pressure fluctuation after execution of the last injection (for example, the post-injection Pst in FIG. 5) in the cycle, more specifically, with respect to timing when the pressure fluctuation caused by the post-injection Pst converges (for example, the timing is detected based on a threshold TH3a). In this way, the above-mentioned detection period Td is limitedly set to a period at least from a start point of the pressure fluctuation by the pilot injection Prt to an end point of the pressure fluctuation by the post-injection Pst, that is, a predetermined interval (from timing t101 to timing t102) including a period during which the pressure fluctuation occurs due to the actual injection of the injector 20 (pressure fluctuation period).

Even in the thus-limited period, desired data (a waveform of the pressure fluctuation corresponding to the injection) can be basically obtained. It is because the part excluded by the limitation of the detection period Td is a period other than the period to be detected, that is, a period during which only unnecessary data is normally obtained (detected). Setting the detection period shorter in this way can decrease a processing load on the ECU 30 and a used storage area in the RAM.

In this embodiment, as shown in FIG. 6, a period (stopping period Tr from t101a to t102a) for temporarily stopping the obtaining operation of the sensor output is provided in at least a part of a period, in which the fuel pressure is stable (stable pressure period) at the position where the pressure sensor 20a is located, in the period (detection period Td) for serially obtaining the outputs of the pressure sensor 20a set in the above-mentioned mode. Specifically, when the lift amount of the nozzle needle 21d (see FIG. 2) of the injector 20 becomes sufficiently large and the sufficient high pressure fuel is supplied to the injection holes 21c (see FIG. 2), the injection rate R converges substantially to a constant value due to the injection limitation defined by the diameter of each of the injection holes 21c (an area of a fuel outlet). During this time, because of the stabilization of the injection rate R, the pressure detected by the pressure sensor 20a, that is, the fuel pressure in the fuel passage provided with the sensor 20a, is also stabilized. In this embodiment, start timing of such a stable pressure period (timing t101a) is detected based on the sensor output (pressure fluctuation) from the sensor 20a in each time, and thus the start timing of the stopping period Tr is set to the start timing t101a of the stable pressure period detected (strictly speaking, timing at which the start timing of the stable pressure period is established). Further, the end timing of the stopping period Tr is set to injection-end command timing for giving the injection end command to the injector 20 (timing t102a).

In this way, in this embodiment, by providing the stopping period from t101a to t102a, the above-mentioned detection period Td is further limited. Even in the thus-limited detection periods from t101 to t101a, and t102a to t102, the desired data (a waveform of the pressure fluctuation corresponding to the injection) can be basically obtained. It is because the part excluded by the limitation of the detection period Td is a period during which the fuel pressure is stable, and can be anticipated by an interpolation operation or the like based on the pressures before and after the stopping period Tr from t101a to t102a. Setting the detection period Td shorter in this way can further decrease a processing load on the ECU 30 and a used storage area in the RAM.

In the processing shown in FIG. 7, the pressure fluctuation regarding the pressure fluctuation caused by the injection operation and actual injection (injection actually performed through the injection operation) of the injector 20 is sensed and obtained during the thus-defined detection period Td. More specifically, a pressure value is serially detected by the pressure sensor 20a (see FIG. 1) of each time including a time close to the injection timing (each of start and ending timings) at intervals of 20 μsec. An injection start point, an injection end point, and the pressure fluctuation (waving characteristics) between the injection start point and the injection end point are sensed based on the pressure values serially detected at respective times.

Next, referring to FIG. 7, the processing will be described below in detail. As shown in FIG. 7, in step S31 of a series of processing, first, it is repeatedly determined whether the learning execution condition is satisfied or not, that is, whether the learning permission flag FL is set at 1 or not until the learning execution condition is satisfied (step S21 of FIG. 4) is satisfied. When the learning permission flag FL is set to 1 in the series of processing of FIG. 4 and the learning permission flag FL is determined to be set at 1 in step S31, the procedure proceeds to next step S32.

In the following step S32, the sensor output is captured from the pressure sensor 20a (see FIG. 1), and then a pressure P at that time is measured. The measurement timing and measured pressure value P are saved (stored) in the EEPROM 32 in relation to the injection condition. The measurement timing and measured pressure value P are obtained for a predetermined cylinder #1 among four cylinders and are managed so that the cylinder (cylinder No. #1) is identifiable. It is effective to set various kinds of information associated with the injection as the object of the learning (information defined by the map used in step S12 of FIG. 3, for example, and a basic pressure (base pressure) or the like as of the injection detected in step S21 of FIG. 4) as the injection conditions related to each data (measurement timing and measured pressure value P).

In the following step S331, it is determined whether or not the injection as the object of the learning is a second or later stage injection in the injection pattern to which the injection belongs. When the injection as the object of the learning is determined not to be the second or later stage injection (but to be the first stage injection) in step S331, it is determined whether or not the injection start point of the injection as the object of the learning is already detected in step S34. For example, since the injection start point is not detected when the driving of the injector 20 is started, the injection start point is determined not to be detected in step S34, and the procedure proceeds to next step S35.

Figure 8:
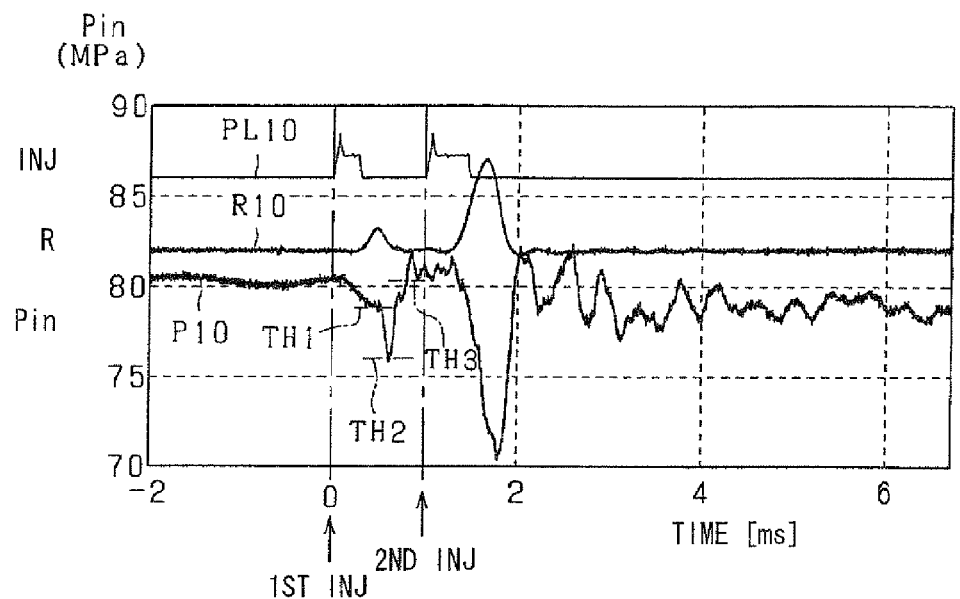
FIG. 8 is a time chart showing transitions of injection parameters according to the embodiment.

Now, referring to FIG. 8 in addition to FIG. 7, the processing will be described in detail. FIG. 8 is a time chart showing the pressure transition at a time near an injection timing of the injection as the object of the learning. In FIG. 8, solid lines PL10, R10, and P10 show a transition of the injection command signal INJ (pulse signal) to the injector 20, a transition of the injection rate R (a quantity of fuel injected per unit time), and a transition of the fuel pressure Pin (inlet pressure) detected by the pressure sensor 20a (see FIG. 1) respectively.

For example, in start of the driving of the injector 20, after the above-mentioned step S34 (see FIG. 7), in step S35, it is determined whether or not a period te1 after the driving start of the injector 20 is equal to or less than a predetermined period α1 (for example, which is variable depending on the quantity of injected fuel), and whether or not the pressure value P at each time detected in the previous step S32 is smaller than a threshold TH1 (pressure P<threshold TH1). In a case where the above-mentioned condition is determined not to be satisfied in step S35, the series of processing shown in FIG. 7 is once ended. Then, if the above learning execution condition is still satisfied, the processes of the steps S31 to S34 are performed again and then it is determined whether the above-mentioned condition is satisfied or not in step S35. While the learning execution condition is satisfied, the determination of satisfaction of the above condition is repeatedly determined in step S35.

Specifically, as shown in FIG. 8, rise timing of the injection command pulse INJ of the first-stage injection indicated by the solid line PL10 (near the first-stage injection at 0 msec) corresponds to the driving start time of the injector 20. The predetermined threshold TH1 used in the step S32 is, for example, a threshold TH1 indicated by a dashed line in FIG. 8. As indicated by the solid line P10 in FIG. 8, the pressure transition after the driving start time of the injector 20 (pressure transition waveform) mainly has a trend that a short period of the unchanged pressure occurs first, and then, the pressure P is gradually decreased, and then the pressure P is drastically decreased at certain timing.

The first unchanged pressure period and the period of the gradual decrease of the pressure correspond to an invalid injection period (invalid injection period) of the injector 20. Specifically, the invalid injection period is a total delay of various kinds of delays including a delay from an energization time (rise time of the injection command pulse) to a time when a normal magnetic field is formed by the solenoid 23 (see FIG. 2) and a delay of operations due to an inertia of the outer valve 23b and the nozzle needle 21d (see FIG. 2), an inertia of fuel and friction or the like against an inner wall surface of the nozzle, and the like. In short, the invalid injection period corresponds to a period from the time when the driving (energization) of the injector 20 is started to the time when the fuel is actually injected. During a period after the unchanged pressure interval in the invalid injection period, the pressure P is gradually decreased. This indicates that a pressure leak occurs due to the injection operation of the injectors 20. Specifically, this is because the injector 20 is an injection valve causing the pressure leak during a period from the time when an operation relating to the injection is started to the time when the injection is actually started. More specifically, as mentioned above, in energization (ON) of the injector 20, the outlet orifice 23e is opened to allow the fuel in the command chamber Cd to return to the fuel tank 10 in order to drive the needle 21d. For this reason, the fuel pressure by the common rail 12 leaks through the inlet orifice 22g and the outlet orifice 23e (see FIG. 2) during the injection operation of the injector 20. The decrease in the pressure at this time corresponds to the gradual decrease in the pressure P (pressure leak) during the invalid injection period. A pressure decrease point at which the pressure P starts decrease drastically corresponds to timing at which the injection is actually started through the injector 20, that is, an injection start point.

The above-mentioned threshold TH1 is to detect the injection start point, and for example, is set to a pressure value indicative of the injection start point (a value near a pressure value at which the pressure starts decrease drastically) based on an adapted value previously determined by an experiment or the like. The pressure value indicative of the injection start point, however, varies depending on types and individual differences of the injectors. In order to detect the injection start point with high accuracy, the threshold TH1 should be preferably set to an optimal value for each of the injectors (or for each type). The injection start point is not necessarily detected directly from the threshold TH1. Alternatively, predetermined timing near the injection start point may be detected using the threshold TH1, and then the injection start point may be detected indirectly based on the detected predetermined timing.

Then, when the pressure value P detected in each time by the pressure sensor 20a falls below the threshold TH1 as a result of an elapse of time after the injection, the above-mentioned condition is determined to be satisfied in the previous step S35. Then, the procedure proceeds to next step S351. In step S351, timing at which the pressure value P measured in each time by the pressure sensor 20a (pressure transition waveform P10 in FIG. 8) falls below the threshold TH1 is detected based on the pressure values P stored serially in the previous step S32. In the following step S38, the timing (injection characteristic sensing value) is saved (stored) in the EEPROM 32 as the injection start point corresponding to the injection as the object of the learning. Also, in this case, the sensing value (injection start point) is stored in relation to the injection condition (for example, information similar to information defined by the map used in step S12 of FIG. 3, or the base pressure or the like as of the injection).

In this embodiment, after the detection of the injection start point, an injection rate in each time is obtained (calculated) based on the pressure value P (pressure transition waveform P10 in FIG. 8) detected in each time by the pressure sensor 20a in step S32. Specifically, a pressure value as of detection of a pressure drop point (threshold TH1) is set as the reference pressure value (for example, zero point). The injection rate R is determined to be larger as the measured pressure value P at the time is smaller.

Thus, by detecting the pressure fluctuation as of the injection, the injection rate of the injection can be determined appropriately. Moreover, with such the scheme, the injection rate can be directly grasped not as the time differential value of the sensor output (estimated value) but as the sensor output (measured pressure value) of the pressure sensor 20a, so sufficient detection accuracy is obtained.

Figure 9:
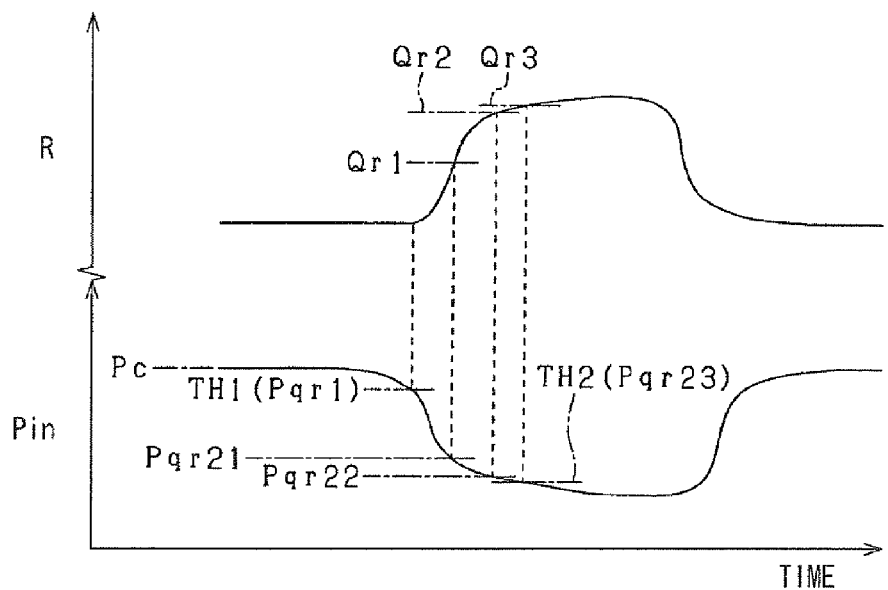
FIG. 9 is a time chart showing a calculation mode of an injection rate according to the embodiment.

Referring to FIG. 9, a calculation mode of the injection rate R will be described. FIG. 9 is a time chart showing the transition of the injection rate R and the transition of the fuel pressure Pin (inlet pressure) detected by the pressure sensor 20a (see FIG. 1). As shown in FIG. 9, in this example, a pressure value Pqr1 at the time when the pressure drop point is detected, that is, a pressure value Pqr1 detected with the threshold TH1, is set as the reference. While the reference pressure value Pqr1 is fixed, injection rates Qr1, Qr2, Qr3, etc. at respective times are serially obtained based on a divergence (difference, a ratio or the like) between the reference pressure value Pqr1 and the pressure values Pqr21, Pqr22, Pqr23, etc. measured at the respective times by the pressure sensor 20a. More specifically, the injection rates Qr1, Qr2, Qr3, etc. at the respective times are obtained based on a relational expression of "Qr (Pqr2−Pqr1)×Kp" using a predetermined correction coefficient Kp (by substituting Qr1, Qr2, Qr3, etc. into Qr in turn, and by substituting Pqr21, Pqr22, Pqr23, etc. into Pqr2 in turn). The pressure value Pqr1 corresponds to a pressure value immediately before the pressure drop start point due to the actual injection of the injector 20, that is, the pressure value at the end timing of the above invalid injection period. The detection timing of the pressure value Pqr1 corresponds to the injection start point (injection start timing) as mentioned above. The correction coefficient Kp is variably set according to the pressure value Pqr1 with the use of an appropriate program based on a predetermined map (or a mathematical formula) stored in the ROM or the like of the ECU 30, for example. Here, a map, in which an adapted value (optimal value) of the correction coefficient Kp is beforehand written for each pressure value Pqr1 (or a range thereof through experiments or the like, may be used.

Next, a detection principle will be described in detail with reference to FIG. 10. The inlet pressure Pin detected at each time by the pressure sensor 20a (see FIG. 1) is decided by inflow-outflow of the fuel quantity per unit time in the injector 20. Specifically, the inlet pressure Pin is calculated by subtracting the decrease in the pressure due to consumption of the fuel from the increase in the pressure due to supply of the fuel. The quantity of fuel supplied to the injector 20 per unit time is determined by a rail pressure Pc (pressure in the common rail 12) and is substantially constant. The quantity of the fuel consumed by the injector 20 per unit time corresponds to the above-mentioned injection rate R. That is, when there is no consumption or leak of the fuel due to the injection, the pressure value Pin measured by the pressure sensor 20a indicates the rail pressure Pc. When there is no fuel consumption but there is the fuel leak due to the injection, the pressure value Pin measured by the pressure sensor 20a (corresponding to the pressure value Pqr1) can be calculated by subtracting the decrease in the pressure due to the fuel leak from the common rail pressure Pc. When there is the fuel leak as well as the fuel consumption due to the injection, the pressure value Pin measured by the pressure sensor 20a (corresponding to the pressure values Pqr21 to Pqr23) can be calculated by subtracting the decrease in the pressure due to the fuel injection and the fuel leak from the common rail pressure Pc, Based on these relations, the decrease in the pressure only due to the fuel injection in the case where fuel consumption due to the injection occurs can be calculated. That is, the pressure decrease only due to the fuel injection can be obtained from a difference between the value obtained by subtracting the pressure decrease due to the fuel injection and the fuel leak from the common rail pressure Pc and the value obtained by subtracting the pressure decrease due to the fuel leak from the common rail pressure Pc, that is, from a value "Pqr2–Pqr1" (Pqr2 is Pqr21, Pqr22, Pqr23, etc.). Thus, by converting the pressure decrease only due to the fuel injection at respective times into the injection rates (fuel quantity injected per unit time) with the use of the correction coefficient Kp, the injection rates Qr1, Qr2, Qr3, etc. at the respective times can be obtained.

Thus, in this embodiment, the injection rate R at each time is calculated. When the thus-obtained injection rate R is small with respect to a driving period (energization period) of the injector 20, it is determined that an abnormality (for example, injector clogging) occurs. When the abnormality is determined, a diagnosis code indicative of the abnormality is set, or a warning light is lit as an alarming process for a driver or the like.

Returning to FIG. 7, the processing will be described. After the injection start point is detected, it is determined that the injection start point has been already detected in the previous step S34. In following step S36, it is determined whether or not a period te2 after the timing (injection start point) detected in the previous step S351 is equal to or less than a predetermined period α2 (for example, which is variable depending on the fuel injection quantity), and whether or not the pressure value P at each time detected in the previous step S32 is larger than a threshold TH3 (pressure P>threshold TH3). Normally, during a certain period immediately after the detection of the injection start point, the drastic decrease in the pressure as mentioned above continues, and the above-mentioned condition is determined not to be satisfied in step S36. Thus, the procedure proceeds to step S37. In step S37, it is determined whether or not a period te3 after the timing (injection start point) detected in the step S351 is equal to or less than a predetermined period α3 (for example, which is variable depending on the fuel injection quantity), and whether or not the pressure value P at each time detected in the previous step S32 is smaller than a threshold TH2 (pressure P<threshold TH2). In a case where the above-mentioned condition is determined not to be satisfied in step S37, the series of processing shown in FIG. 7 is ended once. After that, if the above learning execution condition is still satisfied, the processes of the steps S31 to S34 are performed again, and then it is determined whether the above-mentioned condition is satisfied or not in step S36 or S37. While the learning execution condition is satisfied, the determination of satisfaction of the above condition is repeatedly performed in step S36 or S37.

Specifically, in this embodiment, the predetermined thresholds TH3, TH2 used in the above-mentioned steps S36, S37 are threshold values TH3, TH2 represented by, for example, dashed lines in FIG. 8. As indicated by the solid line P10 in FIG. 8, the pressure transition after the injection start point (pressure transition waveform) mainly has a trend that the pressure P (Pin in FIG. 8) changes from the above-mentioned drastic pressure drop state to an increasing state through the pressure local minimum point. Then, the pressure continues to increase drastically and reaches the pressure value before the injection (a zero cross point). After that, the pressure ripples near the pressure value before the injection.

The above-mentioned pressure local minimum point corresponds to timing at which the injection rate R is the maximum. The above-mentioned zero cross point at which the current pressure value intersects the pressure value before the injection corresponds to timing at which the injection by the injector 20 is stopped, that is, an injection end point. As shown in FIG. 8, in the injector 20, a delay occurs from power interruption (decay edge of the injection command pulse INJ) to the injection end point also in the injection end, like the invalid injection period in the injection start time.

The above-mentioned thresholds TH2, TH3 are to detect the respective timings (the maximum injection rate point and the injection end point) and are set based on adapted values previously determined by, for example, experiments or the like, like the threshold TH1 as described above. Furthermore, like the threshold TH1, these thresholds TH2, TH3 should be preferably set to the optimal values for each injector (or for each type thereof) or should be preferably set to enable indirect detection of the respective timings.

That is, in this example, the pressure value at each time detected by the pressure sensor 20a falls below the threshold TH2 as a result of the elapse of time. Thus, the above-mentioned condition is determined to be satisfied in step S37, and then the procedure proceeds to step S371. In step S371, timing at which the pressure value of each time measured by the pressure sensor 20a falls below the threshold TH2 (pressure drop point) is detected based on the pressure values or the like serially stored in step S32. In the following step S38, the timing (injection characteristic sensing value) is saved (stored) in the EEPROM 32 as waving characteristics associated with the injection as the object of the learning (the pressure fluctuation caused by the predetermined injection from the injection start point to the injection end point). Also in this case, the sensing values (waving characteristics) are stored in relation to the above-mentioned injection conditions (information similar to information defined by the map used in step S12 of FIG. 3, the basic pressure as of the injection, or the like).

After a further elapse of time, then, the pressure increases from the pressure local minimum point, so the pressure value of each time detected by the pressure sensor 20a exceeds the threshold TH3. Thus, the above-mentioned condition is determined to be satisfied in step S36, and then the procedure proceeds to next step S361.

In step S361, timing at which the pressure value of each time measured by the pressure sensor 20a exceeds the threshold TH3 (pressure rise point) is detected based on the pressure values or the like serially stored in the previous step S32. This timing corresponds to the injection end point corresponding to the injection as the object of the learning.

In the following step S362, injection parameters other than the above-mentioned various timings (the injection start point, the injection end point, and the like) are sensed based on the pressure values or the like stored serially in the previous step S32. Specifically, an injection period is calculated based on the above-mentioned injection start point and injection end point. Based on the timing at which the pressure value falls below the threshold TH2 (pressure local minimum point), the pressure value at that time is detected. The pressure value at the minimum pressure point relates to the maximum value of the injection rate R. Accordingly, the pressure value can be used for estimation, correction, and the like of the injection quantity (time integral of the injection rate), for example. Furthermore, the injection quantity is estimated and corrected based on the injection period and the pressure value of each time measured by the pressure sensor 20a. Specifically, the injection rate is estimated based on the pressure value of each time measured by the pressure sensor 20a and multiplied by the injection period, thereby calculating (estimating) the injection quantity.

In the following step S38, the injection end point and the injection parameters (injection characteristic sensing values) respectively detected in the steps S361 and S362 are saved (stored) in the EEPROM 32. Also, in this case, these values (the injection end point and the injection parameters) are stored in relation to the injection conditions (information similar to information defined by the map used in step S12 of FIG. 3 and the basic pressure or the like as of the injection).

When the thresholds TH1 to TH3 are not detected in the steps S35 to S37, predetermined processing for each case is performed. For example, when a predetermined period elapses while the threshold TH1 is not detected in step S35, it is determined that a predetermined pressure drop point is not detected and the system is in a no-injection state. In order to halt learning of the injection pattern, the learning permission flag FL is set to 0 (learning permission flag FL=0), and then the threshold TH1 is shifted to a value which can be detected more easily, that is, to a higher pressure value. Likewise, also when a predetermined period elapses while the thresholds TH2 and TH3 are not detected in steps S36 and S37, the learning flag FL is set to 0, and these thresholds TH2 and TH3 are shifted to values which can be detected more easily. That is, the threshold TH2 is shifted to a higher pressure value, and the threshold TH3 is shifted to a lower pressure value. When the thresholds TH1 to TH3 exceed a predetermined range by the above shifting, a predetermined failsafe processing is performed. The failsafe processing includes, for example, setting an alternative value (a default value or a previous value) to the injection start point or the injection end point, setting a diagnosis code indicative of occurrence of the abnormality, and lighting a warning light as the alarming process to the driver or the like.

A second-stage injection next to the first-stage injection is performed after a further elapse of time. Specifically, the timing of rise of the injection command pulse of the second-stage injection indicated by the solid line PL10 in FIG. 8 (the second-stage injection near 1 msec) corresponds to the driving start time of the injector 20 in the second-stage injection. This injection is the next object of the learning.

Thus, in the previous step S331, the injection as the object of the learning is determined to be the second or later stage injection in the predetermined injection pattern. Thereafter, in the following step S332, predetermined pressure correction processing is performed. Then, the following processing is performed in step S34 and the following steps thereof.

Specifically, in step S332, first, a pressure transition waveform corresponding to the injection pattern including the previous stage injection (in this example, the single injection as described above) is selected from among a plurality of kinds of pressure transition waveforms (reference pressure transition waveforms) stored in the predetermined storage device (EEPROM 32) based on the injection pattern of up to the injection as the object of the learning (in this example, the second-stage injection). Then, based on the selected pressure transition waveform, a predetermined value according to the timing is subtracted from the pressure value of each time detected in step S32.

Figures 10, 11:
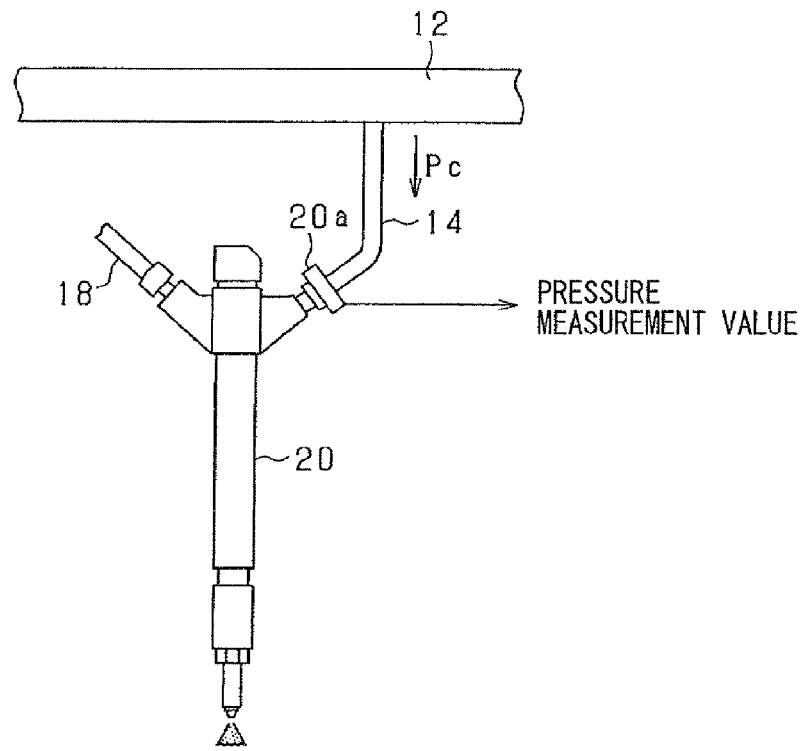
FIG. 10 is a diagram showing a sensing principle of the injection rate according to the embodiment.
FIG. 11 is a table showing an example of a reference pressure transition waveform used in the learning processing according to the embodiment.

Specifically, for example, as shown in FIG. 11, the plurality of kinds of reference pressure transition waveforms are stored in the table relating elapsed times (timings) from the last stage injection of the injection pattern to respective predetermined pressure values. The table is made by previously measuring the pressure transition waveform for each kind of injection pattern by experiments or the like.

In step S332, based on such a reference pressure transition waveform (for example, a waveform defined by the table), a difference value between the pressure value of each time detected in step S32 and a pressure value in the table corresponding to the detected value (a pressure value corresponding to an elapsed time from the single-stage injection as mentioned above) is serially calculated in a cycle of 20 sec which is an execution cycle of the series of processing. In the following steps (including step S34), various kinds of injection characteristics are sensed by the above-mentioned respective processing, like the first-stage injection which is the previous stage. When a data interval in the table is large (data is rough) and there is no corresponding pressure value in the table, it is effective to add a lacking value by appropriate interpolation between data points.

In this embodiment, such a processing by the fuel injection device (ECU 30) can obtain a difference value between the pressure transition waveform due to the injection pattern of up to the second stage in the injection pattern including the injection as the object of the learning and the predetermined reference pressure transition waveform (see FIG. 11) corresponding to the injection pattern of up to the previous stage in the same injection pattern (in this example, the injection pattern of the single-stage injection). The use of such a difference value enables accurate determination of the pressure fluctuation caused by only the second-stage injection, which corresponds to the last stage injection in this injection pattern. The difference value is serially calculated at short intervals corresponding to a pressure change (in a cycle of 20 μsec). Thus, the difference value is obtained with high synchronism (in real time).

Figure 12:
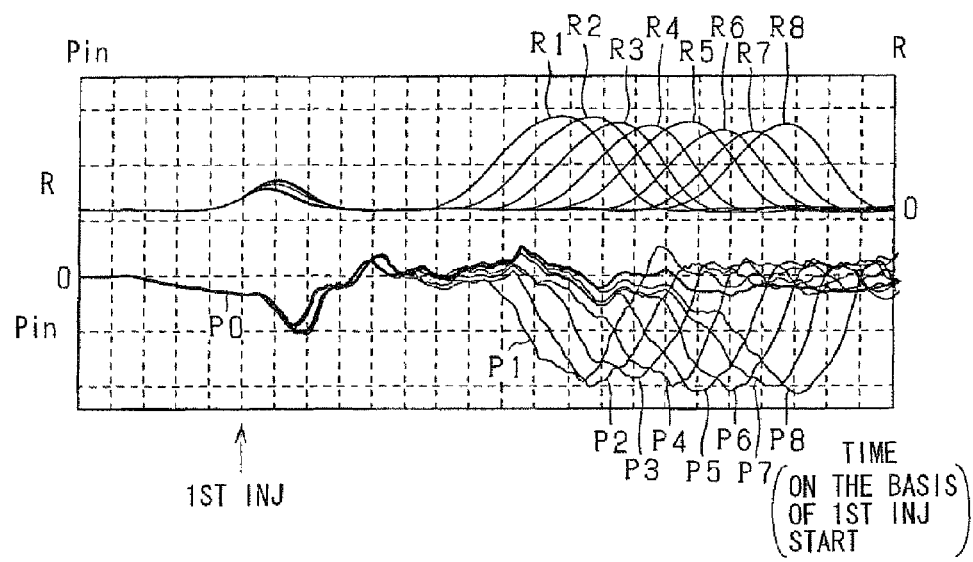
FIG. 12 is a time chart showing transitions of injection parameters on the basis of injection start timing of a first stage injection concerning a comparison example.
Figure 13:
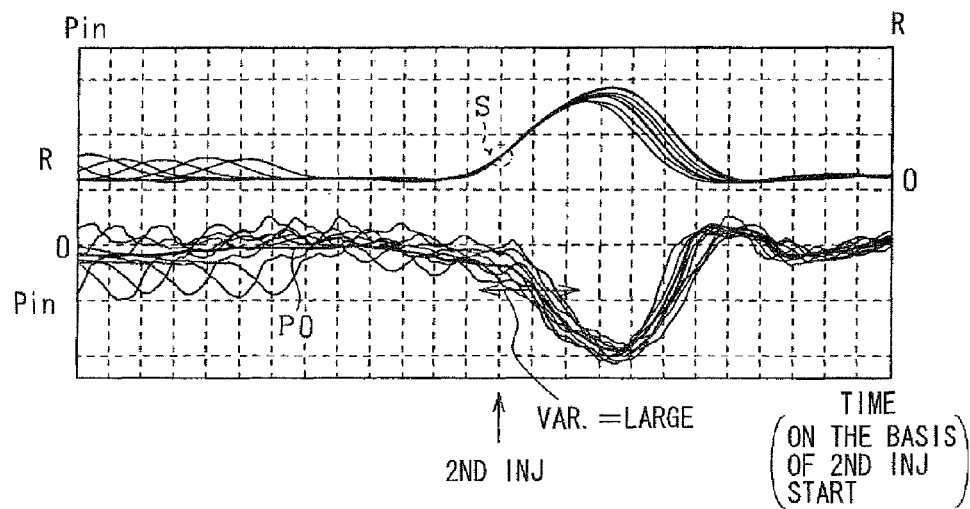
FIG. 13 is a time chart showing the transitions of the injection parameters on the basis of injection start timing of a second stage injection concerning the comparison example.
Figure 14:
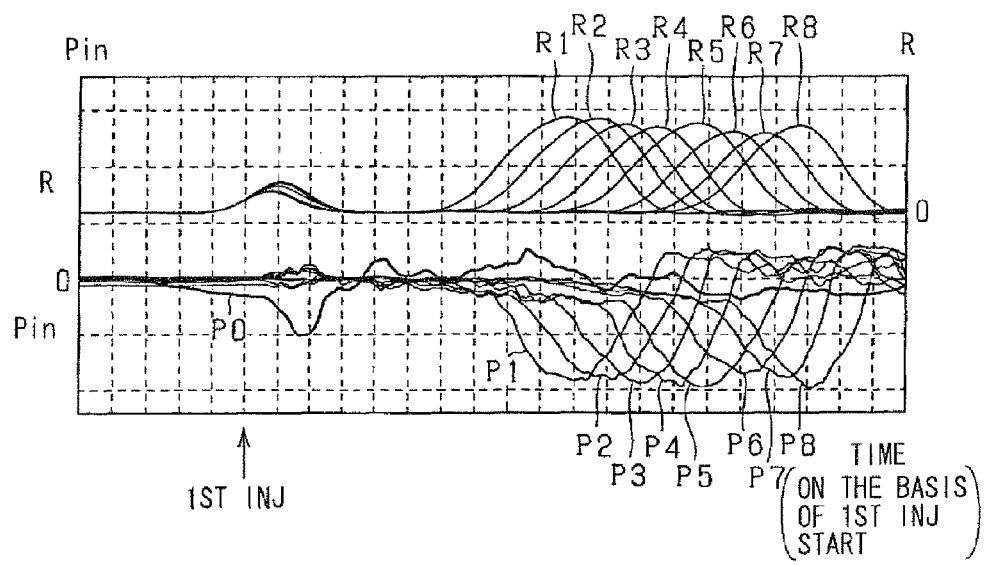
FIG. 14 is a time chart showing transitions of injection parameters concerning the device on the basis of injection start timing of a first stage injection according to the embodiment.

Effects of the pressure correction processing will be described below in detail with reference to FIGS. 12 to 15. FIGS. 12 to 15 are time charts showing pressure transition before and after the pressure correction processing is performed for injections (second-stage injections) having different injection intervals. FIGS. 12 and 13 show the pressure transitions before the pressure correction processing, and FIGS. 14 and 15 show the pressure transitions after the pressure correction processing. Each of these drawings shows an example of results obtained through experiments and simulation by the inventors.

This example has a relationship shown in FIG. 12 between the injection rates R of the injections (injection rate transition waveforms R1 to R8) having the different injection intervals and pressure fluctuations (pressure transition waveforms P1 to P8) of the fuel pressures Pin (inlet pressures) due to the injections before performing the pressure correction processing (step S332). In FIG. 12, each waveform is shown on the basis of the first-stage injection start timing. The solid line P0 shown in FIG. 12 represents a pressure transition waveform (corresponding to the reference pressure transition waveform) in the case where the injection in the injection pattern consisting of only the single-stage injection is performed.

FIG. 13 is a time chart showing waveforms shown in FIG. 12 on the basis of the second-stage injection start timing. S in FIG. 13 represents an injection rate at the second-stage injection start timing. As shown in FIG. 13, variations (VAR. in FIG. 13) among the pressure transition waveforms P1 to P8 due to the injections having the difference intervals are large before the pressure correction processing (step S332).

After performing the pressure correction processing (step S332), this example has a relationship shown in FIG. 14 between the injection rates R of the injections (injection rate transition waveforms R1 to R8) having the different injection intervals and the pressure fluctuations (pressure transition waveforms P1 to P8) of the fuel pressures Pin (inlet pressures) due to these injections. Each waveform shown in FIG. 14 corresponds to a waveform of the difference value obtained by serially performing subtraction between the corresponding values of the pressure transition waveform of the injection pattern of up to the second-stage injection and the predetermined reference pressure transition waveform (see FIG. 11) corresponding to the single-stage injection which is the previous stage. In FIG. 14, each waveform is shown on the basis of the first-stage injection start timing like FIG. 12.

As shown in FIG. 14, if the pressure correction processing is performed, the respective waveforms R1 to R8 and P1 to P8 shown in FIG. 12 change. The difference between the waveforms after the correction has a relationship shown in FIG. 15, in which the waveforms are shown on the basis of the second-stage injection start timing. As shown in FIG. 15, the experiment by the inventors shows that execution of the pressure correction processing (step S332) decreases the variations among the pressure transition waveforms P1 to P8 due to the injections having the different intervals.

By performing the pressure correction processing, even when variations exist in injection intervals between the previous and present stage injections, variations in pressure fluctuation due to the different injection intervals can be restrained. Since the variations in the pressure fluctuation are restrained, a highly reproducible value (value with less variation at each time) is obtained as the pressure fluctuation caused by the injection as the object of the learning (in this example, the second-stage injection).

When all injections included in the injection pattern as the object of the learning are finished in this way, the learning permission flag FL is set to 0 through the processing shown in FIG. 4, and the series of processing shown in FIG. 7 is not executed. If next injection is performed (in step S15 shown in FIG. 3), the learning permission flag FL is set to 1 again through the processing shown in FIG. 4, and thus the series of processing shown in FIG. 7 is executed. In this embodiment, by repeatedly executing such processing, the injection characteristics as described above are obtained and stored for each injection. Although the injection pattern of two-stage injection is taken as an example, an injection pattern of single-stage injection, or three or more stage injection is basically subjected to the same processing as described above. Note that the injection pattern of the single-stage injection is not subjected to the processing in step S332. On the other hand, in the injection pattern of three or more stage injection, when the injection as the object of the learning is nth stage injection, a reference pressure transition waveform corresponding to the injection pattern of up to (n−1)th stage injection (i.e., injection of the stage immediately preceding the nth injection) is read out from the EEPROM 32, and thus the above-mentioned subtraction processing is performed for the nth stage injection. That is, when the injection as the object of the learning is the second stage injection, the reference waveform corresponding to the injection pattern of up to the first stage is read out. Similarly for the third-stage injection, the reference waveform corresponding to the injection pattern of up to the second-stage injection is read out. Likewise, for the fourth stage injection, the reference waveform corresponding to the injection pattern of up to the third stage injection is read out. In this way, the corresponding reference pressure transition waveform for each injection is read from the EEPROM 32, and thus the above-mentioned subtraction processing is performed.

Mainly referring to FIG. 16, the above-mentioned correction processing will be described below FIG. 16 is a flowchart showing a procedure of the correction processing. As shown in FIG. 16, in step S41 in a series of processing, first, it is determined whether or not a predetermined execution condition is satisfied. Based on the satisfaction of the condition, the procedure proceeds to step S42. This execution condition can be set arbitrarily. In this example, the execution condition is that learning about one injection pattern is completed, that is, data (the above-mentioned injection characteristic sensing value) for use in correction (updating of a correction coefficient) is saved in the EEPROM 32. In this embodiment, every time the learning of each injection pattern is completed, the correction processing in step S42 following step S41 is executed.

In step S42, the learned data is read from a memory area corresponding to a cylinder number (#1). Based on the above injection condition (the injection pattern, the base pressure as of the injection, and the like) relating to the data (injection characteristic sensing value), a correction coefficient corresponding to the injection condition (correction coefficient to be used in step S14 in FIG. 3) among correction coefficients stored in the EEPROM 32 is updated (changed). The supply of fuel (fuel injection) is performed to the cylinder #1 based on a command value corrected by the correction coefficient. If necessary, correction coefficients associated with other cylinders #2 to #4 are updated (changed) based on the correction coefficient associated with the cylinder #1.

As mentioned above, in this embodiment, the injection characteristics in the respective times including an aging change in characteristics, specifically, the pressure fluctuations (waving characteristics) caused by the predetermined injection, are learned serially by the learning processing shown in FIG. 7. By executing the correction processing shown in FIG. 16, a predetermined correction coefficient is updated based on the learned value (injection characteristics), while performing the correction concerning the fuel injection using the correction coefficient in steps S13 and S14 shown in FIG. 3. In this way, the correction processing (see FIG. 16) and the learning processing (see FIG. 7) are performed alternately and repeatedly. Thus, in this embodiment, the correction coefficients in the respective times can be obtained as the injection characteristics in the respective times concerning the fuel supply system. The use of the correction coefficient enables more accurate correction of the control error caused by the individual difference of the components used in the system, the aging change in characteristics of the components, and the like.

As mentioned above, the fuel injection device and the adjustment method thereof according to this embodiment provide the following excellent effects.

(1) The fuel injection device (fuel supply system) included in the common rail type fuel injection system for the engine includes one pressure sensor 20a (fuel passage pressure sensor) disposed in a fuel inlet of the injector 20 located on the injector 20 side apart from the connection portion 12a (orifice 12b), the sensor being adapted to measure a fuel pressure at a position where the sensor is disposed. The fuel injection device also includes the ECU 30 for sensing a pressure fluctuation regarding pressure fluctuation caused by an injection operation of the injector 20 and actual injection thereof actually performed through the injection operation, based on a sensor output from the pressure sensor 20a, specifically, a program (pressure fluctuation sensing device) incorporated in the ECU 30 for performing the processing shown in FIG. 7. Thus, the pressure fluctuation can be recognized accurately before the pressure fluctuation due to the injection attenuates. The pressure fluctuation caused by the injection operation of the injector concerning the predetermined injection and the actual injection (various pressure fluctuations associated with injection including a pressure leak due to the injection operation and waving characteristics due to the actual injection) can be sensed with high accuracy, thereby enabling obtaining and correcting of the injection characteristics.

(2) Locating the pressure sensor 20a on the injector 20 side apart from the connection portion 12a (orifice 12b) enables the sensing of the pressure fluctuation before the fuel pulsation is reduced by the orifice 12b, enabling the sensing of the pressure fluctuation with higher accuracy.

(3) Since the rail pressure sensor, which is normally attached to the common rail 12, is eliminated in this embodiment, a large space near the common rail can be assured. The structure with the above-mentioned pressure sensor 20a can appropriately perform the normal fuel injection control based on the sensor output from the pressure sensor 20a even when the rail pressure sensor is eliminated.

(4) In the processing shown in FIG. 7, the sensor outputs from the pressure sensor 20a are serially obtained at short intervals to draw a track of a pressure transition waveform using the sensor outputs. This enables accurate and suitable sensing of the pressure transition waveform (pressure fluctuation).

(5) In the processing shown in FIG. 7, the sensor outputs from the fuel passage pressure sensor 20a are serially obtained at intervals of 20 μsec. This enables suitable obtainment of the pressure transition waveform (pressure fluctuation).

(6) The fuel injection device includes a program (injection characteristic estimating device, steps S351, S361, S362, and S371 in FIG. 7) for estimating the injection characteristics of the injector 20 based on the pressure transition waveforms (pressure fluctuation) sensed in the processing as shown in FIG. 7. Thus, the injection characteristics in the respective times are automatically obtained and recognized easily.

(7) The fuel injection device includes a program (injection characteristic correcting device, steps S13 and S14 in FIG. 3, and S42 in FIG. 16) for performing correction regarding the injection of the injector 20 based on the pressure transition waveforms (pressure fluctuation) sensed in the processing as shown in FIG. 7. Thus, the correction regarding the fuel injection based on the injection characteristics in each time is automatically performed, so a desired engine operation state can be obtained with high accuracy through the multiple injection.

(8) The fuel injection device includes a program (abnormality determination device) for determining the presence or absence of abnormality of the common rail type fuel injection system based on the pressure transition waveform (pressure fluctuation) sensed in the processing as shown in FIG. 7, and a program (failsafe device) for performing predetermining failsafe processing when the system is determined to be in an abnormal state by the above program. Thus, the suitable failsafe processing can be performed early and appropriately.

(9) In step S362 shown in FIG. 7, the quantity of fuel injected per unit time is estimated. The injection quantity of fuel is determined by the time integration value of the thus-obtained injection rate. In this way, the control of the fuel pressure or the like of the injector 20 can be performed more appropriately.

(10) It is effective to provide the fuel injection device with a program (after-correction injection characteristic estimating device) for estimating the injection characteristics of the injector 20 based on the pressure fluctuation sensed in the processing shown in FIG. 16 after performing the correction of the processing shown in FIG. 7. With this structure, the correction associated with the injection of the injector 20 and the sensing of the injection characteristics of the injector 20 are performed alternately and repeatedly thereby enabling more accurate estimation of the waving characteristics (pressure fluctuation caused by the predetermined injection) or the like by the injection based on the corrected injection characteristics.

(11) One fuel passage pressure sensor 20a is provided in the fuel inlet of the injector 20 of the cylinder #1. This enables easy attachment and maintenance of the fuel passage pressure sensor 20a. In addition, the pressure can be detected with high accuracy in a relatively stable manner.

(12) In the processing of steps S35, S351, S37, and S371 shown in FIG. 7, the pressure drop point indicative of the predetermined pressure drop mode is detected in a predetermined period (a predetermined period immediately after the injection start command) starting from the injection start command timing (driving start time) of the injector 20, based on the pressure values in the respective times (the pressure transition waveform P10 shown in FIG. 8) measured by the fuel passage pressure sensor 20a. This enables accurate sensing of the injection characteristics of the injector 20.

(13) The fuel injection device includes a program (pressure drop detection type injection timing obtaining device, steps S35, S351, S37, and S371 shown in FIG. 7) for obtaining the injection start timing (injection start point) of the injector 20 and timing at which the injection rate is the maximum based on the pressure drop point detection timing detected by the processing in steps S35, S351, S37, and S371 shown in FIG. 7. Thus, the timing important for control of the injector 20 can also be detected (automatically detected) accurately.

(14) The injection characteristics of the injector 20 are corrected based on the injection timing obtained by the processing in steps S35, S351, S37, and S371 in FIG. 7. In this way, the injection characteristics of the injector 20 associated with the injection timing can be corrected more accurately.

(15) The fuel injection device includes a program (no-injection determination device) for determining a no-injection state when the pressure drop point is not detected in the predetermined period in step S35 shown in FIG. 7. In this way, the presence or absence of the actual injection by the injector 20 can be sensed more accurately.

(16) In the processing of steps S36, and S361 shown in FIG. 7, the pressure rise point indicative of the predetermined pressure increase mode is detected in a predetermined period (a predetermined period immediately after the injection start timing) starting from the injection start command timing (driving start time) of the injector 20 based on the pressure values in the respective times (the pressure transition waveform P10 shown in FIG. 8) measured by the fuel passage pressure sensor 20a. This enables accurate sensing of the injection characteristics of the injector 20.

As mentioned above, the injection rate shows a tendency opposite to that of the fuel pressure. Accordingly, the change mode (decrease mode) of the injection rate and eventually the drive mode of the injector can be estimated based on the pressure increase mode due to one of the injection operation and the actual injection of the injector. The pressure increase mode in the predetermined period after the timing at which the pressure starts increasing after the pressure once drops immediately after the injection start command to the injector is important when grasping the drive mode of the injector as of the injection end. It is because the injection with the injector normally ends in the pressure increase period. By setting the pressure rise point in a predetermined pressure increase mode corresponding to the characteristic of the injector, the pressure rise point can be detected as the point indicative of the injection characteristic of the injector.

(17) The fuel injection device includes a program (failsafe device) for performing predetermined failsafe processing when the pressure rise point is not detected in the predetermined period by the processing in steps S36 and S361 shown in FIG. 7. Thus, a predetermined value (default value), which is beforehand prepared, or a previous value as an alternative value for the pressure rise point or the like can be used to prevent deterioration of detection accuracy.

(18) The fuel injection device includes a program (pressure-increase detection type injection timing obtaining device) for determining the injection end timing (injection end point) of the injector 20 based on the pressure rise point detection timing detected through the processing in steps S36, and S361 as shown in FIG. 7. This enables accurate (and automatic) detection of the injection end timing.

(19) It is effective to provide the fuel injection device with a program for correcting the injection characteristics of the injector (in particular, the injection end timing) based on at least one of the injection timings (in particular, the injection end timing) obtained by the processing in steps S36 and S361 of FIG. 7, In this way the injection characteristics of the injector associated with the injection timing can be corrected more accurately.

(20) As mentioned above, in this embodiment, the program for detecting the pressure rise point is provided together with the program for detecting the pressure drop point. This enables detection of both the pressure drop point and the pressure rise point as described above, and further more accurate detection of the injection characteristics of the injector 20.

(21) The fuel injection device includes a program (injection period obtaining device) for determining an injection period of the injector 20 based on both timings of the pressure drop point detection timing and the pressure rise point detection timing detected in the processing of steps S35, S351, S36, and S361 in FIG. 7. This enables automatic obtainment of the injection period of the injector 20.

(22) The fuel injection device includes a program (injection quantity estimating device) for performing at least one of estimation and correction of the injection quantity of the injector 20 based on the injection period obtained by the above-mentioned program and the pressure values in the respective times (pressure transition waveform P10 shown in FIG. 8) measured by the pressure sensor 20a. Thus, the supply of fuel (injection supply) to the engine can be performed with higher accuracy.

(23) The fuel injection device includes a program (timing detection device) for detecting specific timing (injection start point) by comparing the pressure values in the respective times measured by the pressure sensor 20a (pressure transition waveform P10 as shown in FIG. 8) with a threshold TH1. The fuel injection device further includes a program (threshold changing device) for shifting the threshold TH1 to a value at which the injection start point can be detected more easily when the injection start point is not detected by the above program in a predetermined period. Thus, the timing as the object can be more surely detected in the following detection period (for example, at the next or later detection time or the like).

(24) The fuel injection device includes a program (injection rate obtaining device) for determining the injection rate in each time based on the pressure value (threshold TH1) as of the detection of the pressure drop point in the processing of steps S35 and S351 as shown in FIG. 7 and the pressure values in the respective times measured by the pressure sensor 20a (pressure transition waveform P10 as shown in FIG. 8). More specifically, the pressure value (threshold TH1) as of detecting the pressure drop point is used as, for example, the reference pressure value (for example, zero point). Thus, the injection rate can also be determined accurately by flexibly responding to the injector 20 causing the above pressure leak.

(25) The pressure value (the pressure value Pqr1 based on the threshold TH1) as of the detection of the pressure drop point in the processing of steps S35 and S351 shown in FIG. 7 is used as the reference. The fuel injection device includes a program (injection rate obtaining device, see FIGS. 9 and 10) for determining serially the injection rates in respective times based on a difference amount between the reference pressure value (equivalent to a so-called offset reference) and the pressure values of the respective times measured by the pressure sensor 20a while fixing the reference pressure value. This enables the easy and accurate obtainment of the injection rate in each time. Fixing the reference value facilitates management, comparison, and the like of the data.

(26) The above-mentioned reference pressure value is set to a pressure value immediately before the pressure drop due to the actual injection of the injector 20. The use of such the pressure value as the reference pressure value enables more accurate detection of the amount of decrease in pressure only due to the actual injection and eventually the above-mentioned injection rate.

(27) The reference pressure value is set to the pressure value at the end timing of the invalid injection period of the injector 20. Thus, the reference pressure value can be set to the pressure value immediately before the pressure drop start point due to the actual injection more easily and accurately.

(28) On the occasion of the determination of the injection rate, the injection rate at that time is calculated based on a relational expression: $Qr=(Pqr2-Pqr1)\times Kp$ (see FIGS. 9 and 10). Such a relational expression can calculate the injection rate at that time easily and accurately.

(29) The fuel injection device includes a program for variably setting a correction coefficient Kp according to the pressure value Pqr1 as an equivalent of a pressure value in the common rail (rail pressure). Thus, the correction coefficient Kp is set to a more appropriate value.

(30) The fuel injection device includes a program (injection rate abnormality determination device) for determining the abnormality of the system when the obtained injection rate is small with respect to the driving period (energization period) of the injector 20. In this way, the abnormality of injection, such as injector clogging, can be sensed early and accurately.

(31) The fuel injection device includes a program (regression timing detection device, step S36 in FIG. 7) for detecting regression timing. The pressure value of each time measured by the pressure sensor 20a (pressure transition waveform P10 in FIG. 8) falls below a pressure value (base pressure) as of the occurrence of the pressure fluctuation (before the injection) (detected by the processing shown in FIG. 4) and returns to the pressure value (zero cross point) at the regression timing. The fuel injection device further includes a program (injection end timing obtaining device, step S361 in FIG. 7) for determining injection end timing (injection end point) of the injector 20 based on the zero cross point detected by the above-mentioned program. Accordingly, the injection end timing of the injector 20 can be determined with high accuracy.

(32) The fuel injection device includes the EEPROM 32 (the pressure fluctuation holding device, the waveform holding device) for storing the predetermined reference pressure fluctuation (reference pressure transition waveform) such that the mode is identifiable for each injection pattern. The fuel injection device also includes a program (pressure fluctuation selecting device, waveform selecting device) for selecting one reference pressure fluctuation corresponding to the injection pattern of up to the (n−1)th stage injection when detecting the pressure fluctuation (pressure transition waveform) of the nth stage injection of the predetermined injection pattern. The fuel injection device further includes a program (difference value obtaining device) for subtracting the reference pressure fluctuation concerning the injection pattern of up to the (n−1)th stage injection from the pressure fluctuation caused by the injections up to the nth stage injection of the predetermined injection pattern to calculate a difference value therebetween. With this structure, the pressure fluctuation caused only by the nth stage injection can be determined with high accuracy from the difference value. In particular, when a large variation exists in the injection interval between the (n−1)th stage injection and the nth stage injection, the variation in the pressure fluctuation due to the different injection interval is restrained. As a result, a highly reproducible value (value with reduced variation in each time) of the pressure fluctuation due to the nth stage injection as the object of the learning is obtained.

(33) The difference value between the pressure fluctuations (pressure transition waveforms) due to the injection pattern of the single-stage injection and the injection pattern of up to the second-stage injection is calculated. This enables highly accurate determination of the pressure fluctuation due to the second-stage injection and the injection characteristics of the same injection.

(34) In step S332 shown in FIG. 7, subtraction between the pressure value in each time corresponding to the pressure fluctuation (pressure transition waveform) and the corresponding pressure value of the reference pressure fluctuation (reference pressure transition waveform) is serially performed to serially determine the difference value therebetween. Thus, the difference value can be obtained with high synchronism (in real time).

(35) The fuel injection device includes a program (fuel pressure serially obtaining device, step S32 in FIG. 7) in the ECU 30 for serially obtaining fuel pressure signals of the injector 20 connected to the common rail 12 at short intervals to the degree that a track of the pressure transition waveform can be drawn. Specifically, the program (fuel pressure serially obtaining device, step S32 in FIG. 7) is adapted to serially obtain the fuel pressure signals of the injector 20 at intervals of 20 μsec. This structure enables the accurate detection of the pressure fluctuations (pressure leak, waving characteristics or the like) regarding the pressure fluctuation caused by the injection operation of the injector 20 and the pressure fluctuation due to the actual injection through the injection operation based on the sensor outputs from the pressure sensor 20a disposed in the fuel inlet of the injector 20.

(36) The ECU 30 serially obtains the sensor outputs from the pressure sensor 20a at different intervals for obtaining the above-mentioned pressure fluctuation (pressure transition waveform) and plots these sensor outputs on a time axis. Thus, an interval for obtaining the sensor outputs that is short enough to draw a track of the pressure transition waveform using the sensor outputs is determined. Thus, an appropriate interval for obtaining the sensor outputs can be set for the ECU 30 for each kind or application of the fuel supply system. The ECU 30 can sense the injection characteristics or the like with high accuracy.

(37) The fuel injection device includes a program (period setting device) for setting a period (sensor output obtaining period) in the ECU 30 for serially obtaining the sensor outputs to a predetermined limited period (detection period, see FIG. 5) including a period (pressure fluctuation period) during which the pressure fluctuation is caused by the actual injection of the injector 20. This program sets start timing of the detection period with respect to the injection start command timing (timing t101 in FIG. 5) of the injector 20 which is instructed by the injection start command associated with the first injection (for example, pilot injection Prt in FIG. 5) among one or more injections performed by the injector 20 during one combustion cycle of the engine. Furthermore, the program sets end timing of the detection period (timing t102 in FIG. 5) based on the pressure fluctuation after the last injection of the same cycle (for example, post-injection Pst in FIG. 5), which is sensed by the processing shown in FIG. 7. In this way, the detection period (sensor output obtaining period) is limited to a short period. Accordingly, the processing load on the ECU 30 can be reduced, and thus the storage area for use in a temporal storage memory (RAM in the ECU 30) can be reduced. Even with such the manner of the limitation, the desired data (pressure fluctuation associated with the injection) can be basically obtained.

(38) The fuel injection device includes a program (stopping period setting device) in the ECU 30 for setting the stopping period for temporarily stopping the obtainment of the sensor output in a part of the period (stable pressure period), in which the fuel pressure is stable at the locating position of the pressure sensor 20a (fuel passage pressure sensor), in the period (sensor output obtaining period) for serially obtaining the sensor outputs. This program further limits the detection period (sensor output obtaining period), which is set in a limited manner. Setting the sensor output obtaining period shorter can decrease the processing load on a computation unit and can decrease the storage area for use in the temporary storage memory (RAM in the ECU 30).

(39) The fuel injection device further includes a program (stable period start detection device) for detecting start timing of the stable pressure period based on the pressure fluctuation detected in the processing shown in FIG. 7. On the occasion of setting the stopping period, the start timing of the stopping period is set to the start timing of the stable pressure period (timing t101a shown in FIG. 6) detected by the program (stable period start detection device). The end timing of the stopping period (timing t102a in FIG. 6) is set to the injection end command timing instructed by the injection end command to the injector 20. With this structure, even in the limited period, the desired data (pressure fluctuation associated with the injection) can be basically obtained.

The above-described embodiment may be modified as follows, for example.

In the above embodiment, the orifice 12b is provided in the connection portion 12a to decrease the pressure pulsation inside the common rail 12. Instead of the orifice 12b, or together with this orifice 12b, a flow damper (fuel pulsation reducing device) may be provided to reduce the pressure pulsation in the common rail 12.

In the above embodiment, the detection period and the stopping period are set in the mode shown in FIGS. 5 and 6. However, the invention is not limited thereto, and the detection period and the stopping period may be set arbitrarily. The detection period and the stopping period may be set as fixed values obtained by experiments or the like, for example. Alternatively, these periods may be set as values changeable in accordance with the condition of each time (in particular, the engine operation state), using a map or the like.

In the above embodiment, the pressure value at the end timing of the invalid injection period of the injector 20 is set as the reference pressure value in the calculation of the injection rate shown in FIGS. 9 and 10. However, the invention is not limited thereto, and the reference pressure value can be set arbitrarily (for example, 0 or a fixed value may be also used as the reference pressure value). For example, in a case of the injector 20 with a little leak, the rail pressure (base pressure) at that time (at the time of the injection operation) may be set as the reference pressure value.

In this case, there is a possibility that the reference pressure value fluctuates when the fuel injection timing coincides with the fuel pumping timing of the fuel pump. Taking such a fact into consideration, it is effective to provide the fuel injection device with a program for performing suitable correction or computation prohibition processing by detecting the size of an error due to the overlap of the timings or the fuel pumping timing of the fuel pump.

In the above embodiment, in step S332 of FIG. 7, subtraction between the pressure value of each time concerning the pressure fluctuation and the corresponding pressure value of the reference pressure fluctuation is performed to serially determine the difference value therebetween. The object of the subtraction is not limited to the pressure values. Alternatively for example, a pressure differential value may be serially determined based on the pressure value of each time measured by the pressure sensor 20a, and a difference value between the thus-obtained pressure differential value and a pressure differential value transition waveform (reference pressure fluctuation) stored in advance may be determined serially.

The above-mentioned pressure drop point, the pressure rise point, and the respective timings (injection start timing, injection end timing, and timing at which the injection rate is the maximum) may be detected also in following modes.

Figure 17:
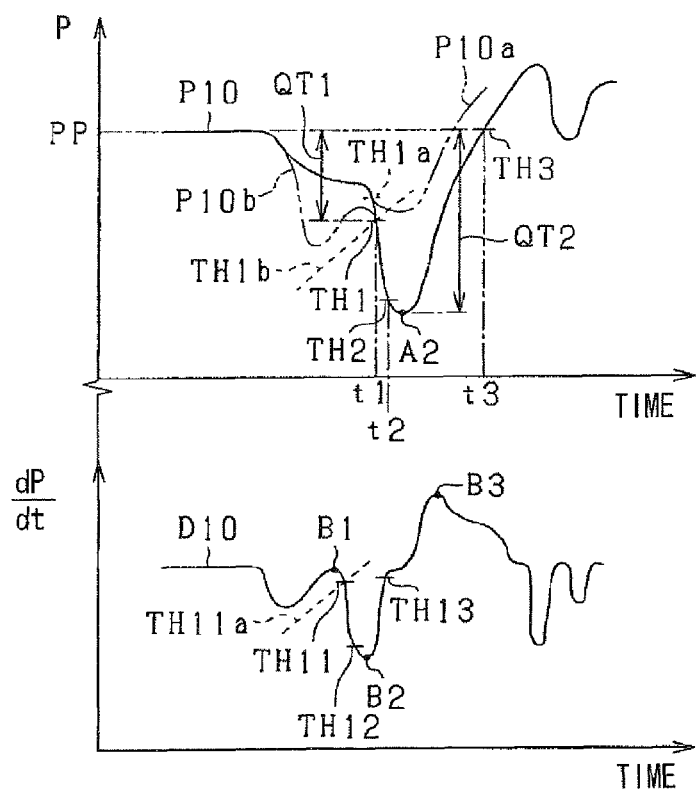
FIG. 17 is a time chart showing learning processing of a modified example of the embodiment.

FIG. 17 is a time chart showing a detection mode of the pressure drop point and pressure rise point. In FIG. 17, P is a time chart schematically showing the pressure transition waveforms shown in FIG. 8, and dP/dt is a time chart showing a transition of a pressure time differential value corresponding to an inclination of the transition of the pressure P.

In the above embodiment, when the injection start point (timing t1) is not detected in a predetermined period the threshold TH1 is shifted to a value making the detection of the injection start point easier. The injection start point (timing t1) is not detected when the true values in the respective times cause a pressure transition represented by a chain double-dashed line P10a in FIG. 17 (when the pressure value that is originally supposed to reach the threshold TH1 at the timing as the object of the detection does not actually reach the threshold TH1) though the respective thresholds are set by assuming the pressure transition waveform P10 indicated by a solid line in FIG. 17. Even in this case, however, the above-mentioned arrangement shifts the threshold TH1 to a higher threshold TH1a corresponding to a higher pressure value, so the injection start point can be detected accurately in the following detection operations.

Even in this structure, however, there is a possibility that the injection start point (timing t1) is erroneously detected at earlier timing than the right timing when the true pressure value of each time causes the pressure transition represented by a chain double-dashed line P10b in FIG. 17 due to a pressure drop caused by the pressure leak, disturbances due to the engine operation state and the like. In this case, it is effective to employ a threshold TH1b defined by a function of time, more specifically, a threshold TH1b which is shifted to the higher pressure side with time (in this example, in proportion to the time) (such that the detection sensitivity indicative of easiness of detection of the pressure drop becomes higher) as indicated by a broken line in FIG. 17, for example.

Specifically, by comparing the pressure value of each time measured by the pressure sensor 20a with the threshold TH1b in the processing in steps S35 and S351 shown in FIG. 7, it is serially determined whether the pressure value in each time is small (smaller than the threshold TH1b) or not. When the pressure value is determined to be small, it is determined that the pressure drop point (injection start point=timing t1) is detected. Thus, the detection sensitivity concerning the injection start point (timing t1) can be optimized during the detection period. Even when the individual difference between the injectors 20 is large, the injection start point can be detected more accurately. That is, the possibility of erroneous detection of the pressure drop that is not the detection object can be reduced while continuing the detection of the injection start point though the sensitivity is low at the early timing. Since the threshold TH1b is shifted to the higher pressure side with the elapse of time, the pressure drop can be detected at high sensitivity at timing, at which it is considered that the possibility of occurrence of the pressure drop as the detection object (the pressure drop corresponding to the injection start point) is specifically high (in this example, timing after the leak period).

The threshold TH3 for detecting the pressure rise point (timing t3=injection end point) can be also defined by a function of time as described above. In this case, basically, similar effects are exerted. The contents of the function can be set arbitrarily depending on applications or the like. For example, it is effective to provide a construction in the above-mentioned arrangement for changing the inclination of the threshold with respect to the time according to the pressure value (base pressure) as of the occurrence of the pressure fluctuation. Specifically, by increasing the inclination of the threshold as the base pressure increases, the erroneous detection can be suppressed.

In the above embodiment, the respective thresholds (thresholds TH1 to TH3) are set as the pressure values. The invention is not limited thereto, and each threshold can be set by the amount of pressure drop or the amount of increase in pressure from predetermined timing. For example, the threshold TH1 can be set as a pressure decrease amount QT1 from the pressure value (base pressure value PP) as of occurrence of the pressure fluctuation (immediately before occurrence of the pressure fluctuation) as shown in FIG. 17. The threshold TH3 can be set as a pressure increase amount QT2 from the pressure value at specific timing (pressure local minimum point A2). By using the change amount from such reference points (the base pressure value PP and the pressure local minimum point A), more accurate detection (automatic detection) of each timing associated with the injection of the injector 20 can be performed in some applications.

The above-mentioned respective timings can be detected based on the pressure local minimum point A2 (see FIG. 17), at which the pressure fluctuation caused by the predetermined injection changes from the pressure decrease occurring immediately after the injection to the pressure increase, instead of the respective thresholds. Depending on the application or the like, for example, by detecting the pressure local minimum pointA2 as the pressure rise point for detecting timing t2 at which the injection rate is the maximum, the timing t2 can be detected with higher accuracy.

Figure 18:
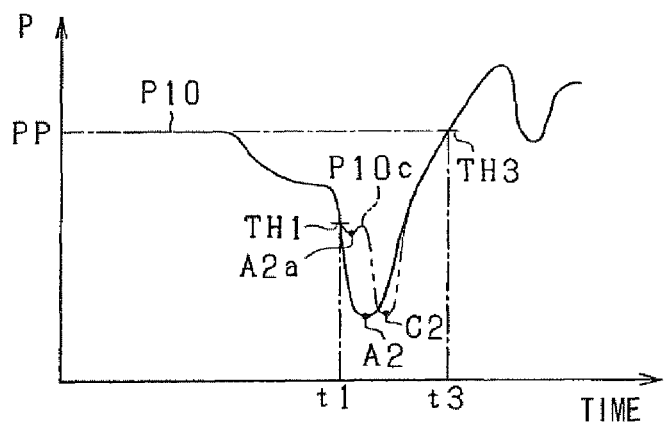
FIG. 18 is a time chart showing learning processing of another modified example of the embodiment.

However, for example, in some cases, the true pressure value in each time provides a pressure transition represented by a chain double-dashed line P10c in FIG. 18 (corresponding to the time chart P in FIG. 17), in which a pressure local minimum point A2a is formed at timing earlier than the correct timing. In this case, if the detection uses the above-mentioned pressure local minimum point A2, the timing t2 will be detected erroneously.

In such a case, it is effective to provide a construction for detecting a point C2, at which the pressure of the time measured by the pressure sensor 20a is the minimum in a predetermined period (for example, from the timing t1 to the timing t3) starting from predetermined timing near or after the injection start command point of the injector 20, as the pressure rise point, instead of the pressure local minimum point. With this structure, the timing t2 at which the injection rate is the maximum can be detected with higher accuracy.

The fuel injection device may include a program (pressure change obtaining device) for obtaining a predetermined parameter indicative of a pressure change mode based on the pressure values in the respective times measured by the pressure sensor 20a. The pressure drop point and the pressure rise point may be detected based on the pressure change mode. Furthermore, the above timings can be detected by providing the above-mentioned respective thresholds with respect to the pressure change mode.

For example, as shown in FIG. 17, the above respective timings can be detected by setting thresholds TH11 to TH13 corresponding to the above thresholds TH1 to TH3 with respect to a transition of the pressure time differential value (waveform D10) equivalent to the inclination of the pressure transition. These thresholds may be defined by functions of time. For example, in the case where the above-mentioned threshold TH11 is set by such a function, it is effective to set a threshold TH11a that shifts toward the higher pressure value (so as to heighten the detection sensitivity indicative of easiness of detection of the pressure drop) with time (in this example, in proportion to time) as indicated by a broken line in FIG. 17. Also, the timings can be detected based on inflection points (change points B1 to B3) corresponding to the maximum point and the minimum point of the differential value. Also, in this case, the point at which the differential value is the maximum or the minimum can be detected as the change points B1 to B3 in the predetermined period (a fixed period or a variable period) starting from predetermined timing near or after the injection start command point of the injector 20. Even this structure can accurately detect the injection characteristics of the injector 20.

Figure 19:
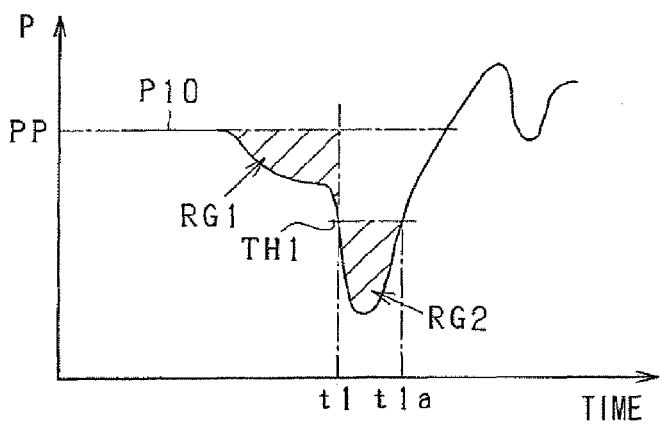
FIG. 19 is a time chart showing learning processing of a further modified example of the embodiment.

In step S362 in FIG. 7, arbitrary parameters indicative of injection characteristics of the injector 20 can be obtained. For example, the parameters can be determined in following modes FIG. 19 is a time chart schematically showing the pressure transition waveform shown in FIG. 8. It is effective to provide the fuel injection device with a program (leak amount obtaining device) for calculating (estimating) a leak amount RG1 (an amount of a pressure leak in the injection operation of the injector 20) shown in FIG. 19. The program determines the amount of the pressure leak based on a difference between the pressure value (threshold TH1) as of the detection of the pressure drop point (at timing t1) in the processing of steps S35 and S351 in FIG. 7 and the basic pressure value as of the occurrence of the pressure fluctuation (base pressure value PP). With this structure, the amount of the pressure leak in the injection operation of the injector 20 can be detected (estimated) easily. In order to determine the leak amount with higher accuracy, it is suitable to integrate the pressure value in each time (pressure transition waveform P10) measured by the pressure sensor 20a on the basis of the base pressure value PP to directly determine the leak amount RG1 in the form of a time integration value in an interval from the timing near the injection start command point to the pressure drop point detection timing t1.

It is effective to provide the fuel injection device with a program (time integral obtaining device) for obtaining a time integration value RG2 in the interval from the pressure drop detection timing (timing t1) to timing t1a at which the measured pressure value in each time returns to the pressure value (threshold TH1) as of the injection start timing after the measured pressure value falls below the pressure value (threshold TH1) as of the detection of the pressure drop point. For example, the program obtains the time integration value RG2 by integrating the pressure values of the respective times measured by the pressure sensor 20a on the basis of the pressure value (threshold TH1) (for example, as 0 reference) as of the detection of the pressure drop point in the processing of steps S35 and S351 shown in FIG. 7. In this case, it is effective to provide the fuel injection device also with a program (injection characteristic integral obtaining device) for determining at least one of the quantity of fuel actually injected by the injector 20 and the amount of the pressure leak based on the time integration value obtained by the above-mentioned program. The time integration value RG2 basically relates to the total of the fuel injection quantity and the leak amount. The ratio between the leak amount and the fuel injection quantity is basically constant. Therefore, with this structure, the fuel injection quantity and leak amount can be determined (estimated) by multiplying the time integration value RG2 by the ratio.

The fuel injection quantity and the leak amount also correlate with a difference between the pressures before and after the injection. The fuel injection device may include a program (pressure difference obtaining device) for determining a difference between the pressure value as of the detection of the pressure drop point in the processing of steps S35 and S351 in FIG. 7 and the pressure value as of the detection of the pressure rise point in the processing of steps S36 and S361 in FIG. 7. Thus, the fuel injection quantity and the leak amount can be determined (estimated).

The injection end timing may be determined based on the timing t1a shown in FIG. 19.

Figure 20:
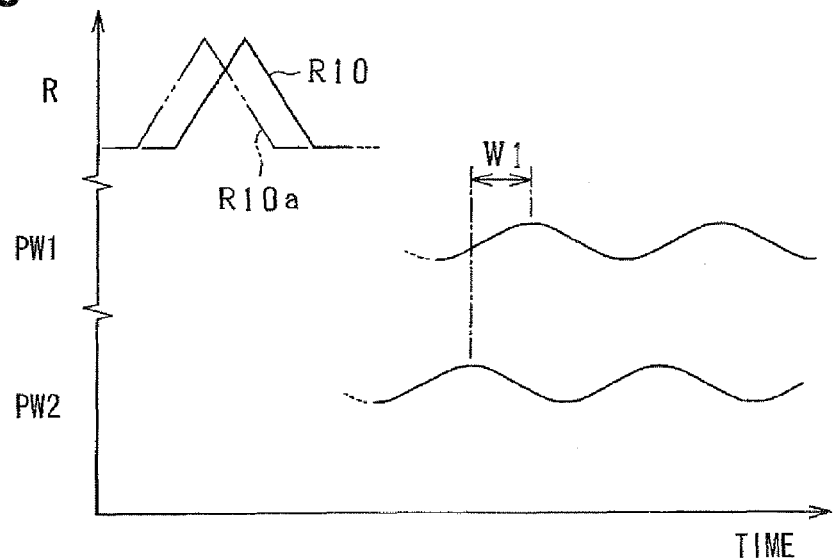
FIG. 20 is a time chart showing learning processing of a still further modified example of the embodiment.

In the system (fuel injection device) of the above-described embodiment, in some cases, the pressure value of each time obtained by the pressure sensor 20a is shifted by a delay (a phase deviation W1) as shown in FIG. 20. In FIG. 20, R is a time chart showing the actual injection rate R10a (as indicated by a chain double-dashed line) and the injection rate R10 estimated by the sensor outputs from the pressure sensor 20a. PW1 is a time chart showing a pressure transition waveform (pressure waveform 1) detected by the pressure sensor 20a. PW2 is a time chart showing the actual pressure transition waveform (pressure waveform 2).

Figure 21A:
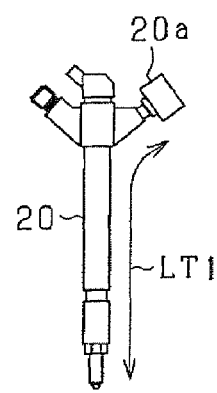
FIGS. 21A, 21B, and 21C are schematic diagrams respectively showing injectors of other modified examples of the embodiment.
Figure 21B:
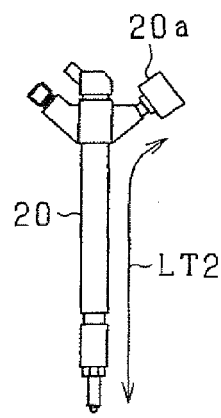
Figure 21C:
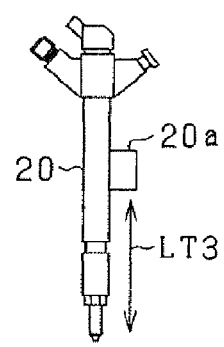

As shown in FIG. 20, the pressure waveform 1 detected by the pressure sensor 20a is a waveform delayed from the actual waveform 2 by a phase deviation W1. The phase deviation W1 corresponds to a time required for the pressure fluctuation (pressure transition waveform) caused in the fuel injection hole of the injector 20 (injection hole 21c) to be transferred to the position of the pressure sensor 20a. The length of the phase deviation W1 depends on the distance (specifically, a fuel passage distance) between the located position of the pressure sensor 20a and the position of the fuel injection hole of the injector 20. Referring to FIGS. 21A to 21C, this will be described below in detail. FIGS. 21A to 21C are schematic diagrams showing a plurality of kinds of injectors 20 provided with the pressure sensors 20a in different positions.

For example, as shown in FIGS. 21A and 21B, the pressure sensor 20a in each of these examples is disposed in the fuel inlet of the injector 20. A distance between the position of the pressure sensor 20a and the position of the fuel injection hole of the injector 20 of FIG. 21A is length LT1 and a distance between the position of the pressure sensor 20a and the position of the fuel injection hole of the injector 20 of FIG. 21B is length LT2. The length LT2 of the injector 20 shown in FIG. 21B is larger than that of LT1 because of a difference in shape (physical size) between these injectors 20 (LT1<LT2). The time necessary for the pressure fluctuation caused at the fuel injection hole to reach the pressure sensor 20a in the injector 20 shown in FIG. 21B is larger (longer) than that in the injector 20 shown in FIG. 21A. Furthermore, the phase deviation W1 in the injector 20 shown in FIG. 21B is larger (longer) than that in the injector 20 shown in FIG. 21A.

The pressure sensor 20a may be provided inside the injector 20 (for example, in the fuel passage 22c shown in FIG. 2) as shown in FIG. 21C. In this case, a distance L3 between the pressure sensor 20a and the fuel injection hole is shorter than the distance in a case where the sensor 20a is disposed in the fuel inlet. When the injector 20 shown in FIG. 21C has the same shape as that of the injector 20 shown in FIG. 21A, the distances LT1 and LT3 have the following relation: LT3<LT1.

As mentioned above, the distance between the position of the pressure sensor 20a and the position of the fuel injection hole of the injector 20 changes depending on the kind of the injector and the position of the sensor. In order to accurately correct the phase deviation W1 accompanying the position of the pressure sensor 20a regardless of the applications, it is effective to provide the fuel injection device with a program (timing detection device) for detecting specific timing based on the pressure value of each time measured by the pressure sensor 20a and a program (timing correction device) for correcting the specific timing detected by the above program to advance the specific timing to a degree corresponding to the length between the located position of the pressure sensor 20a and the position of the fuel injection hole (injection hole 21c) of the injector 20. This structure can compensate for the above-mentioned phase deviation (delay) W1, for example, in accordance with the kind of the injector, the position of the sensor and the like, thereby detecting the injection start timing, the injection end timing and the like (arbitrary specific timing) with high accuracy. In this case, it is effective to provide the fuel injection device with a storage area (fuel passage distance storing device) disposed in a part of the EEPROM 32 for storing a parameter (for example, the above-mentioned distances LT1, LT2) indicative of a fuel passage distance from the position of the pressure sensor 20a to the position of the fuel injection hole of the injector 20 in order to recognize the position of the pressure sensor 20a easily and accurately. The fuel passage distance storing device may be an arbitrary memory device that beforehand stores design values and the like or a memory device that stores values (fuel passage distances to the fuel injection holes of the injectors) sensed after the sensors are disposed.

The fuel injection device may include a program (reference comparison deviation obtaining device) for comparing a point of the pressure transition waveform sensed by the processing in step S32 in FIG. 7 with a corresponding point of the predetermined reference pressure transition waveform to determine a phase deviation therebetween (the above-mentioned phase deviation W1). This structure can determine the phase deviation and compensate for the deviation with high accuracy. Specifically, it is effective to provide a structure that performs comparison of pressure values or pressure differential values at predetermined timing between the pressure transition waveform and the reference pressure transition waveform or that sequentially performs comparison of the pressure values or the pressure differential values therebetween.

Figure 22:
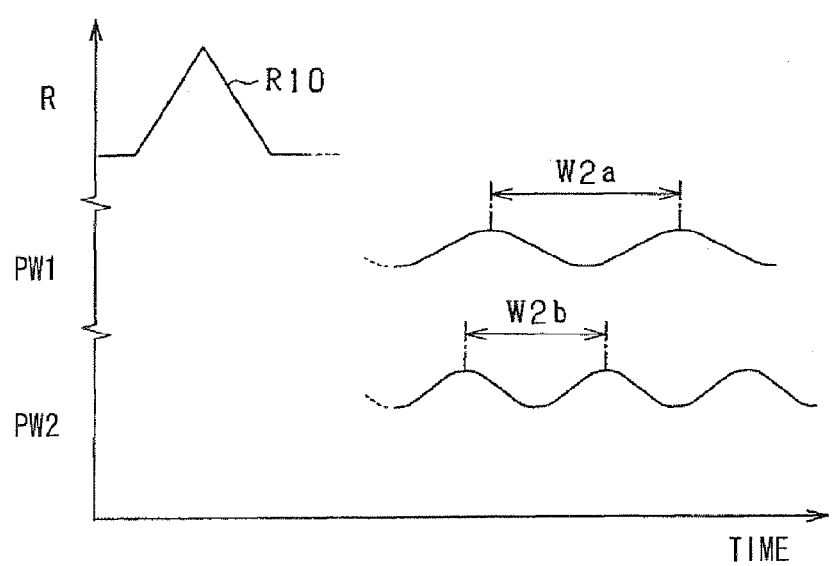
FIG. 22 is a time chart showing learning processing of another modified example of the embodiment.

In the system (fuel injection device) of the above embodiment, the pressure value of each time obtained by the pressure sensor 20a can have not only the above-mentioned phase deviation but also a cycle deviation W2 as shown in FIG. 22. As shown in FIG. 22, in this example, the cycle of the pressure waveform 1 detected by the pressure sensor 20a is a cycle W2a, which is longer than a cycle W2b of the actual waveform 2. This cycle deviation is caused by various factors. Conversely, a cycle of a detection waveform (pressure waveform 1) can be shorter than that of the actual waveform 2. Like the phase deviation, the cycle deviation can be determined accurately by performing comparison with the reference pressure transition waveform. Based on the determined cycle deviation, the deviation can be compensated with high accuracy.

Correction coefficients for other cylinders #2 to #4 can be updated (changed) based on the correction coefficient for the cylinder #1 determined through the processing shown in FIGS. 7 and 16. By using (reflecting) the correction amount determined for the predetermined cylinder in other cylinders, correction of the injection of the injectors 20 of a lot of cylinders can be performed while reducing the number of pressure sensors and the computation load to the minimum.

Figure 23:
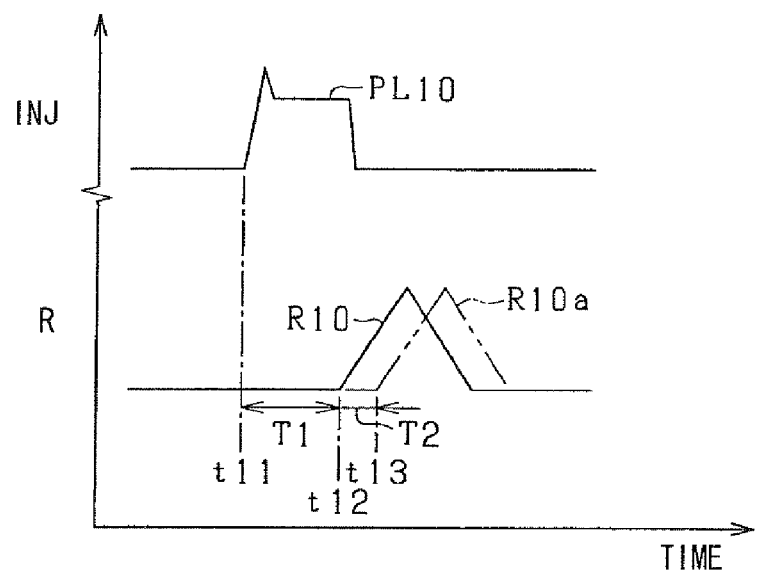
FIG. 23 is a time chart showing learning processing of yet another modified example of the embodiment.

Reference will now be made to a structure in which a correction coefficient for a predetermined cylinder (for example, a cylinder #1) is applied to other cylinders. FIG. 23 is a time chart showing an example of injection start timing detection mode in the above embodiment. In FIG. 23, INJ denotes an injection command (injection command pulse), and R denotes an injection rate.

For example, the processing shown in FIGS. 7 and 16 senses the injection characteristics about the cylinder #1 including the transition of the injection rate R indicated by a solid line R10 in FIG. 23 and injection start timing corresponding to the transition, that is, injection start timing t12 delayed from the injection start command timing t11 by a period T1. Reference values thereof are a transition of the injection rate R indicated by a chain double-dashed line R10a and reference injection start timing t13. That is, in this case, an amount of correction associated with the cylinder #1 (absolute correction amount by a correction coefficient) is a period T2 corresponding to a difference between the timing t12 and the timing t13.

In this case, as a construction for applying the correction coefficient of the cylinder #1 to other cylinders, the fuel injection device may include a program (cylinder characteristic reflection device) for correcting the same parameter (in this example, injection start timing) associated with at least one of other cylinders #2 to #4 based on the period T2 in the same manner as the cylinder #1, for example. In the system with small individual differences among the cylinders (small variations among the cylinders), such a construction can perform the correction with high accuracy.

However, in the system with the large individual differences among the cylinders, if the correction is performed for the other cylinders in the same way as the cylinder #1, there is a possibility that a large error from a target value (true value) is caused. For this reason, when the correction coefficient associated with the cylinder #1 is applied to other cylinders, it is effective to use a smaller value, which has the same sign as the correction coefficient associated with the cylinder #1, as a correction coefficient for other cylinders. Specifically, for example, it is effective to use a value obtained by multiplying the correction coefficient associated with the cylinder #1 by a small predetermined coefficient smaller than 1 (for example, 0.7) as the correction coefficient for other cylinders. With this structure, the possibility of error expansion can be reduced to a low level to the degree not exceeding the individual differences (variations) between the cylinders, and a deviation of the injection characteristic due to aging deterioration of other cylinders or the like can be improved at least by a certain amount associated with the correction amount of the cylinder #1.

Normally, a variation in the injection characteristic deviation due to the individual differences among the cylinders increases as the degree of degradation of the common rail type fuel injection system increases. It is effective to provide the structure using a predetermined correction coefficient smaller than 1 with a program (variable coefficient setting device) for variably setting the predetermined coefficient to a smaller value as a parameter indicative of the degradation degree of the common rail type fuel injection system indicates the larger degradation degree. For example, it is effective to use a parameter indicative of the length of used time of the system as the parameter indicative of the degradation degree of the common rail type fuel injection system. Specifically, the length of used time of the system can be measured by, for example, a predetermined timer (timer device), the number of ON of an ignition switch, or the like. A travel distance of a vehicle equipped with the engine can be used to detect the used time. The travel distance is often used for other control in general vehicle control and thus is often calculated by a predetermined program serially.

Figure 24:
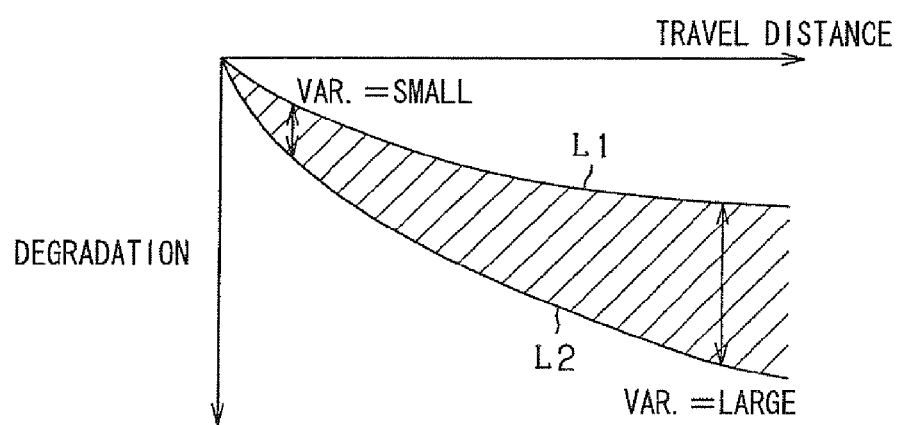
FIG. 24 is a graph showing a relationship between a travel distance and a degradation degree of a further modified example of the embodiment.

Referring to FIG. 24, a scheme for calculating the correction coefficient of other cylinders based on the travel distance of the vehicle will be described below. In FIG. 24, a solid line L1 indicates a degradation characteristic of a cylinder having the lowest degradation degree among all cylinders, and a solid line L2 indicates a degradation characteristic of a cylinder having the highest degradation degree among all cylinders.

As shown in FIG. 24, normally, the variation (VAR. in FIG. 24) in the degradation degree among the cylinders increases as the travel distance increases, that is, as the degradation degree increases. Thus, the degree of application of the correction result of the predetermined cylinder (cylinder #1) to other cylinders, that is, the predetermined coefficient, should be preferably set to a smaller value as the travel distance increases. In this way, the possibility of error expansion as mentioned above can be suppressed to a low level more suitably.

It is also effective to provide the fuel injection device with a program (reference comparison difference obtaining device) for comparing one point of the pressure transition waveform sensed in the processing in step S32 of FIG. 7 with a corresponding point of the predetermined reference pressure transition waveform (for example, an initial waveform) to determine a difference therebetween (for example, a degree of a phase deviation or a cycle deviation) such that the predetermined coefficient is variably set to a smaller value as the difference increases. Generally, the pressure fluctuation in each time deviates from an initial mode more (a difference from the initial value increases) as the degradation degree of the common rail type fuel injection system increases. Based on the difference from the reference pressure transition waveform (initial waveform), the degree of degradation of the common rail type fuel injection system can be determined. As mentioned above, by variably setting the predetermined coefficient to a smaller value as the degradation degree (i.e., the difference) increases, the possibility of error expansion as mentioned above can be suppressed to a low level more suitably.

It is effective to provide the structure of the fuel injection device using such a reference pressure fluctuation (reference pressure transition waveform) including the structure for correction of the phase deviation or the cycle deviation with a storage area (pressure fluctuation holding device) for holding therein the reference pressure fluctuation (for example, the reference pressure transition waveform) such that the reference pressure fluctuations are identifiable for the respective injection patterns, for example, as a part of the EEPROM 32 and a program (pressure fluctuation selection device) for selecting one reference pressure fluctuation based on the injection pattern of each time provided by the injector 20. Normally, the pressure fluctuation due to the injection differs depending on the kind of the injection pattern. Therefore, the reference pressure fluctuation as the reference suitable for each injection pattern should be preferably used.

As the above-mentioned reference pressure fluctuation, a predetermined adapted value previously determined by experiments or the like can be used, for example. When the reference pressure fluctuation reflecting also the aging change or the like is required, it is effective to provide the fuel injection device with a program (pressure fluctuation learning device) for causing the injector 20 to perform injection with a small quantity during no-injection operation (fuel cut) of the predetermined cylinder and for learning the reference pressure fluctuation based on the pressure fluctuation caused by at least one of the above-mentioned injection operation and the actual injection. With this structure, the small quantity injection is performed during the no-injection operation, so the pressure fluctuation according to each condition can be obtained (learned) as the reference pressure fluctuation.

In the above description, the correction coefficient for one cylinder is applied to other cylinders, but the invention is not limited thereto. For example, when the fuel passage pressure sensors (pressure sensors 20a) are provided in a plurality of cylinders, an average of correction amounts per cylinder may be applied to other cylinders.

A plurality of fuel passage pressure sensors may be provided in fuel flow passage routes of at least two cylinders of the engine respectively.

Figure 25:
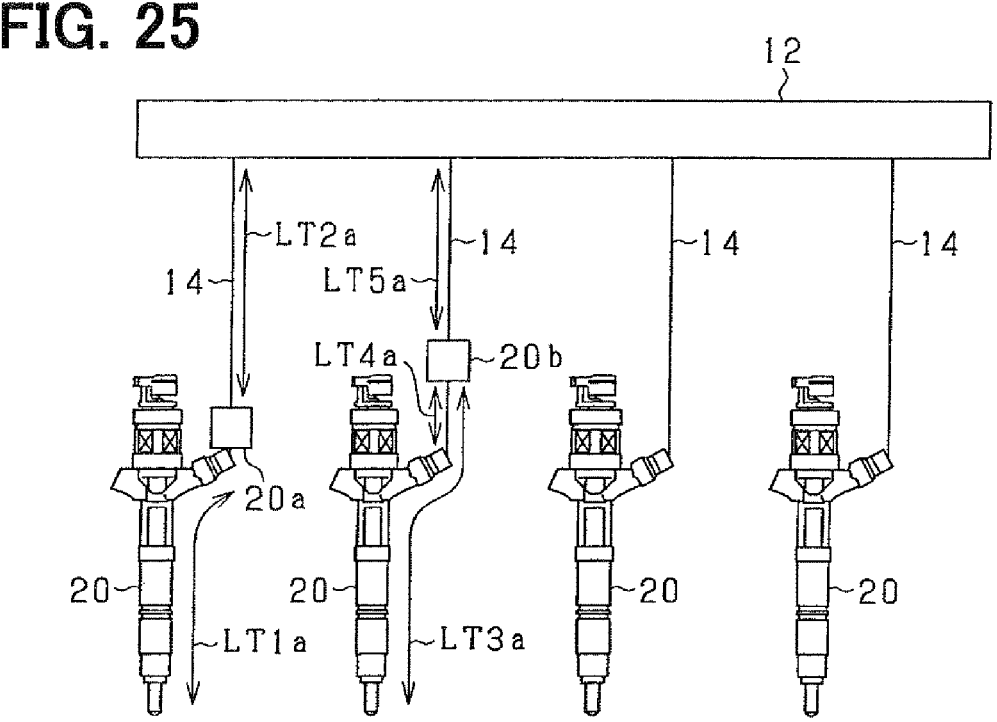
FIG. 25 is a schematic diagram showing a fuel injection system of a modified example of the embodiment.

FIG. 25 is a schematic diagram showing a structure of a fuel supply system including the common rail 12. The respective injectors 20 are used for the cylinders #1, #2, #3, #4 from the left side in FIG. 25 in that order. All pipes 14 for the respective cylinders have the same length and shape. As shown in FIG. 25, the system has the pressure sensors 20a, 20b disposed in the fuel passage routes of the cylinders #1, #2. With this structure, in the event of a breakdown of one of the sensors, the other can be used in place for the former. That is, when both sensors function normally, the average of correction amounts, which are associated with the cylinders #1, #2, per cylinder or a value obtained by multiplying the average of correction amounts per cylinder by the above-mentioned predetermined coefficient is applied to the other cylinders #3, #4. In the event of a breakdown of one of the pressure sensors 20a, 20b, a correction coefficient for the other sensor which is not broken can be applied to other cylinders.

The processing shown in FIGS. 7 and 16 is applied to the cylinders #1, #2, so the pressure fluctuation (pressure transition waveform) is sensed for each of the cylinders #1, #2. In consequence, the injection characteristics associated with the predetermined injection can be estimated for each cylinder based on each sensing value of the pressure fluctuations.

The located positions of the pressure sensors 20a, 20b will be described below in detail. The pressure sensor 20a is disposed near the injector 20 of the cylinder #1, specifically, in a fuel inlet of the injector 20, like the above embodiment. The distance (fuel passage distance) LT1a between the located position of the pressure sensor 20a and the position of the fuel injection hole of the injector 20 is set shorter than the distance (fuel passage distance) LT2a between the located position of the pressure sensor 20a and the common rail 12. The pressure sensor 20b is located near the injector 20 of the cylinder #2. That is, the pressure sensor 20b is disposed in the pipe 14 apart from the fuel inlet of the injector 20 by a certain distance. The distance between the sensor 20b and the fuel injection hole of the injector 20 (fuel passage distance) is the distance LT3 in the figure. The distance (fuel passage distance) LT4a between the located position of the pressure sensor 20b and the fuel inlet of the injector 20 is set shorter than the distance (fuel passage distance) LT5a between the located position of the pressure sensor 20b and the common rail 12.

Thus, the pressure sensors 20a, 20b respectively provided to the fuel passage routes of the two cylinders #1, #2 are positioned such that the fuel passage distances LT1a, LT3a to the fuel injection holes (injection holes 21c) of the respective injectors 20 are different from each other. With this structure, the phase deviation (the phase deviation W1 as described above, see FIG. 20) can be determined according to a difference in distance between the sensors (previously stored in the EEPROM 32, for example). The relationship between the difference in distance and the phase deviation can be used for correction or the like of the injection characteristics associated with other cylinders.

In this case, it is effective to provide the fuel injection device with a program for comparing the two pressure transition waveforms respectively detected through the pressure sensors 20a, 20b to determine a phase deviation therebetween. With this structure, the detection of the phase deviation can be performed automatically.

It is also effective to provide the fuel injection device with a program (application adjustment device) for selectively using the sensor outputs from the pressure sensor 20a (first sensor) and the pressure sensor 20b (second sensor), which is located in a position further away from the fuel injection hole of the injector 20 than the sensor 20a, according to the application. For example, the fuel injection device may be constructed so that the applications of the two sensors 20a, 20b are varied based on establishment of a predetermined condition. Thus, the fuel pressure control of the injectors 20 and the like can be performed more appropriately. Specifically, for example, the pressure sensor 20b is used for the application of failsafe in the event of abnormality of the pressure sensor 20a. Thus, the pressure fluctuation can be sensed with higher accuracy in a normal period, and in the event of abnormality or failure of the pressure sensor 20a, the failsafe can be surely performed.

Figure 26A:
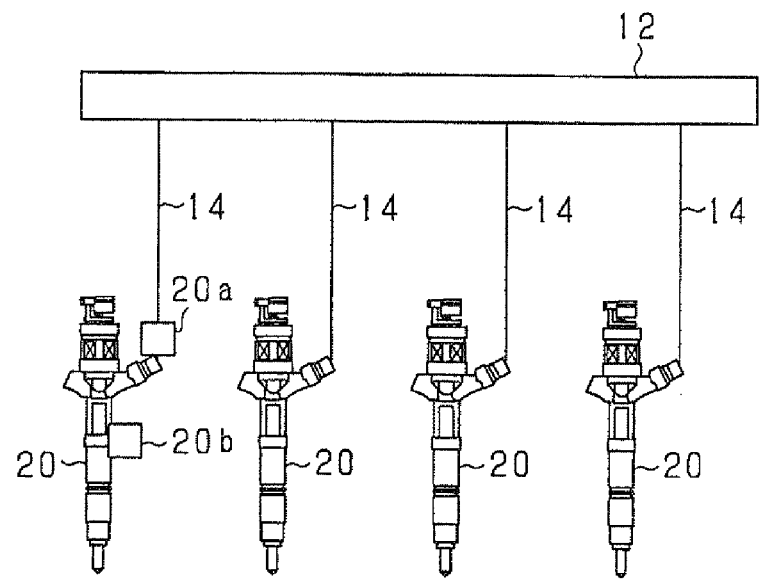
FIGS. 26A and 26B are schematic diagrams showing fuel injection systems of other modified examples of the embodiment.
Figure 26B:
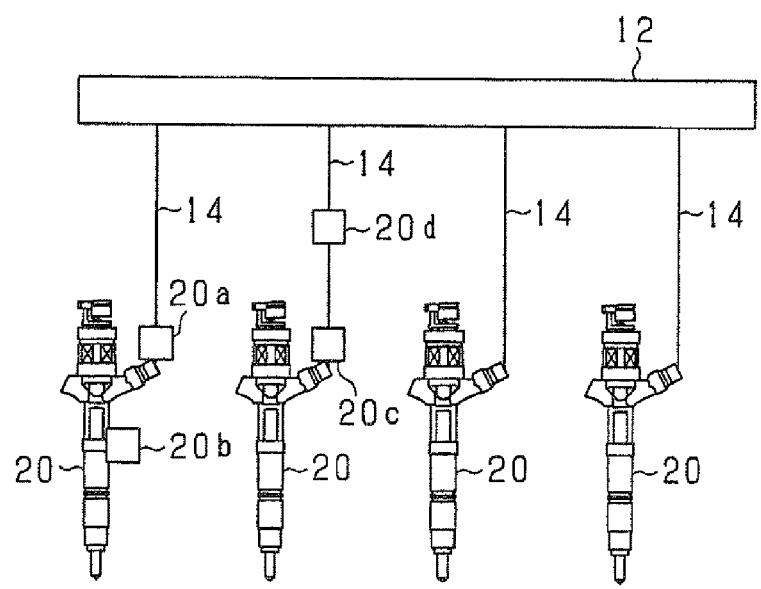

FIGS. 26A and 26B correspond to FIG. 25 and show other modifications. Also, in each system, all pipes 14 for the respective cylinders have the same length and shape. As shown in FIGS. 26A and 26B, each system includes pressure sensors disposed apart from each other by a predetermined distance in one fuel passage route associated with the same cylinder.

In the system shown in FIG. 26A, for example, two pressure sensors 20a, 20b are provided in one fuel passage route of the cylinder #1. One of the sensors (sensor 20a) is provided in the fuel inlet of the injector 20 and the other (sensor 20b) is provided inside the injector 20 (for example, in the fuel passage 22c shown in FIG. 2). With this structure, the distance between the pressure sensors 20a, 20b (separate distance) corresponds to a difference between the distances between the located positions of the respective pressure sensors 20a, 20b and the fuel injection hole of the injector 20. Therefore, like the above-mentioned structure, this structure can determine the phase deviation (the above-mentioned phase deviation W1, see FIG. 20) corresponding to the separate distance between both sensors (for example, beforehand stored in the EEPROM 32). In this case, since the phase deviation is determined in the fuel passage route of the same cylinder, the phase deviation can be sensed with higher accuracy without being effected by the individual difference between the cylinders.

The system shown in FIG. 26B has the sensors 20a, 20b in the fuel passage route of the cylinder #1 like the system shown in FIG. 26A and sensors 20c, 20d in the fuel passage route of the cylinder #2. Specifically, one of the sensors (sensor 20c) is disposed in the fuel inlet of the injector 20, and the other (sensor 20d) is disposed in the common rail fuel discharge side pipe 14. The sensor 20c is disposed in a position closer to the fuel injection hole of the injector 20 than to the common rail 12, and the sensor 20d is disposed in a position closer to the common rail 12 than to the fuel injection hole of the injector 20.

Like the above-mentioned structure, such a structure can determine the phase deviation according to the separate distance between both sensors (beforehand stored in the EEPROM 32, for example). In this structure, the pressure characteristics over the substantially entire area from the fuel injection hole of the injector 20 to the common rail 12 can be sensed by the pressure sensors 20a, 20b of the cylinder #1 and the pressure sensors 20c, 20d of the cylinder #2. This enables the determination of the phase deviation with higher accuracy. Furthermore, the pressure sensors 20c, 20d can measure the pressure value on the common rail 12 side and the pressure value on the fuel injection hole side. This also enables the sensing of the above-mentioned phase deviation or the like with higher accuracy.

It is effective to construct the above structure to respectively sense the pressure fluctuations (first and second pressure fluctuations) based on the respective sensor outputs from the pressure sensors 20a, 20b (or the pressure sensors 20c, 20d). It is more effective to provide the fuel injection device with a program (waveform comparison phase deviation obtaining device) for comparing the two pressure transition waveforms as the pressure fluctuations (first and second pressure fluctuations) to determine the phase deviation between the two waveforms. This construction enables automatic sensing of the pressure fluctuation based on the sensor outputs from the sensors disposed apart from each other, comparison of the pressure fluctuations (obtained as the pressure transition waveforms), and the like.

Furthermore, in this case, it is effective to provide the fuel injection device with a program (phase deviation coefficient obtaining device) for determining a volume elastic coefficient K based on the phase deviation obtained by such a program and the fuel passage distance between the pressure sensors 20a, 20b (or the pressure sensors 20c, 20d). The volume elastic coefficient K is a fluid property indicative of the degree of change in pressure accompanying the change in the volume of the fuel. Specifically, a propagation velocity v of the pressure waveform is determined from the phase deviation. Then, the volume elastic coefficient K is calculated based on a following relational expression. In the expression, ρ represents the fuel density. A known value can be used as the fuel density.

$$v = \sqrt{\frac{K}{\rho}}$$

This construction can determine the volume elastic coefficient K, which is important for pump control (in particular, the volume elastic coefficient of the fuel in a high-pressure portion) with high accuracy. The volume elastic coefficient K is affected by a property, temperature, pressure (base pressure) and the like of the fuel. Therefore, the volume elastic coefficient K determined by the program should be preferably stored in relation to these parameters. In order to improve utility and convenience, design data including the fuel passage distance between the sensors and the fuel density should be preferably inputted to the computation device (ECU 30) beforehand and the ECU 30 should preferably calculates (obtains) the volume elastic coefficient K automatically.

Figure 27:
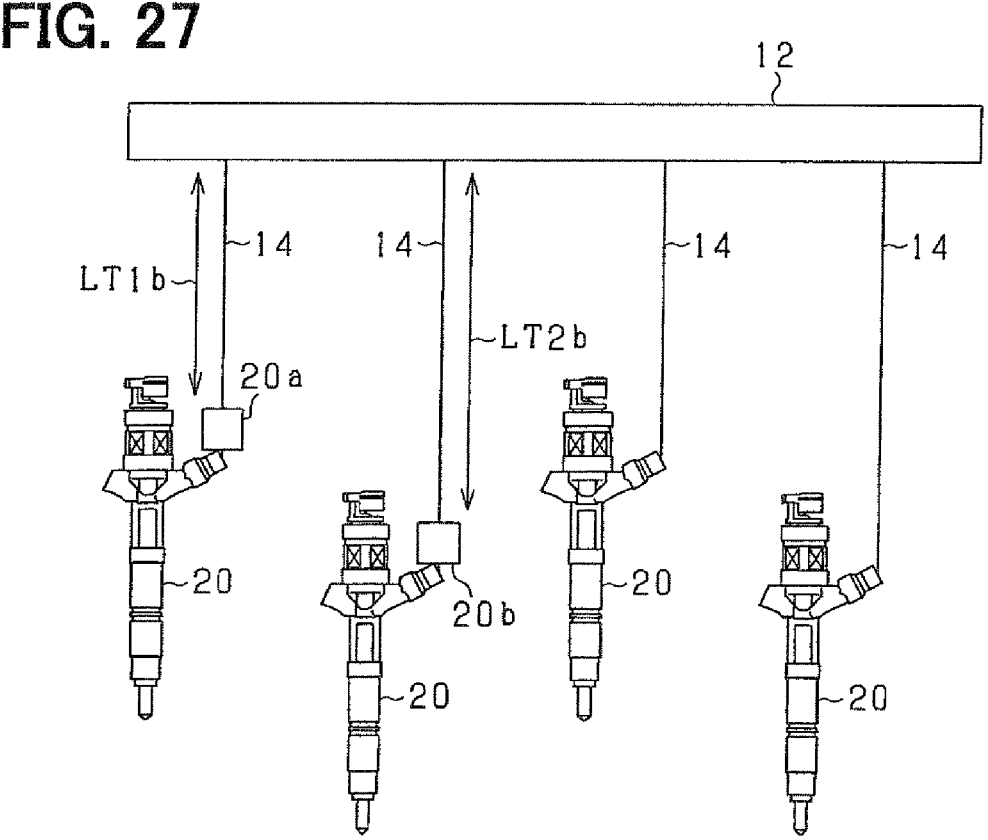
FIG. 27 is a schematic diagram showing the fuel injection system of another modified example of the embodiment.

FIG. 27 corresponds to FIG. 25 and shows another modification. In the system shown in FIG. 27, the pipes 14 for the cylinders #1, #3 are different from the pipes 14 for the cylinders #2, #4 in length of passage (in length of the pipe). As shown in FIG. 27, the pipe length of each cylinder has the following relationship. The pipe length LT1b of the pipe 14 for each of the cylinders #1, #3 is different from the pipe length LT2b of the pipe 14 for each of the cylinders #2, #4. The length LT2b is longer than the length LTb (LT2b>LT1b). The pressure sensors 20a, 20b are provided to the fuel passage routes of the cylinders #1, #2 respectively. The pressure sensors 20a, 20b are provided in the fuel inlets of the injectors 20.

Thus, the system has the pressure sensors 20a, 20b respectively provided in two passages having different passage lengths. The experiments or the like by the inventors show that the cycle of the pressure transition waveform lengthens as the pipe length (passage length) increases. Therefore, this structure enables the determination of the cycle deviation (see FIG. 22) according to the pipe length (for example, beforehand stored in the EEPROM 32). This relationship can be used, for example, for correction or the like of the injection characteristics associated with the other cylinders.

The pressure sensor 20a and the pressure sensor 20b are provided in respective groups with different pipe lengths (passage lengths) (two groups of the cylinders #1, #3 and the cylinders #2, #4 respectively). With this structure, the relationship can be effectively determined with the minimum necessary number of sensors. This achieves a reduction in the number of components, and eventually, an increase in space, a reduction in cost and the like.

In this case, it is effective to provide the fuel injection device with a program (cycle deviation obtaining device) for sensing the pressure transition waveforms by applying the processing shown in FIGS. 7 and 16 to the cylinders #1, #2 and then for comparing these two pressure transition waveforms to determine the cycle deviation therebetween. This structure enables automatic sensing of the cycle deviation (cycle difference) of the pressure transition waveforms.

It is also effective to provide the fuel injection device with a program (fuel passage coefficient obtaining device) for sensing the pressure transition waveforms by applying the processing shown in FIGS. 7 and 16 to the cylinders #1, #2 and for determining the volume elastic coefficient, which is a fluid property indicative of the degree of change in pressure accompanying the change in volume of fuel, based on the two pressure transition waveforms. Specifically, a propagation velocity of the pressure transition waveform can be calculated by multiplying a value, which is calculated by dividing the passage length of each fuel passage by the cycle of the pressure transition waveform (that is, passage length/cycle), by a predetermined coefficient associated with, for example, the shape of the passage or the like.

From this point of view, the above-mentioned structure can determine the propagation velocities in a plurality of kinds of fuel passages with different passage lengths. For example, by calculating an average of the thus-obtained plural kinds of data, the propagation velocity of the pressure transition waveform and further the volume elastic coefficient relating to the propagation velocity can be determined with high accuracy.

In the above-mentioned example, the fuel passage routes with the different passage lengths have been described. Basically, similar effects can be exerted also in the case of fuel passage routes with different passage shapes. It is because presence or absence of a curved part or various kinds of passage shapes including a geometry, a curve degree, a passage area and the like affects easiness of propagation of the fuel pressure, i.e., the propagation velocity or the like, of the pressure waveform.

Figure 28A:
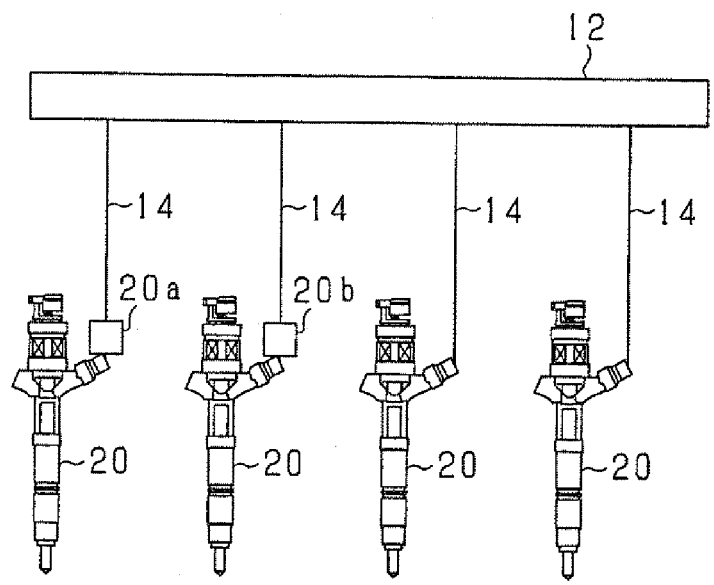
FIGS. 28A and 28B are schematic diagrams respectively showing fuel injection systems of yet further modified examples of the embodiment.
Figure 28B:
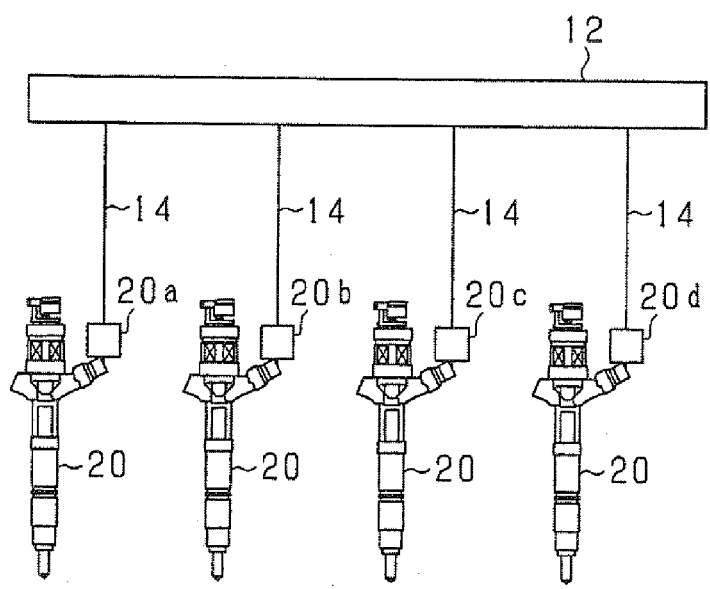

FIGS. 28A and 28B correspond to FIG. 25 and show yet another modifications. In the system shown in each of FIGS. 28A and 28B, all pipes 14 for the respective cylinders have the same length and shape.

In the system shown in FIG. 28A, the pressure sensors 20a, 20b are provided to the fuel inlets of the injectors 20 in the fuel passage routes for two cylinders #1, #2. That is, the pressure sensors 20a, 20b are disposed in such positions that the fuel passage distances from the pressure sensors 20a, 20b to the fuel injection holes (injection holes 21c) of the injectors 20 are substantially the same. The ECU 30 mounted in the system senses the pressure fluctuation for each of the cylinders #1, #2 and obtains an average of the sensing values. Thus, the ECU 30 reduces a sensing error in each sensor to improve the sensing accuracy of the pressure fluctuation. The average value is applied to other cylinders #3, #4. The structure shown in FIG. 28A can equalize measurement conditions between the sensors (the fuel passage distances to the fuel injection holes), so the above-mentioned average value can be obtained with higher accuracy.

With regard to the improvement of the detection accuracy of the pressure fluctuation, it is also effective to use a structure in which the fuel passage shapes between the sensors and the fuel injection holes of the injectors are substantially the same among the sensors provided to the multiple cylinders.

In the system shown in FIG. 28B, pressure sensors 20a, 20b, 20c, 20d are provided to all cylinders of the engine. The pressure sensors 20a-20d are respectively provided in the fuel inlets of the injectors 20. This structure enables direct determination of the pressure fluctuations (pressure transition waveforms) for all cylinders with the pressure sensors 20a-20d by applying the processing shown in FIGS. 7 and 16 to each cylinder, for example. Thus, the pressure fluctuation and further the injection characteristics can be obtained for each cylinder with high accuracy. As mentioned above, also as the structure for determining the average of the sensing values of the respective cylinders, the sensing accuracy can be improved.

In the case where the fuel passage pressure sensors are switched and used, it is effective to obtain data about the located position of the sensor used as a result of the switching operation every time the sensors are switched. As mentioned above, the various kinds of injection characteristics can be obtained based on the position of the sensor. Therefore, the positions of the sensors should be preferably identified constantly in order to obtain the injection characteristics with high accuracy.

In the case where the fuel passage pressure sensors are switched and used, the ECU 30 normally performs signal processing of the sensor outputs. In this case, a structure of a signal processing system may include computation circuits for the signal processing of the respective sensor outputs (see FIG. 30B). However, this case requires the same number of the computation circuits for the signal processing as the cylinders. From this point of view, a modified example of this embodiment will be described below.

Among all cylinders (four cylinders) of the engine, the cylinders whose periods of pressure fluctuation (pressure fluctuation periods) due to the actual injection of the respective injectors 20 can overlap each other are grouped together. The pressure fluctuations (pressure waveforms provided by the pressure sensors 20a-20d) are sensed for each group by the same number of computation circuits as the cylinders included in one group.

Figure 29:
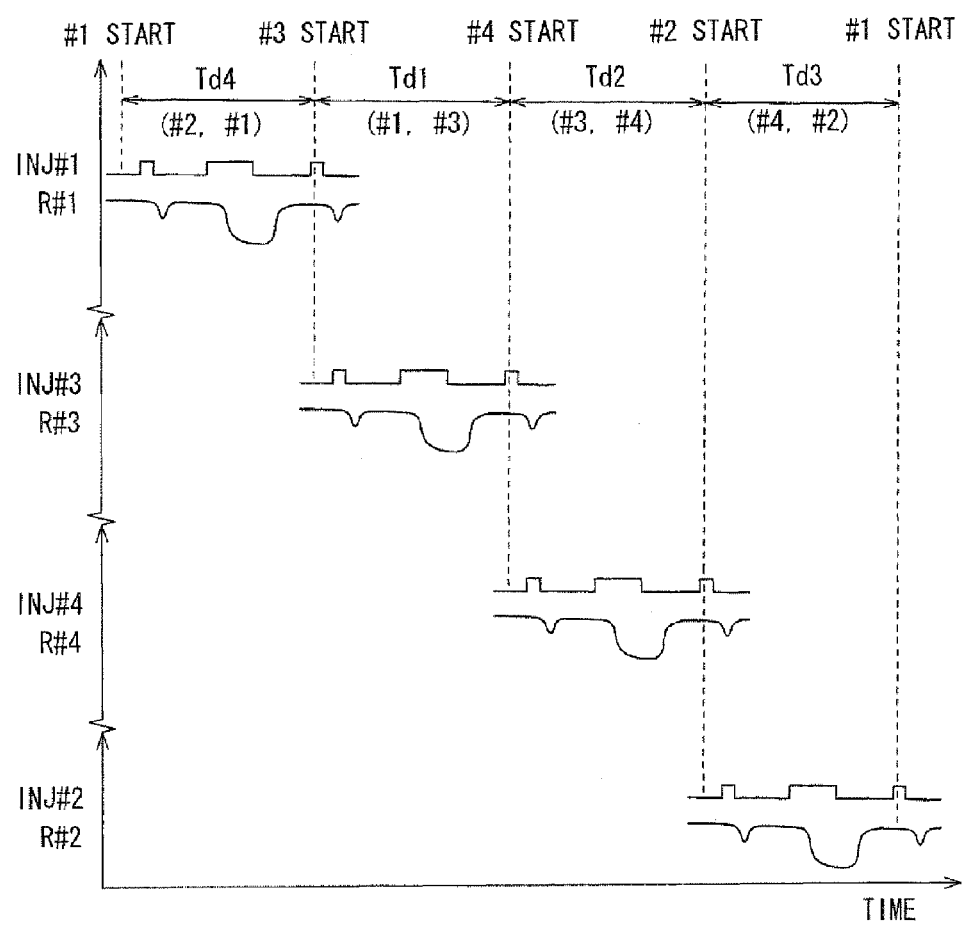
FIG. 29 is a time chart showing a detection mode of a pressure fluctuation caused by actual injection from the injector of a still modified example of the embodiment.
Figure 30A:
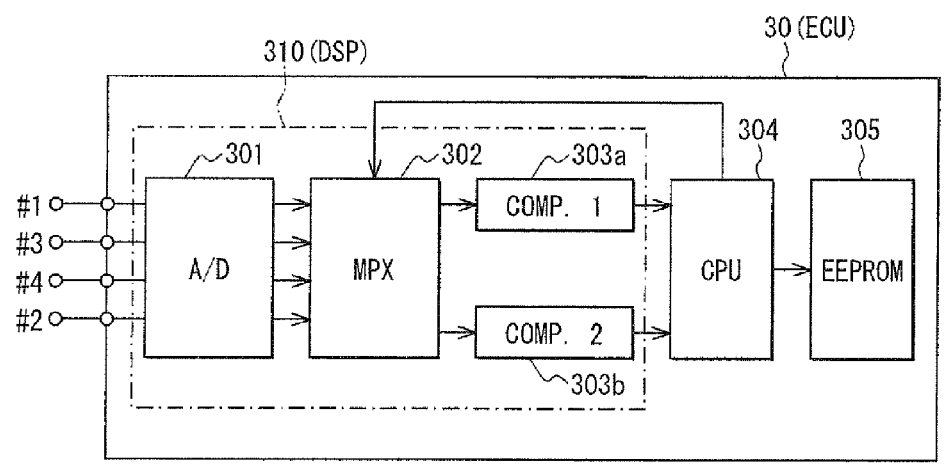
FIG. 30A is a diagram showing a circuit structure concerning the detection mode of the still modified example of the embodiment.
Figure 30B:
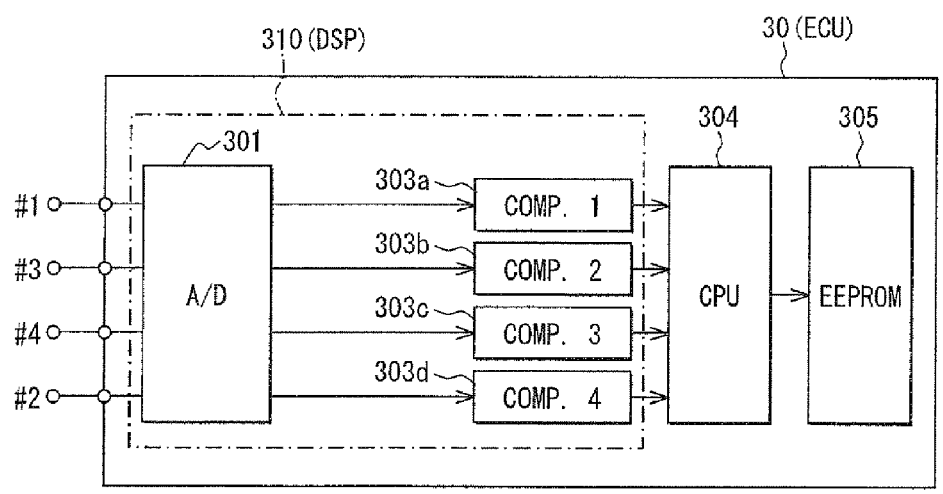
FIG. 30B is a schematic diagram showing a circuit structure concerning a detection mode of a comparison example.

By taking the case where the system shown in FIG. 28B is used as an example, sensing of the pressure fluctuation in the modified example will be described in detail below with reference to FIGS. 29, 30A and 30B. The cylinder as the object at that time is serially determined by a cylinder determination sensor (electromagnetic pickup) provided to a camshaft of an intake/exhaust valve of the engine as the object. One combustion cycle consisting of four strokes of intake, compression, combustion and exhaust is performed in a cycle of 720° CA for each of four cylinders #1-#4 of the engine. Specifically, for example, the combustion cycles for the respective cylinders are deviated from each other by 180° CA and are serially performed in the order of the cylinders #1, #3, #4, #2. FIG. 29 is a time chart showing the injection characteristics of all cylinders (cylinders #1, #3, #4, #2) of the engine. In FIG. 29, INJ#1, INJ#3, INJ#4 and INJ#2 respectively indicate transitions of injection command signals (pulse signals) applied to the injectors of the cylinders #1, #3, #4, #2. R#1, R#3, R#4 and R#2 indicate transitions of injection rates of the cylinders #1, #3, #4, #2. FIG. 30A is a structure diagram schematically showing a circuit structure of the ECU 30 of this modified example. For comparison, FIG. 30B shows an example (comparison example) in which computation circuits for signal processing are provided for the respective sensor outputs of the cylinders #1-#4.

As shown in FIG. 29, in this example, three-stage injection of pilot injection, main injection and post-injection is performed in each cylinder. Accordingly, the pressure fluctuation period of the cylinder as the object of combustion overlaps with the pressure fluctuation period of the two cylinders before and after the cylinder as the object among all cylinders (four cylinders) of the engine. To cope with this, two cylinders adjacent to each other in order of combustion (that is, the cylinders #1, #3, the cylinders #3, #4, the cylinders #4, #2, or the cylinders #2, #1) are serially selected, and the pressure fluctuations of the selected two cylinders are sensed.

Specifically, as shown in FIG. 30A, the ECU 30 includes an A/D converter 301 for converting a sensor output as an analog signal into a digital signal and a multiplexer 302 (MPX, selection circuit) for receiving input of the digital signals converted by the A/D converter 301 and for selecting two predetermined signals from the input signals on hardware (a circuit). The two adjacent cylinders in order of combustion are selected through the multiplexer 302, and the pressure fluctuations of the two selected cylinders are sensed by a first computation circuit 303a and a second computation circuit 303b. The first and second computation circuits 303a, 303b are designed to perform predetermined computation (of fixed calculation contents) at high speed on a stage preceding the CPU 304. The computation circuits 303a, 303b, the A/D converter 301 and the multiplexer 302 constitute a high-speed digital processor (DSP) 310. The data (pressure waveforms sensed by the pressure sensors 20a-20d) detected for the respective cylinders are stored in an EEPOM 305 (or a backup RAM or the like) such that the data are identifiable for the respective cylinders (such that the cylinder corresponding to the data can be identified from the cylinders #1-#4).

With such a circuit structure, as shown in FIG. 29 as described above, for example, the cylinder #1 is processed by the first computation circuit 303a and the cylinder #3 is processed by the second computation circuit 303b (during a detection period Td1), Then, the cylinder #3 is processed by the first computation circuit 303a and the cylinder #4 is processed by the second computation circuit 303b (during a detection period Td2). Next, the cylinder #4 is processed by the first computation circuit 303a and the cylinder #2 is processed by the second computation circuit 303b (during a detection period Td3). Then, the cylinder #2 is processed by the first computation circuit 303a and the cylinder #1 is processed by the second computation circuit 303b (during a detection period Td4). Again, the cylinder #1 is processed by the first computation circuit 303a and the cylinder #3 is processed by the second computation circuit 303b (during the detection period Td1). The same processing will be continued in the same way. In this way, the cylinders whose pressure fluctuation periods can overlap with each other, that is, two cylinders adjacent to each other in order of combustion are grouped (selected).

Then, the pressure fluctuations (pressure waveforms sensed by the pressure sensors 20a, 20d) of the cylinders in the group (the cylinders #1, #3, the cylinders #3. #4, etc.) are sensed (simultaneously sensed in the overlapping portion). The detection of one cylinder in the group is ended at every start timing (for example, detected by the cylinder determination signal) of the combustion cycle of a next cylinder to be detected, which is detection start timing of the next cylinder. The multiplexer 302 enters the next cylinder to be detected in place for the cylinder whose detection is ended (with the other cylinder in the group is maintained), and thus switches from the group to another group in turn. For example, at the time of transition from the detection period Td1 to the detection period Td2, the next cylinder to be detected is the cylinder #4, the cylinder whose detection is ended is the cylinder #1, and the cylinder retained in the group is the cylinder #3. In this way, the pressure fluctuations of all cylinders #1-#4 can be sensed with only the same number (two) of computation circuits (first and second computation circuits 303a, 303b) as the cylinders included in the group. In consequence, this structure can reduce the number of the computation circuits as compared to the circuit structure of the comparison example shown in FIG. 30B. Specifically, the two computation circuits 303a, 303b shown in FIG. 30A can replace the four computation circuits 303a-303d shown in FIG. 30B. In this modified example, the circuit (multiplexer) for grouping (selecting of the cylinders) serves as the grouping device and the selection circuit.

The detection start timing of the cylinder to be detected next may be detected as the first injection start timing in one combustion cycle. Such injection start timing can be detected, for example, based on an injection command sent to the injector 20.

Figure 31:
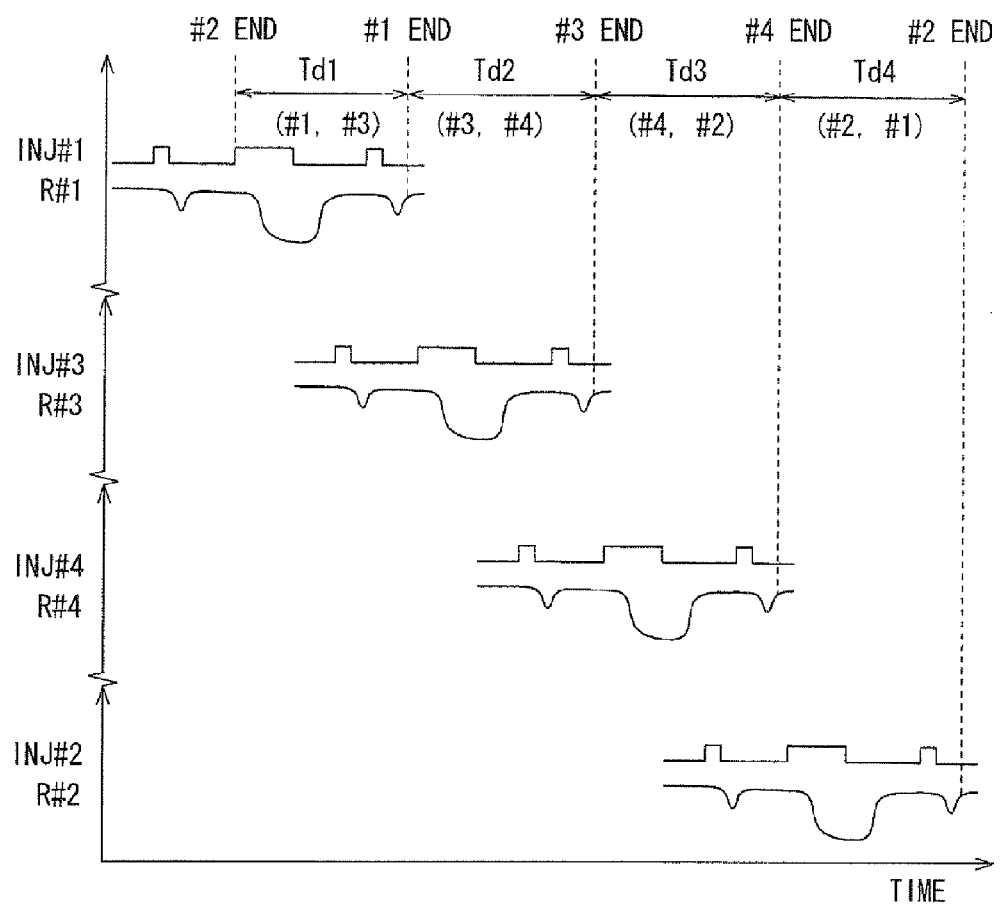
FIG. 31 is a time chart showing a detection mode of the pressure fluctuation caused by actual injection from an injector of a further modified example of the embodiment.

The above grouping (switching of the selected cylinder) may be changed in a manner shown in FIG. 31. That is, in the manner shown in FIG. 31, every time detection of any one of the cylinders selected at that time is completed, specifically, at every pressure fluctuation end timing associated with the last injection in one combustion cycle, one of the two cylinders selected at that time is switched to another cylinder to be detected next. Also, in this way, the pressure fluctuations of all cylinders #1-#4 can be basically detected by the circuit structure shown in FIG. 30A.

When the system shown in FIG. 29 and the system shown in FIG. 31 are compared, the system shown in FIG. 29 that switches the cylinder at every detection start timing of the cylinder to be detected next emphasizes the data about early injection by obtaining data regarding the first injection of the next cylinder without obtaining data about the posterior injection at the timing for obtaining the data about the next cylinder. In contrast, the system as shown in FIG. 31 that switches the cylinders every time the detection of the cylinder is completed emphasizes the data regarding the late injection by obtaining data including the last injection of the cylinder, the data obtainment of which is once started. These systems should be preferably selectively used according to the application or the like. Generally, the data about the early injection (pilot injection or the like) is more important, so the former system is more beneficial.

It is apparent that either one of the methods need not be selected, and that a combination of both is useful. The fuel injection device may include a program for selecting any one of the methods based on a predetermined condition. For example, when the detection start timing of the cylinder to be detected next is reached before completion of the detection of the cylinder being detected at that time, the former method is employed to switch the cylinders at the detection start timing. On the other hand, when the detection of the cylinder being detected is completed before the detection start timing of the cylinder to be detected next, the latter method is employed to switch the cylinders at the completion timing of the detection. The detection of the next cylinder is suspended from the switching timing to the next detection start timing. In this way, the sensor output obtaining period can be shortened further, thereby decreasing a processing load on the computation section and a storage area for use in the temporary storage memory (RAM).

When the pressure fluctuation periods can overlap not only between two cylinders but also among three cylinders, a construction of setting the number of cylinders included in one group (the number of selected cylinders) to three is also effective. If necessary, four or more cylinders may be grouped according to the application or the like.

Figure 32:
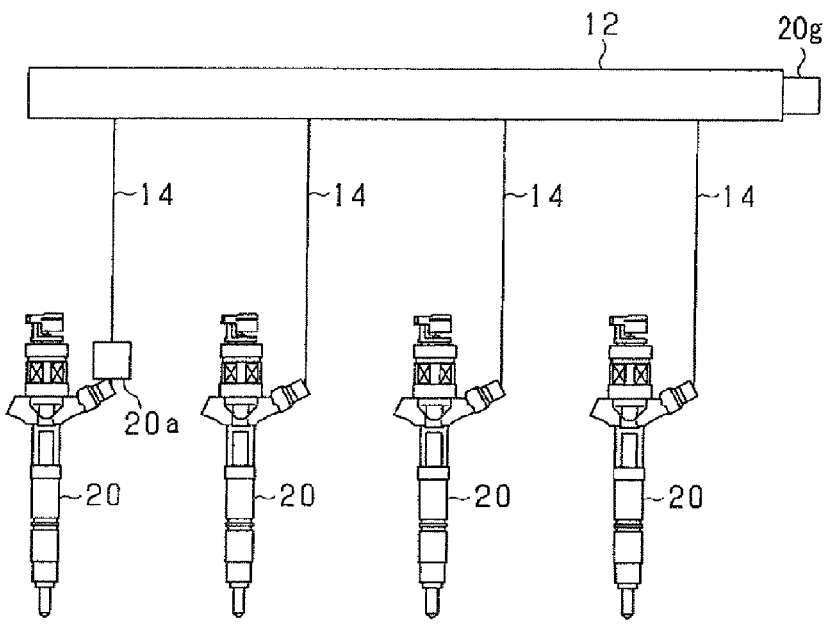
FIG. 32 is a schematic diagram showing a fuel injection system of a still further modified example of the embodiment.

FIG. 32 corresponds to FIG. 25 and shows a further modification. As shown in FIG. 32, the system has a rail pressure sensor 20g for measuring the pressure in the common rail 12 in addition to the pressure sensor 20a (fuel passage pressure sensor). This structure enables obtainment of the pressure in the common rail 12 (rail pressure) as well as the pressure value in each time measured by the pressure sensor 20a. For example, based on the rail pressure, the fuel pressure of another cylinder without the pressure sensor 20a can be detected more accurately. In the case where detection of the injection characteristics of the injector 20 is performed, the basic pressure value (base pressure value) can also be detected based on the rail pressure. An average pressure value or the like per unit time (for example, 180° CA corresponding to one stroke in the four-stroke engine) can be used as the basic pressure value (base pressure).

Figure 33:
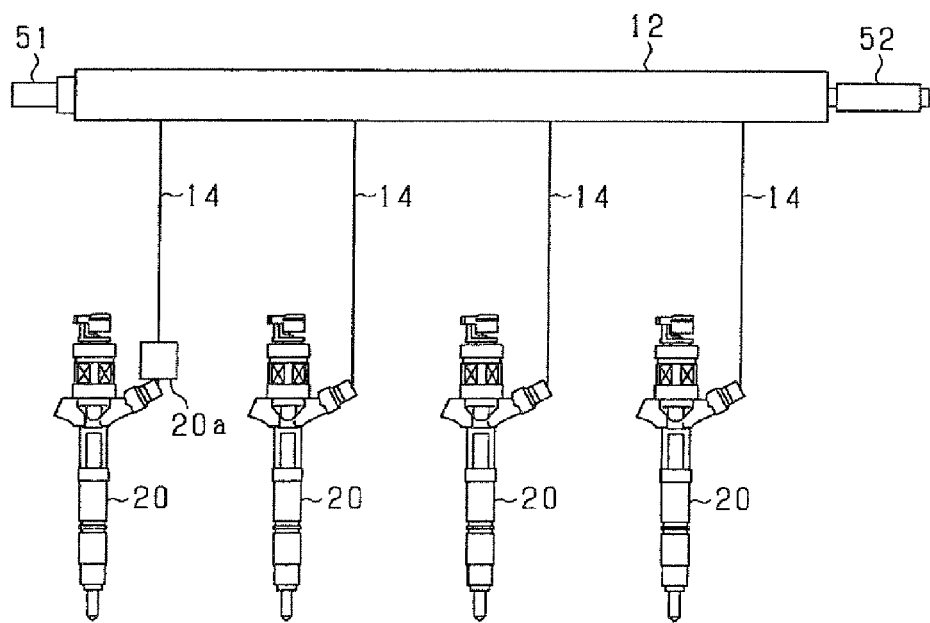
FIG. 33 is a schematic diagram showing a fuel injection system of another modified example of the embodiment.

FIG. 33 corresponds to FIG. 25 and shows another modification. As shown in FIG. 33, a pressure reducing valve 51 and a pressure limiter 52 are provided on both ends of the common rail 12 in the system. The system having two components on the common rail 12 does not have any more space for attaching a rail pressure sensor on the end of the common rail 12. Accordingly, in such case, the pressure sensor has to be attached to the center of the common rail 12. However, in such case, the located portion of the sensor protrudes to worsen accommodation performance of the common rail 12. As a result, it becomes difficult to assure the space for positioning the common rail 12. From this point of view, the system shown in FIG. 33 has the pressure sensor 20a (fuel passage pressure sensor), thereby enabling detection of the injection pressure and further injection control based on the pressure in the above-mentioned mode. If necessary, the detection of the injection pressure of other cylinders and the injection control based on the pressure can be performed. Even in the system with two components already attached on both ends of the common rail 12, the fuel injection device according to the above-mentioned embodiment or the modified examples can control the injection appropriately, while largely relaxing restrictions on the space for positioning the common rail 12.

Figure 34A:
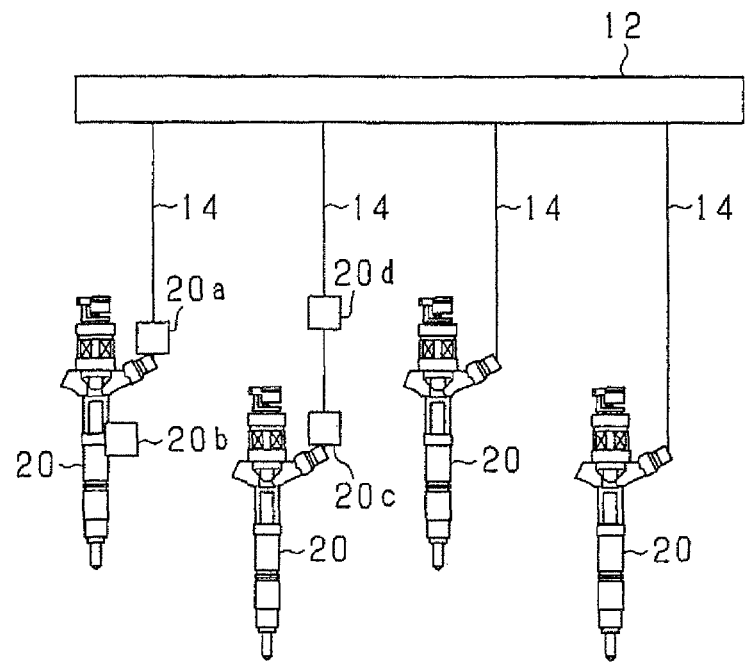
FIG. 34A is a schematic diagram showing a fuel injection system of yet another modified example of the embodiment.
Figure 34B:
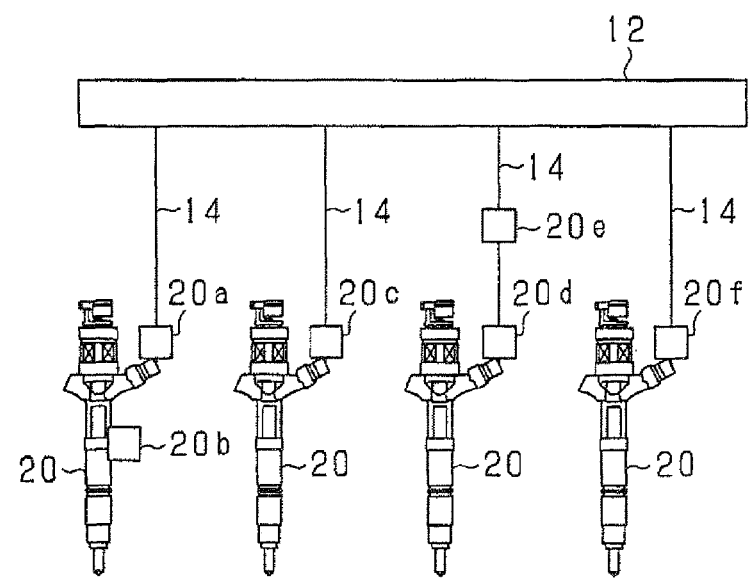
FIG. 34B is a schematic diagram showing a fuel injection system of a further modified example of the embodiment.

The above-mentioned embodiment and the modified examples can be combined arbitrarily. FIGS. 34A and 34B correspond to FIG. 25 and show two combinations as examples. In the system shown in FIG. 34A, the pipes 14 for the cylinders #1, #3 differ from the pipes 14 for the cylinders #2, #4 in passage length (pipe length). In the system shown in FIG. 34B, all pipes 14 for the respective cylinders have the same length and shape.

In the system as shown in FIG. 34A, the cylinders #1, #2 with different pipe lengths are provided with the pressure sensors 20a, 20b and the pressure sensors 20c, 20d respectively. The pressure sensors 20a, 20b are disposed apart from each other by a predetermined distance. The pressure sensors 20c, 20d are also disposed apart from each other by a predetermined distance. This structure enables highly accurate determination of the phase deviation (see FIG. 20) and the cycle deviation (see FIG. 22).

In the system shown in FIG. 34B, the pressure sensors 20a, 20c, 20d, 20f are provided in the respective fuel inlets of the injectors 20 of all cylinders of the engine. The cylinders #1, #3 are provided with the pressure sensors 20a, 20b and the pressure sensors 20d, 20e respectively. The pressure sensors 20a, 20b are disposed apart from each other by a predetermined distance. The pressure sensors 20d, 20e are also disposed apart from each other by a predetermined distance. The structure enables highly accurate obtainment of the above-mentioned pressure fluctuations and further the injection characteristics of the respective cylinders. Also, the structure enables highly accurate determination of the phase deviation (see FIG. 20).

In step S32 shown in FIG. 7, filtering processing may be performed to extract a pressure value of a specific frequency component from the pressure values in the respective times measured by the pressure sensor 20a (that is, to remove the frequency components except for a target frequency component), and then, the pressure value after the filtering processing may be stored. The pressure drop point and the pressure rise point may be detected based on the pressure value of the specific frequency component extracted by such a program (filtering device). Thus, disturbance or the like is removed, and the detection accuracy is improved on the occasion of the detection of the pressure drop point and the pressure rise point.

At the pressure drop point and the pressure rise point, pressure drop or pressure rise in an arbitrary mode may be set according to the application or the like (in a mode suitable for the application). For example, a construction to set (detect) the optimal pressure drop point or the pressure rise point according to the characteristics or the like for each injector is effective.

The number of fuel passage pressure sensors is arbitrary. For example, three or more sensors may be provided in the fuel passage route of one cylinder. It is sufficient if at least one of the sensors is disposed in the fuel passage between a point of the common rail fuel discharge side pipe 14 apart from the common rail 12 by a certain distance and the fuel injection hole (injection hole 21c) of the injector 20 (injector) connected to the pipe 14.

In the above-mentioned embodiment, it is assumed to use the adapted map with the adapted values beforehand determined by experiments or the like (used in step S11 shown in FIG. 3). In order to store the correction coefficient for correcting the injection characteristics using the adapted map, the fuel injection device includes the EEPROM 32 enabling nonvolatile storage of the correction coefficient. The invention is not limited thereto, and for example, a value after correction (value reflecting the correction coefficient) may be stored in the EEPROM 32, instead of the correction coefficient. If such a structure provides sufficient reliability of the corrected value, the structure without the adapted map, that is, a so-called no-adaptation structure, can be employed. The fuel injection device can employ any other storage device other than the EEPROM as long as the storage device can store the correction coefficient or the corrected value in a nonvolatile manner. For example, another nonvolatile memory, backup RAM or the like can be employed. Likewise, as a storage device for storing the reference pressure fluctuation, the sensor mounting positions or the like, a non-volatile memory other than the EEPROM, a backup RAM or the like can be employed.

The injector as the object is not limited to the injector shown in FIG. 2 but is arbitrary. For example, instead of the electromagnetically driven injector 20 embodied in FIG. 2, a piezo-drive type injector may be used. An injector that does not cause the pressure leak such as a direct-acting injector that does not use a hydraulic chamber (command chamber Cd) for transmitting the driving power (for example, a direct-acting piezo injector) can be used. In this case, only the pressure fluctuation caused by the actual injection is detected. The use of the direct-acting injector facilitates the control of the injection rate.

Figure 35A:
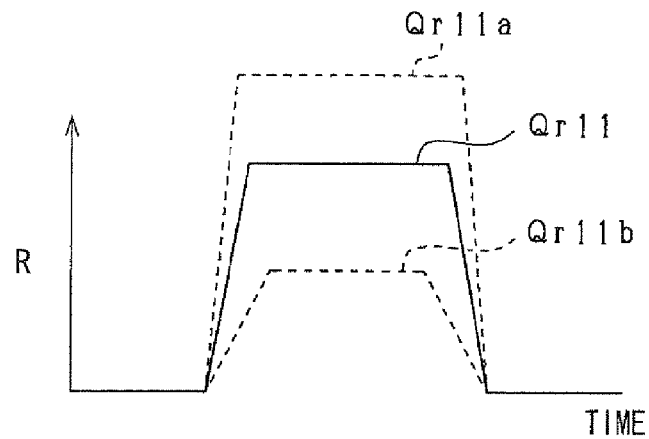
FIGS. 35A to 35C are time charts respectively showing fluctuations of injection rates of other modified examples of the embodiment.
Figure 35B:
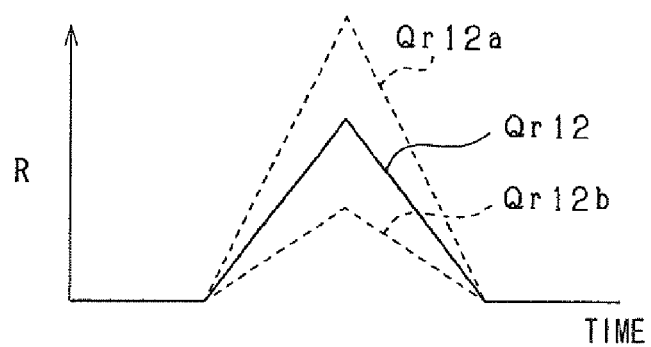
Figure 35C:
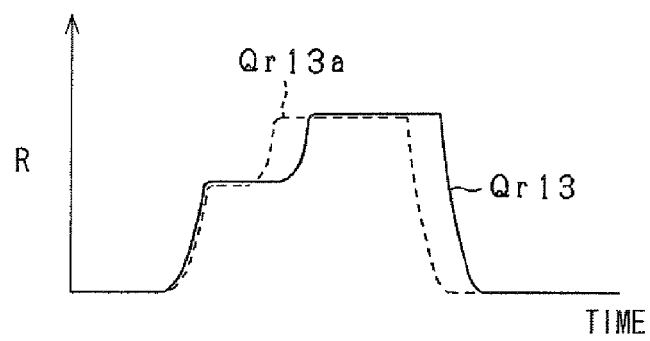

It is also effective to estimate the fluctuation of the injection rate during the injection period of the injector with the above-mentioned program (injection characteristic estimating device). Specifically, the fluctuation (i.e., transition) of the injection rate R is estimated, for example, as shown in FIGS. 35A to 35C. Based on the estimated fluctuation of the injection rate R, the injection condition of the injector or the injection command to the injector is adjusted in the fluctuation of the injection rate R. Thus, parameters such as an ascent/descent speed of the injection rate R, the length of a stable period, and ascent/descent timing in the case where ascent/descent is performed in a stepwise fashion are adjusted.

In examples shown in FIGS. 35A and 35B, the ascent/descent speed of the injection rate R of each of injection characteristics Qr11, Qr12 in a trapezoid shape and a triangle shape (i.e., of a delta type) is adjusted. In FIGS. 35A and 35B, the injection rate characteristics Qr11a, Qr12a represent examples in which the ascent/descent speed of the injection rate R is increased. The injection rate characteristics Qr11b, Qr12b represent examples in which the ascent/descent speed of the injection rate R is decreased. Adjustment of the ascent/descent speed can be performed by adjusting the pressure in the common rail 12 (corresponding to one of injection conditions of the injector). This uses the phenomenon that the ascent/descent speed of the injection rate increases as the rail pressure increases. In order to adjust the length of the stable period, the shape of the injection characteristic serving as a base may be switched between the trapezoid shape shown in FIG. 35A and the triangle shape shown in FIG. 35B. The above-mentioned direct-acting injector can easily change the base shape by adjusting the injection command to the injector.

In an example shown in FIG. 35C, the ascent/descent timing of a so-called boot-type injection rate characteristic Qr13 that performs ascent/descent in a stepwise fashion is adjusted. Specifically, timing for increasing the injection rate R is advanced from the injection rate characteristic Qr13 to the injection rate characteristic Qr13a. The above-mentioned direct-acting injector can easily adjust the ascent/descent timing by adjusting the injection command to the injector.

Such the estimation or adjustment of the injection rate characteristics (fluctuation of the injection rate) may be performed not only in the main injection but also in the injection performed before and after the main injection in the multiple injection (for example, the pilot injection, the post-injection and the like).

It is also effective to provide the fuel injection device with a program for estimating a second parameter associated with an operation of the engine other than a predetermined first parameter associated with the engine operation based on various kinds of injection characteristics estimated by the above-mentioned program (injection characteristic estimating device) and a sensor output from a sensor for detecting the predetermined first parameter. As mentioned above, the program (injection characteristic estimating device) according to the above-mentioned embodiment or the modified examples can estimate the injection characteristics (corresponding to one parameter associated with the engine operation) with high accuracy. Accordingly, the use of the injection characteristics estimated with high accuracy and the first parameter (sensor output) detected through the sensor with high accuracy enables highly accurate estimation of the another second parameter.

For example, the injection rate (see, for example, FIGS. 9 and 10) may be estimated with the above-mentioned program, and an air-fuel ratio may be detected with an oxygen concentration sensor (for example, an A/F sensor). This scheme can determine an amount of air suctioned into the cylinder with high accuracy based on the injection rate and sensor output. For example, the suction air amount is calculated by a following relational expression: A/F=Qa/Qf, wherein A/F represents the air-fuel ratio, Qa is the suctioned air amount, and Qf is the fuel injection quantity. As a result, the detection error of an airflow meter provided in an intake passage can be corrected.

Alternatively, the fuel injection timing (see, for example, FIGS. 8 and 17) may be estimated with the above-mentioned program, and a pressure fluctuation in the cylinder may be detected with a cylinder pressure sensor (CPS, pressure sensor disposed in the engine cylinder) (for example, the pressure transition may be serially detected). Thus, the fuel property (octane number or cetane number) of the fuel can be determined with high accuracy based on the injection characteristic and the sensor output. Specifically, ignition timing can be calculated from the sensor output (and eventually a change in pressure) of the cylinder pressure sensor based on a correlation between the cylinder internal pressure and the combustion state. The ignition timing mainly depends on the fuel injection timing and the fuel property. Accordingly, the fuel property can be determined with high accuracy based on the ignition timing and the fuel injection timing by detecting the ignition timing and the fuel injection timing with high accuracy.

In the above-mentioned embodiment, the sensor outputs are serially obtained at the intervals of 20 μsec (i.e., in a cycle of 20 μsec), but the invention is not limited thereto. The interval for obtaining the outputs may be changed arbitrarily in a range capable of grasping the trend of the pressure fluctuation as mentioned above. The experiment by the inventors shows that an interval shorter than 50 μsec is effective.

The above-mentioned embodiment and the modified examples assume that various types of software (programs) are used. Alternatively, similar functions may be realized with hardware such as dedicated circuits.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection device of a common rail type fuel injection system for an engine, the fuel injection device comprising:
    at least one fuel passage pressure sensor disposed in a fuel passage between a point of a pipe connected to a fuel discharge port of a common rail apart from the common rail by a certain distance and a fuel injection hole of an injector connected to the pipe, the sensor measuring a fuel pressure at a position where the sensor is disposed;
    a pressure fluctuation sensing device configured to sense a pressure fluctuation caused by at least one of an injection operation of the injector and actual injection actually performed through the injection operation based on a sensor output from the fuel passage pressure sensor; and
    an injection characteristic detecting device configured to detect at least one injection characteristic of the injector based on the pressure fluctuation sensed by the pressure fluctuation sensing device, wherein
    the injection characteristic detected by the injection characteristic detecting device is at least one of an actual injection rate and a fluctuation of the actual injection rate in an injection period of the injector, wherein the actual injection rate is an instantaneous injection quantity of fuel in a time interval shorter than the injection period;
    wherein the pressure fluctuation sensing device is configured to obtain multiple pressure sensor values, which are respectively sensed at multiple timings including a timing near an injection timing during the injection, from the at least one fuel passage pressure sensor at time intervals which are shorter than the injection period; and
    wherein the injection characteristic detecting device is configured to:
    calculate a difference value between each of the multiple pressure sensor values and a pressure value, which is caused by a pressure decrease from a common rail pressure in the common rail due to fuel leak after start of an injection start command, to obtain a series of difference values including the difference value; and
    detect the actual injection rate based on the series of difference values.

2. The fuel injection device according to claim 1, further comprising:
    a fuel pulsation reducing device provided in a connection portion between the common rail and the pipe configured to reduce a fuel pulsation transmitted to the common rail via the pipe, wherein
    the fuel passage pressure sensor is disposed on the injector side of the fuel pulsation reducing device.

3. The fuel injection device according to claim 2, wherein the fuel pulsation reducing device is one or a combination of an orifice and a flow damper.

4. The fuel injection device according to claim 1, wherein the pressure fluctuation sensing device is configured to sense the pressure fluctuation caused by at least one of the injection operation of the injector and the actual injection thereof in the form of a pressure transition waveform by sequentially obtaining the sensor outputs from the fuel passage pressure sensor at intervals short enough to draw a track of the pressure transition waveform with the sensor outputs.

5. The fuel injection device according to claim 1, wherein the pressure fluctuation sensing device is configured to sense the pressure fluctuation caused by at least one of the injection operation of the injector and the actual injection thereof by sequentially obtaining the sensor outputs from the fuel passage pressure sensor at intervals shorter than 50 μsec.

6. The fuel injection device according to claim 2, further comprising:
a period setting device configured to set a sensor output obtaining period for serially obtaining the sensor outputs to a predetermined limited period including at least a pressure fluctuation period during which the pressure fluctuation is caused by the actual injection of the injector.

7. The fuel injection device according to claim 6, wherein the period setting device is configured to set start timing of the sensor output obtaining period with respect to injection start command timing of the injector, which is instructed by an injection start command associated with the first injection operation among one or more injections performed by the injector during one combustion cycle of the engine, and to set end timing of the sensor output obtaining period based on the pressure fluctuation after execution of the last injection in the same cycle sensed by the pressure fluctuation sensing device.

8. The fuel injection device according to claim 2, further comprising:
a stopping period setting device configured to set a stopping period for temporarily stopping the obtainment of the sensor output in a part of a stable pressure period, in which the fuel pressure at the located position of the fuel passage pressure sensor is stable, among the sensor output obtaining period for serially obtaining the sensor outputs.

9. The fuel injection device according to claim 8, further comprising:
a stable period start detection device configured to detect start timing of the stable pressure period based on the pressure fluctuation sensed by the pressure fluctuation sensing device, wherein
the stopping period setting device is configured to set start timing of the stopping period to the start timing of the stable pressure period detected by the stable period start detection device or to timing a predetermined time after the start timing and is configured to set end timing of the stopping period to injection end command timing instructed by an injection end command to the injector.

10. The fuel injection device according to claim 1, wherein the engine is a multi-cylinder engine in which all cylinders of the engine are respectively provided with the fuel passage pressure sensors, the fuel injection device comprising:
a grouping device configured to group the cylinders whose pressure fluctuation periods can overlap with each other among all the cylinders of the engine, the pressure fluctuation period being a period during which the pressure fluctuation is caused by the actual injection of the injector, wherein
the pressure fluctuation sensing device is configured to sense the pressure fluctuation of each cylinder included in each group formed by the grouping device and switches between the groups in turn while ending the sensing concerning at least one cylinder in the group, thereby sensing the pressure fluctuation of every cylinder in the engine.

11. The fuel injection device according to claim 1, wherein the engine is a multi-cylinder engine with a plurality of cylinders for performing combustion in the respective cylinders in turn, all cylinders of the engine being respectively provided with the fuel passage pressure sensors, the fuel injection device further comprising:
a cylinder selecting device configured to select two or three cylinders adjacent to each other with regard to the order of the combustion among all the cylinders included in the engine, wherein
the pressure fluctuation sensing device is configured to sense the pressure fluctuation of each of the two or three cylinders selected by the cylinder selecting device.

12. The fuel injection device according to claim 11, wherein
the cylinder selecting device is a selection circuit is configured to select a predetermined signal from input signals on a circuit, and
the pressure fluctuation sensing device includes computation circuits respectively for the two or three cylinders selected by the cylinder selecting device to perform computation for simultaneously sensing the pressure fluctuations of the respective cylinders.

13. The fuel injection device according to claim 1, further comprising:
a device configured to estimate a second parameter associated with an operation of the engine other than a predetermined first parameter associated with the engine operation based on the injection characteristics estimated by the injection characteristic estimating device and a sensor output from a sensor configured to detect the first parameter.

14. The fuel injection device according to claim 1, further comprising:
a device configured to adjust an injection condition of the injector or an injection command to the injector based on the fluctuation of the actual injection rate in the injection period detected by the injection characteristic detecting device.

15. The fuel injection device according to claim 1, further comprising:
an injection characteristic correction device configured to perform correction concerning the injection of the injector based on the pressure fluctuation sensed by the pressure fluctuation sensing device.

16. The fuel injection device according to claim 15, further comprising:
an after correction injection characteristic detecting device configured to detect the injection characteristic of the injector based on the pressure fluctuation, which is sensed by the pressure fluctuation sensing device after the correction by the injection characteristic correction device.

17. The fuel injection device according to claim 15, wherein the engine is the multi-cylinder engine, the fuel injection device further comprising:

a cylinder characteristic reflecting device configured to correct the same parameter associated with at least one of other cylinders as a predetermined parameter associated with a predetermined cylinder based on one of an amount of correction of one cylinder corrected by the injection characteristic correction device and an average per cylinder of the correction amounts associated with the cylinders.

18. The fuel injection device according to claim 17, wherein
the cylinder characteristic reflecting device is configured to use a value that has the same sign as and that is smaller than the correction amount of the predetermined parameter or the average thereof as a correction coefficient of the same parameter for at least one of other cylinders.

19. The fuel injection device according to claim 18, wherein
the smaller value that has the same sign as and that is smaller than the correction amount of the predetermined parameter or the average thereof is a value obtained by multiplying the correction amount of the predetermined parameter or the average thereof by a predetermined coefficient smaller than 1.

20. The fuel injection device according to claim 19, further comprising:
a variable coefficient setting device configured to variably set the predetermined coefficient to a smaller value as a parameter indicative of a degradation degree of the common rail type fuel injection system indicates a larger degradation degree.

21. The fuel injection device according to claim 20, wherein
the parameter indicative of the degradation degree of the common rail type fuel injection system is a parameter indicative a length of used time of the system.

22. The fuel injection device according to claim 21, wherein
the parameter indicative of the length of used time of the system is a travel distance of a vehicle equipped with the engine.

23. The fuel injection device according to claim 20, wherein
the pressure fluctuation sensing device is configured to sense at least a part of a pressure transition waveform as the pressure fluctuation caused by at least one of the injection operation of the injector and the actual operation thereof,
the fuel injection device further comprises a reference comparison difference obtaining device configured to compare a point of the pressure transition waveform sensed by the pressure fluctuation sensing device with a corresponding point of a predetermined reference pressure transition waveform to determine a difference therebetween, and
the variable coefficient setting device is configured to variably set the predetermined coefficient to a smaller value as the difference obtained by the reference comparison difference obtaining device becomes larger by using the difference as the parameter indicative of the degradation degree of the common rail type fuel injection system.

24. The fuel injection device according to claim 1, further comprising:
an abnormality determining device configured to determine presence or absence of an abnormality in the common rail type fuel injection system based on the pressure fluctuation sensed by the pressure fluctuation sensing device; and
a failsafe device configured to perform predetermined failsafe processing when the abnormality determining device determines that the abnormality exists.

25. The fuel injection device according to claim 1, wherein
at least one of the fuel passage pressure sensors is provided inside or near the injector.

26. The fuel injection device according to claim 25, wherein
at least one of the fuel passage pressure sensors is provided in a fuel inlet of the injector.

27. The fuel injection device according to claim 1, wherein
at least one of the fuel passage pressure sensors is provided in a position closer to the fuel injection hole of the injector than to the common rail in the pipe connected to the fuel discharge port of the common rail.

28. The fuel injection device according to claim 1, further comprising:
a rail pressure sensor configured to measure the pressure in the common rail in addition to the fuel passage pressure sensor, wherein
the pressure fluctuation sensing device is configured to sense the pressure fluctuation caused by at least one of the injection operation of the injector and the actual injection thereof in accordance with a sensor output from the rail pressure sensor in addition to the sensor output from the fuel passage pressure sensor.

29. The fuel injection device according to claim 1, wherein
the pressure fluctuation sensing device is configured to detect a pressure drop point indicative of a predetermined pressure drop mode as the pressure fluctuation caused by at least one of the injection operation of the injector and the actual injection thereof in a predetermined period starting from predetermined timing near or after an injection start command to the injector based on the pressure value of each time measured by the fuel passage pressure sensor.

30. The fuel injection device according to claim 29, further comprising:
a pressure drop detection type injection timing obtaining device configured to determine at least one of injection start timing of the injector, injection end timing thereof and timing at which the injection rate is the maximum based on pressure drop point detection timing of the pressure fluctuation sensing device.

31. The fuel injection device according to claim 29, further comprising
a no-injection determination device configured to determine a no-injection state when the pressure drop point is not detected in the predetermined period by the pressure fluctuation sensing device.

32. The fuel injection device according to claim 29, wherein the injector is configured to cause a pressure leak during a period since an operation relating to the injection is started until the injection is actually started, the fuel injection device further comprising:
a leak amount obtaining device configured to determine an amount of the pressure leak based on a difference between a pressure value as of the detection of the pressure drop point by the pressure fluctuation sensing device and a pressure value as of occurrence of the pressure fluctuation.

33. The fuel injection device according to claim 29, further comprising:
an injection rate obtaining device configured to determine the injection rate in each time, which corresponds to the fuel quantity injected per unit time, based on the pressure value as of the detection of the pressure drop point by the pressure fluctuation sensing device and the pressure value of each time measured by the fuel passage pressure sensor.

34. The fuel injection device according to claim 29, further comprising:
an injection rate obtaining device configured to determine the injection rate at a time based on a difference amount between a reference pressure value and a pressure value measured at the time by the fuel passage pressure sensor, using the pressure value as of the detection of the pressure drop point by the pressure fluctuation sensing device as the reference pressure value.

35. The fuel injection device according to claim 29, further comprising:
an injection rate obtaining device configured to serially determine the injection rate of each time based on a difference amount between a fixed reference pressure value and the pressure value of each time measured by the fuel passage pressure sensor, using the pressure value as of the detection of the pressure drop point by the pressure fluctuation sensing device as the reference pressure value.

36. The fuel injection device according to claim 34, wherein
the reference pressure value is a pressure value immediately before start of the pressure drop due to the actual injection of the injector.

37. The fuel injection device according to claim 36, wherein
the injector is configured to cause pressure leak during a period since the operation relating to the injection is started until the injection is actually started, and
the reference pressure value is a pressure value at end timing of an invalid injection period.

38. The fuel injection device according to claim 34, wherein
the injection rate obtaining device is configured to calculate the injection rate at a time based on a relational expression: $Qr=(Pqr2-Pqr1) \times Kp$, where Qr is the injection rate at the time, Pqr1 is the pressure value as of the detection of the pressure drop point by the pressure fluctuation sensing device, Pqr2 is the pressure value measured by the fuel passage pressure sensor at the time, and Kp is a predetermined correction coefficient.

39. The fuel injection device according to claim 38, further comprising:
a device configured to variably set the correction coefficient according to the pressure in the common rail or a value equivalent thereto.

40. The fuel injection device according to claim 33, further comprising:
an injection rate abnormality determination device configured to determine an abnormality of the system when the injection rate obtained by the injection rate obtaining device is small with respect to a driving period of the injector.

41. The fuel injection device according to claim 29, further comprising:
a regression timing detection device configured to detect regression timing at which the pressure value of each time measured by the fuel passage pressure sensor returns to a pressure value as of the detection of the pressure drop point by the pressure fluctuation sensing device after the pressure value falls below the pressure value as of the detection of the pressure drop point; and
an injection end timing obtaining device configured to determine injection end timing of the injector based on the regression timing detected by the regression timing detection device.

42. The fuel injection device according to claim 29, wherein the injector is configured to cause pressure leak during a period since the operation relating to the injection is started until the injection is actually started, the fuel injection device comprising:
a time integral obtaining device configured to integrate the pressure values in the respective times measured by the fuel passage pressure sensor on the basis of the pressure value as of the detection of the pressure drop point by the pressure fluctuation sensing device to obtain a time integration value in an interval from timing at which the pressure drop point is detected by the pressure fluctuation sensing device to timing at which the measured pressure value of each time returns to a pressure value at the injection start timing after the pressure value falls below the pressure value as of the detection of the pressure drop point; and
an injection characteristic integral obtaining device configured to determine at least one of the fuel quantity actually injected by the injector and the amount of the pressure leak based on the time integration value obtained by the time integral obtaining device.

43. The fuel injection device according to claim 1, wherein
the pressure fluctuation sensing device is configured to detect a pressure rise point indicative of a predetermined pressure increase mode as the pressure fluctuation caused by at least one of the injection operation of the injector and the actual injection thereof in a predetermined period starting from predetermined timing near or after an injection start command for the injector based on the pressure value of each time measured by the fuel passage pressure sensor.

44. The fuel injection device according to claim 43, further comprising:
a failsafe device configured to perform predetermined failsafe processing when the pressure rise point is not detected by the pressure fluctuation sensing device in the predetermined period.

45. The fuel injection device according to claim 43, further comprising:
a pressure increase detection type injection timing obtaining device configured to determine at least one of injection start timing of the injector, injection end timing thereof and timing at which an injection rate is the maximum based on pressure rise point detection timing of the pressure fluctuation sensing device.

46. The fuel injection device according to claim 1, wherein
the pressure fluctuation sensing device is configured to detect a pressure decrease point indicative of a predetermined pressure decrease mode as the pressure fluctuation caused by at least one of the injection operation of the injector and the actual injection thereof in a predetermined period starting from predetermined timing near or after an injection start command for the injector based on the pressure value of each time measured by the fuel passage pressure sensor, and the pressure fluctuation sensing device is configured to detect a pressure rise point indicative of a predetermined pressure increase mode as the pressure fluctuation caused by at least one of the injection operation of the injector and the actual injection thereof in a predetermined period starting from timing delayed at least from a start point of the predetermined period for detecting the pressure drop point based on the pressure value of each time measured by the fuel passage pressure sensor.

47. The fuel injection device according to claim 46, further comprising:
an injection period obtaining device configured to determine an injection period of the injector based on both of the pressure drop point detection timing and the pressure rise point detection timing of the pressure fluctuation sensing device.

48. The fuel injection device according to claim 47, further comprising:
an injection quantity estimating device configured to perform at least one of estimation and correction of an injection quantity of the injector based on the injection period obtained by the injection period obtaining device and the pressure value of each time measured by the fuel passage pressure sensor.

49. The fuel injection device according to claim 46, further comprising:
a pressure difference obtaining device configured to determine a difference between the pressure value as of the detection of the pressure drop point and the pressure value as of the detection of the pressure rise point by the pressure fluctuation sensing device.

50. The fuel injection device according to claim 29, wherein
the pressure fluctuation sensing device is configured to compare the pressure value of each time measured by the fuel passage pressure sensor with a threshold defined by a function of time to serially determine whether the pressure value of each time is small or not, and
the pressure fluctuation sensing device is configured to determine that the pressure drop point is detected when the pressure value is determined to be small.

51. The fuel injection device according to claim 29, wherein
the pressure fluctuation sensing device is configured to detect the pressure drop point according to an amount of decrease in pressure from the pressure value as of occurrence of the pressure fluctuation based on the pressure value of each time measured by the fuel passage pressure sensor.

52. The fuel injection device according to claim 29, further comprising:
a pressure change obtaining device configured to determine a predetermined parameter indicative of a pressure change mode based on the pressure value of each time measured by the fuel passage pressure sensor, wherein
the pressure fluctuation sensing device is configured to detect the pressure drop point based on the pressure change mode obtained by the pressure change obtaining device.

53. The fuel injection device according to claim 52, wherein
the pressure change obtaining device is configured to determine a time differential value of the pressure corresponding to an inclination of a pressure transition as the predetermined parameter indicative of the pressure change mode.

54. The fuel injection device according to claim 53, wherein
the pressure fluctuation sensing device is configured to detect a point at which a differential value obtained by the pressure change obtaining device is the maximum or the minimum in the predetermined period starting from predetermined timing near or after the injection start command to the injector as the pressure drop point.

55. The fuel injection device according to claim 52, wherein
the pressure change obtaining device is configured to determine an inflection point of the pressure fluctuation caused by at least one of the injection operation of the injector and the actual injection thereof as the predetermined parameter indicative of the pressure change mode.

56. The fuel injection device according to claim 29, further comprising:
a filtering device configured to extract a pressure value of a specific frequency component from the pressure values in the respective times measured by the fuel passage pressure sensor, wherein
the pressure fluctuation sensing device is configured to detect the pressure drop point based on the pressure value of the specific frequency component extracted by the filtering device.

57. The fuel injection device according to claim 43, wherein
the pressure fluctuation sensing device is configured to compare the pressure value of each time measured by the fuel passage pressure sensor with a threshold defined by a function of time to serially determine whether the pressure value in each time is large or not, and
the pressure fluctuation sensing device is configured to determine that the pressure rise point is detected when the pressure value is determined to be large.

58. The fuel injection device according to claim 43, wherein
the pressure fluctuation sensing device is configured to detect the pressure rise point based on an amount of increase in pressure from the pressure value at specific timing based on the pressure value of each time measured by the fuel passage pressure sensor.

59. The fuel injection device according to claim 43, further comprising
a pressure change obtaining device configured to determine a predetermined parameter indicative of a pressure change mode based on the pressure value of each time measured by the fuel passage pressure sensor, wherein
the pressure fluctuation sensing device is configured to detect the pressure rise point based on the pressure change mode obtained by the pressure change obtaining device.

60. The fuel injection device according to claim 59, wherein
the pressure change obtaining device is configured to determine a time differential value of the pressure corresponding to an inclination of a pressure transition as the predetermined parameter indicative of the pressure change mode.

61. The fuel injection device according to claim 60, wherein
the pressure fluctuation sensing device is configured to detect a point at which a differential value obtained by the pressure change obtaining device is the maximum or the minimum in the predetermined period starting from the predetermined timing near or after the injection start command to the injector as the pressure rise point.

62. The fuel injection device according to claim 59, wherein
the pressure change obtaining device is configured to determine an inflection point of the pressure fluctuation caused by at least one of the injection operation of the injector and the actual injection thereof as the predetermined parameter indicative of the pressure change mode.

63. The fuel injection device according to claim 43, wherein
the pressure fluctuation sensing device is configured to detect a point at which the pressure of each time detected by the fuel passage pressure sensor is the minimum in the predetermined period starting from the predetermined timing near or after the injection start command to the injector as the pressure rise point.

64. The fuel injection device according to claim 43, wherein
the pressure rise point detected by the pressure fluctuation sensing device corresponds to a pressure local minimum point at which the pressure changes from pressure drop immediately after the injection to the pressure increase in the pressure fluctuation caused by the injection of the injector.

65. The fuel injection device according to claim 43, further comprising:
a filtering device configured to extract a pressure value of a specific frequency component from the pressure values in the respective times measured by the fuel passage pressure sensor, wherein
the pressure fluctuation sensing device is configured to detect the pressure rise point based on the pressure value of the specific frequency component extracted by the filtering device.

66. The fuel injection device according to claim 1, further comprising:
a timing detection device configured to detect specific timing based on the pressure value in each time measured by a predetermined one of the fuel passage pressure sensors; and
a timing correction device configured to correct the specific timing detected by the timing detection device to advance the specific timing by a degree corresponding to a distance between a located position of the predetermined one of the fuel passage pressure sensors and a fuel injection hole of the injector.

67. The fuel injection device according to claim 1, further comprising:
another timing detection device configured to detect specific timing by comparing the pressure value of each time measured by the fuel passage pressure sensor with a predetermined threshold; and
a threshold changing device configured to shift the predetermined threshold used by the another timing detection device to a value at which the specific timing is detected more easily if the specific timing is not detected by the timing detection device in a predetermined period.

68. The fuel injection device according to claim 1, wherein
the pressure fluctuation sensing device is configured to sense at least a part of a pressure transition waveform as the pressure fluctuation caused by at least one of the injection operation of the injector and the actual injection thereof, and
the fuel injection device further comprises a reference comparison deviation obtaining device configured to compare a point of the pressure transition waveform sensed by the pressure fluctuation sensing device with a corresponding point of a predetermined reference pressure transition waveform to determine at least one of a phase deviation and a cycle deviation therebetween.

69. The fuel injection device according to claim 68, wherein
the reference comparison deviation obtaining device is configured to compare a pressure value or a pressure differential value at predetermined timing of the pressure transition waveform sensed or being sensed by the pressure fluctuation sensing device with a corresponding pressure value or a corresponding pressure differential value of the reference pressure transition waveform to determine a deviation degree therebetween.

70. The fuel injection device according to claim 68, wherein
the reference comparison deviation obtaining device is configured to serially compare the pressure value in each time or the pressure differential value based on the pressure value of the pressure transition waveform with the corresponding pressure value or the corresponding pressure differential value of the reference pressure transition waveform to serially determine the deviation degree therebetween.

71. The fuel injection device according to claim 23, further comprising:
a waveform holding device configured to hold the reference pressure transition waveforms such that each waveform is related to a predetermined injection pattern and is identifiable for each injection pattern; and
a waveform selecting device configured to select one of the reference pressure fluctuation waveforms held by the waveform holding device based on the injection pattern of the injector in each time.

72. The fuel injection device according to claim 1, further comprising:
a pressure fluctuation holding device configured to hold predetermined reference pressure fluctuations such that each mode is identifiable for each injection pattern; and
a pressure fluctuation selecting device configured to select one of the reference pressure fluctuations held by the pressure fluctuation holding device based on the injection pattern of the injector in each time.

73. The fuel injection device according to claim 72, further comprising:
a pressure fluctuation learning device configured to cause the injector to perform injection of a small quantity during no-injection operation of a predetermined cylinder of the engine and configured to learn the reference pressure fluctuation based on the pressure fluctuation caused by at least one of the injection operation of the injector and the actual injection thereof.

74. The fuel injection device according to claim 72, wherein
when the pressure fluctuation sensing device senses the pressure fluctuation of a certain stage injection of a predetermined injection pattern, the pressure fluctuation selecting device is configured to select a single reference pressure fluctuation associated with an injection pattern of up to a previous stage injection of the predetermined injection pattern, and the fuel injection device further includes a difference value obtaining device configured to subtract the reference pressure fluctuation associated with the injection pattern of up to the previous stage injection selected by the pressure fluctuation selecting device from the pressure fluctuation caused by the injections up to the certain stage injection of the predetermined injection pattern sensed by the pressure fluctuation sensing device to determine a difference value therebetween.

75. The fuel injection device according to claim 74, wherein the certain stage injection is a second stage injection, and
the injection pattern of up to the previous stage injection is an injection pattern of a single stage injection.

76. The fuel injection device according to claim 74, wherein the difference value obtaining device is configured to serially perform the subtraction between the pressure value in each time or the pressure differential value based on the pressure value of the pressure fluctuation and the corresponding pressure value or the corresponding pressure differential value of the reference pressure fluctuation to serially determine the difference value therebetween.

77. The fuel injection device according to claim 1, wherein the engine is a multi-cylinder engine, and
at least two fuel passage pressure sensors are respectively provided in fuel passage routes of at least two cylinders of the engine.

78. The fuel injection device according to claim 77, wherein the fuel passage pressure sensors are respectively provided to all cylinders of the engine.

79. The fuel injection device according to claim 77, wherein the plurality of sensors respectively provided in the fuel passage routes of at least the two cylinders of the engine are disposed at positions substantially equalizing fuel passage distances between the respective sensors and the respective fuel injection holes of the injectors.

80. The fuel injection device according to claim 77, wherein the plurality of sensors respectively provided to the fuel passage routes of at least the two cylinders of the engine are disposed at certain positions such that fuel passage distances between the respective sensors and the respective fuel injection holes of the injectors are different from each other.

81. The fuel injection device according to claim 80, wherein the pressure fluctuation sensing device is configured to detect at least a part of the pressure transition waveform as the pressure fluctuation caused by at least one of the injection operation of the injector and the actual injection thereof based on sensor outputs from the plurality of sensors disposed in different positions, and
the fuel injection device further comprises a device configured to compare two pressure transition waveforms respectively sensed by the pressure fluctuation sensing device through the sensors disposed in the different positions to determine a phase deviation therebetween.

82. The fuel injection device according to claim 1, wherein the fuel passages from the common rail to the fuel injection holes include two passages with different passage lengths or passage shapes, and
the fuel passage pressure sensors are respectively provided at least in the two passages with the different passage lengths or passage shapes among the fuel passages.

83. The fuel injection device according to claim 1, wherein the fuel passages from the common rail to the fuel injection holes are the plurality of passages, which are classified into two or more groups in terms of passage length or difference in passage shape, and
each fuel passage pressure sensor is provided in each one of the groups with the different passage lengths or passage shapes.

84. The fuel injection device according to claim 82, wherein the pressure fluctuation sensing device is configured to sense at least a part of the pressure transition waveform as the pressure fluctuation caused by at least one of the injection operation of the injector and the actual injection thereof based on the sensor output from each of the fuel passage pressure sensors respectively provided in the two passages with the different lengths, and
the fuel injection device further comprises a cycle deviation obtaining device is configured to compare the two pressure transition waveforms sensed by the pressure fluctuation sensing device to determine a cycle deviation therebetween.

85. The fuel injection device according to claim 82, wherein the pressure fluctuation sensing device is configured to sense at least a part of the pressure transition waveform as the pressure fluctuation caused by at least one of the injection operation of the injector and the actual injection thereof based on the sensor output from each of the fuel passage pressure sensors respectively provided in at least two passages with the different passage length or shapes, and
the fuel injection device further comprises a fuel passage coefficient obtaining device configured to determine a volume elastic coefficient as a fluid property indicative of a degree of change in pressure accompanying change in volume of the fuel based on the pressure transition waveform sensed by the pressure fluctuation sensing device.

86. The fuel injection device according to claim 1, wherein the fuel passage pressure sensors are a plurality of sensors including two sensors separated from each other by a predetermined distance in at least one of fuel passage routes corresponding to the same cylinder of the engine.

87. The fuel injection device according to claim 86, wherein the fuel passage pressure sensors are the plurality of sensors including a sensor disposed at a position closer to the fuel injection hole of the injector than to the common rail and a sensor disposed at a position closer to the common rail than to the fuel injection hole of the injector.

88. The fuel injection device according to claim 86, wherein
the pressure fluctuation sensing device is configured to sense a first pressure fluctuation and a second pressure fluctuation each caused by at least one of the injection operation of the injector and the actual operation thereof based on the respective sensor outputs from an arbitrary first sensor and a second sensor disposed in a position farther from the fuel injection hole of the injector than the first sensor among the fuel passage pressure sensors.

89. The fuel injection device according to claim 88, wherein
the first pressure fluctuation and the second pressure fluctuation are respectively sensed as the pressure transition waveforms, and
the fuel injection device further comprises a waveform comparison phase deviation obtaining device configured to compare two pressure fluctuation waveforms as the first and second pressure fluctuations to determine a phase deviation between the two waveforms.

90. The fuel injection device according to claim 89, further comprising:
a phase deviation coefficient obtaining device configured to determine a volume elastic coefficient as a fluid property indicative of the degree of change in pressure of the fuel accompanying the change in volume thereof based on the phase deviation obtained by the waveform comparison phase deviation obtaining device and a fuel passage distance between the first sensor and the second sensor.

91. The fuel injection device according to claim 86, further comprising:
an application adjustment device configured to selectively use sensor outputs from an arbitrary first sensor and a second sensor that is disposed in a position farther from the fuel injection hole of the injector than the first sensor among the fuel passage pressure sensors for different applications respectively.

92. The fuel injection device according to claim 91, wherein
the application adjustment device is configured to use the sensor output from the second sensor for an application as a failsafe in the event of an abnormality in the first sensor.

93. The fuel injection device according to claim 1, further comprising
a fuel passage distance storing device configured to store a parameter indicative of a fuel passage distance from the position of each of the one or more fuel passage pressure sensors to the corresponding fuel injection hole of the injector.

94. A fuel injection device according to claim 1, wherein the fuel leak includes fuel leak from the injector before an actual fuel injection operation after the injection start command.

95. A fuel injection device according to claim 1, wherein the fuel leak includes fuel leak from the injector during a fuel injection operation.

96. A fuel injection device according to claim 94, wherein the injector is configured to:
start an operation relating to fuel injection by returning fuel in a command chamber to a fuel tank in order to drive a needle; and
cause the fuel leak during a period from a time when the operation relating to fuel injection is started to a time when the fuel injection is actually started.

97. A fuel injection device according to claim 1, wherein the injection characteristic detecting device is further configured to obtain the series of difference values at two or more inflection points in a curve formed by the series of difference values in each fuel injection.

98. A fuel injection device according to claim 1, wherein the pressure value corresponds to a pressure value immediately before a pressure drop start point due to the actual injection of the injector.

99. A fuel injection device for detecting a fuel injection pressure in a common rail type fuel injection system of an engine, the fuel injection device comprising:
a fuel pressure serially obtaining device configured to serially obtain fuel pressure signals of an injector connected to a common rail at intervals short enough to draw a track of a pressure transition waveform of the pressure; and
an injection characteristic detecting device configured to detect at least one injection characteristic of the injector based on the serially obtained fuel pressure signals, wherein
the injection characteristic detected by the injection characteristic detecting device is at least one of an actual injection rate and a fluctuation of the actual injection rate in an injection period of the injector, wherein the actual injection rate is an instantaneous injection quantity of fuel in a time interval shorter than the injection period;
wherein the fuel pressure serially obtaining device is configured to obtain multiple fuel pressure signals, which are respectively sensed at multiple timings including a timing near an injection timing during the injection, at time intervals which are shorter than the injection period; and
wherein the injection characteristic detecting device is configured to:
calculate a difference value between each of the multiple pressure sensor values and a pressure value, which is caused by a pressure decrease from a common rail pressure in the common rail due to fuel leak after start of an injection start command, to obtain a series of difference values including the difference value; and
detect the actual injection rate based on the series of difference values.

100. A fuel injection device according to claim 99, wherein the fuel leak includes fuel leak from the injector before an actual fuel injection operation after the injection start command.

101. A fuel injection device according to claim 99, wherein the fuel leak includes fuel leak from the injector during a fuel injection operation.

102. A fuel injection device according to claim 100, wherein the injector is configured to:
start an operation relating to fuel injection by returning fuel in a command chamber to a fuel tank in order to drive a needle; and
cause the fuel leak during a period from a time when the operation relating to fuel injection is started to a time when the fuel injection is actually started.

103. A fuel injection device according to claim 99, wherein the injection characteristic detecting device is further configured to obtain the series of difference values at two or more inflection points in a curve formed by the series of difference values in each fuel injection.

104. A fuel injection device according to claim 99, wherein the pressure value corresponds to a pressure value immediately before a pressure drop start point due to the actual injection of the injector.

105. A fuel injection device for detecting a fuel injection pressure in a common rail type fuel injection system of an engine, the fuel injection device comprising:
   a fuel pressure serially obtaining device configured to serially obtain fuel pressure signals of an injector connected to a common rail at intervals shorter than 50 μsec; and
   an injection characteristic detecting device configured to detect at least one injection characteristic of the injector based on the serially obtained fuel pressure signals, wherein
   the injection characteristic detected by the injection characteristic detecting device is at least one of an actual injection rate and a fluctuation of the actual injection rate in an injection period of the injector, wherein the actual injection rate is an instantaneous injection quantity of fuel in a time interval shorter than the injection period;
   wherein the fuel pressure serially obtaining device is configured to obtain multiple fuel pressure signals, which are respectively sensed at multiple timings including a timing near an injection timing during the injection, at time intervals which are shorter than the injection period; and
   wherein the injection characteristic detecting device is configured to:
   calculate a difference value between each of the multiple pressure sensor values and a pressure value, which is caused by a pressure decrease from a common rail pressure in the common rail due to fuel leak after start of an injection start command, to obtain a series of difference values including the difference value; and
   detect the actual injection rate based on the series of difference values.

106. A fuel injection device according to claim 105, wherein the fuel leak includes fuel leak from the injector before an actual fuel injection operation after the injection start command.

107. A fuel injection device according to claim 105, wherein the fuel leak includes fuel leak from the injector during a fuel injection operation.

108. A fuel injection device according to claim 106, wherein the injector is configured to:
   start an operation relating to fuel injection by returning fuel in a command chamber to a fuel tank in order to drive a needle and
   cause the fuel leak during a period from a time when the operation relating to fuel injection is started to a time when the fuel injection is actually started.

109. A fuel injection device according to claim 105, wherein the injection characteristic detecting device is further configured to obtain the series of difference values at two or more inflection points in a curve formed by the series of difference values in each fuel injection.

110. A fuel injection device according to claim 105, wherein the pressure value corresponds to a pressure value immediately before a pressure drop start point due to the actual injection of the injector.

* * * * *